United States Patent
Wong et al.

(10) Patent No.: US 10,901,584 B2
(45) Date of Patent: Jan. 26, 2021

(54) DEVICES, METHODS, AND SYSTEMS FOR MANIPULATING USER INTERFACES

(71) Applicant: Apple Inc., Cupertino, CA (US)

(72) Inventors: Chun Kin Minor Wong, San Jose, CA (US); Raymond S. Sepulveda, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/366,137

(22) Filed: Mar. 27, 2019

(65) Prior Publication Data

US 2019/0377476 A1    Dec. 12, 2019

Related U.S. Application Data

(60) Provisional application No. 62/679,938, filed on Jun. 3, 2018.

(51) Int. Cl.

| | | |
|---|---|---|
| G06F 3/0484 | (2013.01) | |
| G06F 3/0481 | (2013.01) | |
| G06F 3/0482 | (2013.01) | |
| G06F 40/106 | (2020.01) | |
| G06F 3/0488 | (2013.01) | |
| G06F 3/0486 | (2013.01) | |

(52) U.S. Cl.
CPC ........ *G06F 3/04842* (2013.01); *G06F 3/0482* (2013.01); *G06F 3/0486* (2013.01); *G06F 3/04817* (2013.01); *G06F 3/04847* (2013.01); *G06F 3/04886* (2013.01)

(58) Field of Classification Search
CPC .............. G06F 40/106; G06F 3/04842; G06F 3/04817; G06F 3/0482; G06F 3/04886
See application file for complete search history.

(56) References Cited

U.S. PATENT DOCUMENTS

| | | | |
|---|---|---|---|
| 6,204,840 B1* | 3/2001 | Petelycky | G11B 27/034 375/E7.006 |
| 2008/0228924 A1* | 9/2008 | Herberger | G06F 16/51 709/227 |
| 2012/0084644 A1* | 4/2012 | Robert | G06F 16/168 715/255 |
| 2012/0216106 A1* | 8/2012 | Casey | G06F 40/174 715/224 |

\* cited by examiner

*Primary Examiner* — Nhat Huy T Nguyen
(74) *Attorney, Agent, or Firm* — Fernando & Partners, LLP

(57) ABSTRACT

A method includes, while displaying a file browsing user interface that includes a plurality of representations of files, detecting a first input directed to a representation of a first file of the plurality of representations of the files. The method includes in response to determining that the first input is of a first input type corresponding to a request to display a preview of the first file, concurrently displaying a preview of the first file and one or more selectable affordances for performing actions associated with the first file. The one or more selectable affordances include: in accordance with a determination that the first file includes content of a first type, a first set of one or more selectable affordances; and in accordance with a determination that the first file includes content of a second type, a second set of one or more selectable affordances.

21 Claims, 81 Drawing Sheets

900a

```
┌─────────────────────────────────────────────────────────────────────────┐
│ At an electronic device with one or more processors, a non-transitory   │─ 902
│ memory, one or more input devices, and a display device:                │
│                                                                          │
│       While displaying, via the display device, a file browsing user    │
│ interface that includes a plurality of representations of files,        │
│ detecting, via the one or more input devices, a first input directed    │
│ to a representation of a first file of the plurality of                 │
│ representations of the files                                            │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ The plurality of representations of the files are included     │───904
│   │   within a first window pane of a first window.                 │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘
                                    │
                                   (A)
                                    ▼
┌─────────────────────────────────────────────────────────────────────────┐
│    In response to determining that the first input is of a first input │─906
│ type corresponding to a request to display a preview of the first      │
│ file, concurrently displaying, via the display device:                  │
│         a preview of the first file; and                                │
│         one or more selectable affordances for performing actions       │
│ associated with the first file, including:                              │
│         in accordance with a determination that the first file includes│
│ content of a first type, displaying, via the display device, a first   │
│ set of one or more selectable affordances for performing actions        │
│ associated with the first file; and                                     │
│         in accordance with a determination that the first file includes│
│ content of a second type, displaying, via the display device, a second │
│ set of one or more selectable affordances for performing actions        │
│ associated with the first file                                          │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ The preview of the first file is included within a second       │──908
│   │ window pane that is included within the first window             │
│   │  ┌ ─ ─ ─ ─ ─ ─ ─ ─ ─ ─ ─ ─ ─ ─ ─ ─ ─ ─ ─ ─ ─ ─ ─ ─ ─ ─ ─ ┐    │
│   │  │ The second window pane is included within a docking    │──910
│   │  │ area of the first window                                │    │
│   │  └ ─ ─ ─ ─ ─ ─ ─ ─ ─ ─ ─ ─ ─ ─ ─ ─ ─ ─ ─ ─ ─ ─ ─ ─ ─ ─ ─ ┘    │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │ The preview of the first file is included within a second       │──912
│   │ window that is different from the first window                   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘
                            │          │
                           (B)        (C)
                                       ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│    Detecting, via the one or more input devices, a second input      │
│ corresponding to a request to change at least a subset of the one or │─914
│ more selectable affordances; and                                      │
│    In response to detecting the second input, changing at least the  │
│ subset of the one or more selectable affordances.                    │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

In response to determining that the first input is of a second input type that is different from the first input type, launching the first file in an application ⎯ 916

Detecting, via the one or more input devices, an edit input corresponding to the preview of the first file; and ⎯ 918

In response to detecting the edit input, changing content displayed within the preview of the first file based on a particular affordance of the one or more selectable affordances that has focus.

Detecting, via the one or more input devices, a selection input corresponding to the particular affordance of the one or more selectable affordances. ⎯ 920

In response to detecting, via the one or more input devices, a navigation input corresponding to a request to cease displaying the preview of the first file, displaying, via the display device, a prompt providing an option to save changes made to the preview of the first file ⎯ 922

Detecting, via the one or more input devices, an application-designation input corresponding to an application affordance within the screen capture interface;  ⌐ 1052

After detecting the application-designation input, detecting, via the one or more input devices, a fourth input corresponding to again selecting the first capture affordance; and In response to detecting the fourth input, launching an application associated with the application affordance, wherein a window of the application includes a representation of the second screenshot

While displaying, on the display, at least the first representation of the first screenshot or the second representation of the second screenshot:  ⌐ 1054

Detecting, via the one or more input devices, a drag input corresponding to at least one of the first representation of the first screenshot or a second representation of the second screenshot; and In response to detecting the drag input, perform a drag operation on at least one of the first representation of the first screenshot or the second representation of the second screenshot

Figure 10E

DEVICES, METHODS, AND SYSTEMS FOR MANIPULATING USER INTERFACES

CROSS-REFERENCE TO RELATED APPLICATIONS

This application claims priority to U.S. Provisional Patent App. No. 62/679,938 filed on Jun. 3, 2018, which is hereby incorporated by reference in its entirety.

TECHNICAL FIELD

This relates generally to electronic devices with user interfaces, and in particular, to electronic devices with one or more input devices that detect inputs in order to manipulate the user interfaces.

BACKGROUND

Using inputs for manipulating user interfaces of an electronic device has become ubiquitous. For example, the electronic device uses peripheral-type inputs (e.g., a touchscreen input, mouse, keyboard) in order to affect the display of one or more user interfaces.

However, these inputs provide limited and inefficient control for manipulating the user interface. Accordingly, the electronic device receives repetitive, complex, and/or cumbersome inputs are in order to manipulate the user interface.

SUMMARY

Accordingly, there is a need for a robust and efficient mechanism for manipulating a user interface at an electronic device. In particular, there is a need to enable electronic device to have faster, more efficient methods, system, and devices for user interface manipulation. Such techniques optionally complement or replace conventional methods for manipulating the user interface at the electronic device. Such techniques reduce the number, extent, and/or nature of the inputs from a user and produce a more efficient human-machine interface. Accordingly, for battery-operated devices, power usage is reduced and battery life consequently is increased.

The above deficiencies and other problems associated with user interfaces are reduced or eliminated by the disclosed methods, electronic devices, and systems. In some embodiments, the electronic device is a desktop computer. In some embodiments, the electronic device is portable (e.g., a notebook computer, tablet computer, or handheld device). In some embodiments, the electronic device is a personal electronic device (e.g., a wearable electronic device, such as a watch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the user interacts with the GUI primarily through user interactions with the stylus while the stylus is not in contact with the touch-sensitive surface. In some embodiments, the user interacts with the GUI primarily through finger and/or hand contacts and gestures on the stylus while the user is holding the stylus. In some embodiments, the functions optionally include screen capturing, content previewing, image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more processors, a non-transitory memory, one or more input devices, and a display device. The method includes, while displaying, via the display device, a file browsing user interface that includes a plurality of representations of files, detecting, via the one or more input devices, a first input directed to a representation of a first file of the plurality of representations of the files. The method further includes, in response to determining that the first input is of a first input type corresponding to a request to display a preview of the first file, concurrently displaying, via the display device, a preview of the first file and one or more selectable affordances for performing actions associated with the first file. The one or more selectable affordances include: in accordance with a determination that the first file includes content of a first type, a first set of one or more selectable affordances for performing actions associated with the first file; and in accordance with a determination that the first file includes content of a second type, a second set of one or more selectable affordances for performing actions associated with the first file.

In accordance with some embodiments, a method is performed at an electronic device with one or more processors, a non-transitory memory, one or more input devices, and a display. The method includes, while displaying content on the display, displaying, on the display, a screen capture interface overlaid on the content. The method further includes in response to detecting, via the one or more input devices, a first input corresponding to selecting a first capture affordance within the screen capture interface, capturing a first screenshot that includes currently displayed content within a first sub-region of the display to be captured, wherein the first sub-region includes less than all of the display. The method further includes after capturing the first screenshot and after a first change in appearance of content in the first sub-region, detecting, via the one or more input devices, a second input corresponding to again selecting the first capture affordance. The method further includes in response to detecting the second input, capturing a second screenshot that includes currently displayed content in the first sub-region of the display, wherein the second screenshot is different from the first screenshot.

In accordance with some embodiments, an electronic device includes a display, one or more processors, a non-transitory memory, one or more input devices, and one or more programs; the one or more programs are stored in the non-transitory memory and configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, one or more processors, a non-transitory memory, and one or more input devices, cause the electronic device to perform or cause performance of the operations of any of the methods described herein. In accordance with some embodiments, a graphical user interface on an electronic device with a display, a non-transitory memory, one or more input devices, and one or more processors to execute one or more programs stored in the non-transitory memory includes one or more of the elements displayed in any of the methods described herein, which are updated in response to inputs, as described in any of the methods described herein. In accordance with some embodiments, an electronic device includes: a display, one or more processors, a non-transitory memory, one or more input devices, and means for performing or causing performance of the operations of any of the methods described herein. In accordance with some embodiments, an information processing apparatus, for use in an electronic device with a display, one or more processors, a non-transitory memory, and one or more input devices, includes means for performing or causing performance of the operations of any of the methods described herein.

Thus, an electronic device detects, via one or more inputs devices, one or more inputs, and intelligently exploits the inputs in order to efficiently manipulate the displayed user interface. Based on the inputs, the electronic device efficiently performs a variety of complex operations, such as displaying a file preview and capturing a screenshot of a sub-region of the display. This improves the operability of the electronic device in a number of ways, including providing longer battery life and less wear-and-tear. Additionally, the improved user interfaces enable more efficient and accurate responses to inputs to the electronic device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9C is a flow diagram illustrating a method of previewing files in accordance with some embodiments.

FIGS. 10A-10E is a flow diagram illustrating a method of screen capturing in accordance with some embodiments.

DESCRIPTION OF EMBODIMENTS

Many electronic devices detect inputs, and based the inputs manipulate user interfaces. However, existing methods for manipulating user interfaces are slow, cumbersome, and inefficient. For example, the number and/or types of inputs registered at the electronic device are limited. Even multi-step surface touches (e.g., gestures) provide relatively few input types because they still require touch contact with the screen.

The embodiments below address these problems and others by intelligently exploiting inputs received by the electronic device. Namely, the electronic device detects inputs, and intelligently exploits the inputs in order to efficiently manipulate the displayed user interface. Based on the inputs, the electronic device efficiently performs a variety of complex operations, such as displaying a file preview and capturing a screenshot of a sub-region of the display. This improves the operability of the electronic device in a number of ways, including providing longer battery life and less wear-and-tear. Additionally, the improved user interfaces enable more efficient and accurate responses to inputs to the electronic device.

Figure 7A:
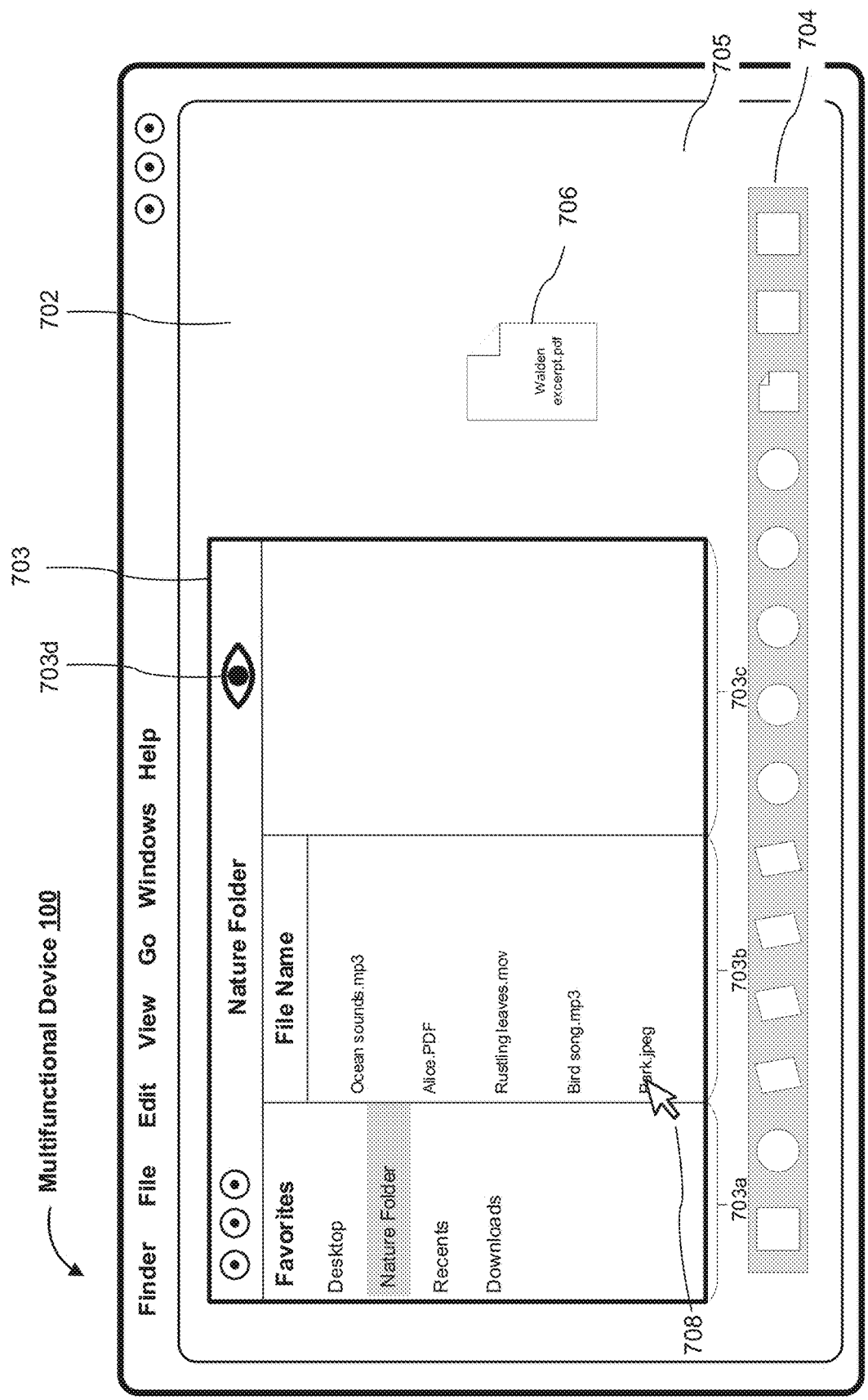
FIGS. 7A-7Z are examples of a method of previewing files in accordance with some embodiments.
Figure 7Z:
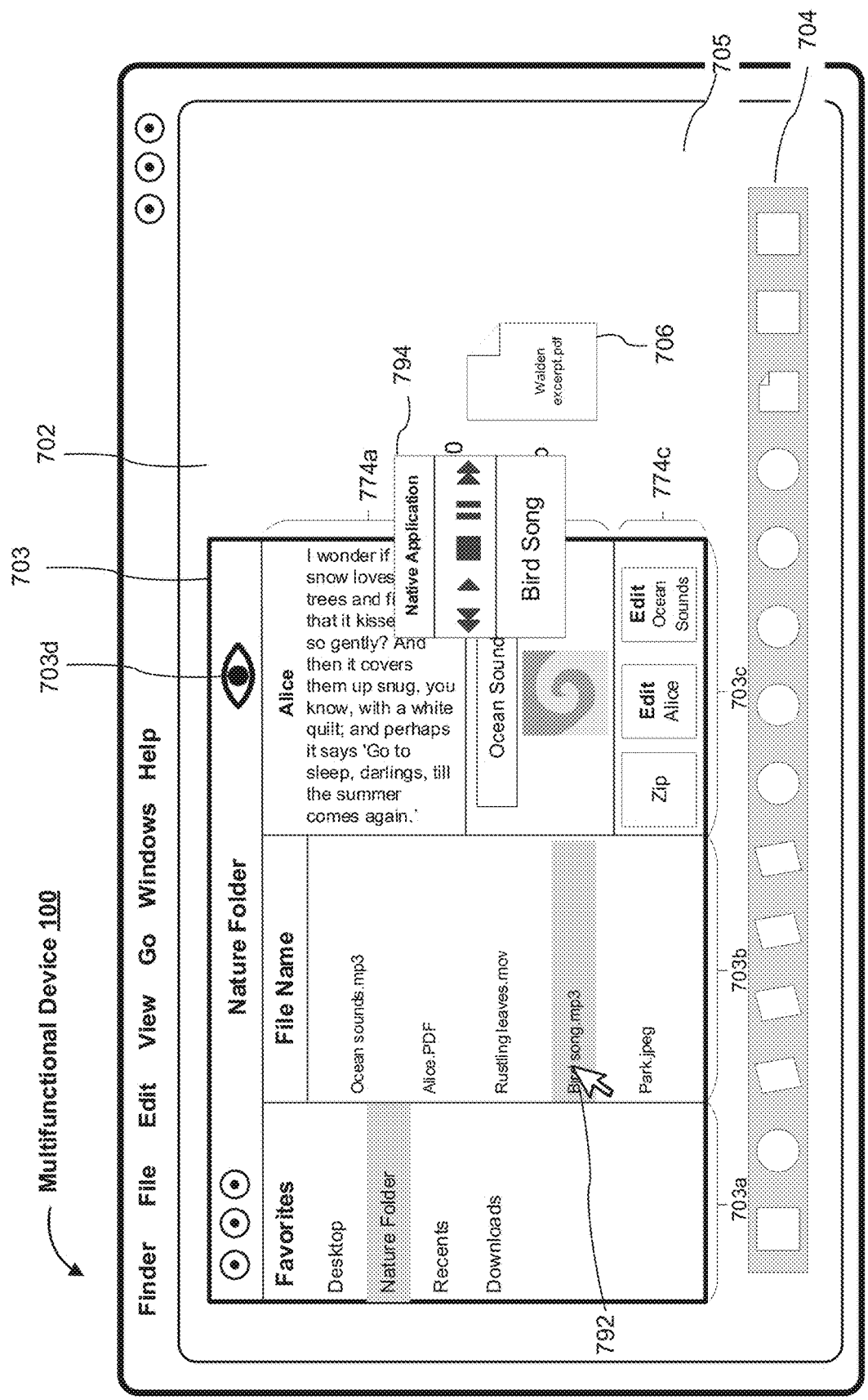
Figure 8A:
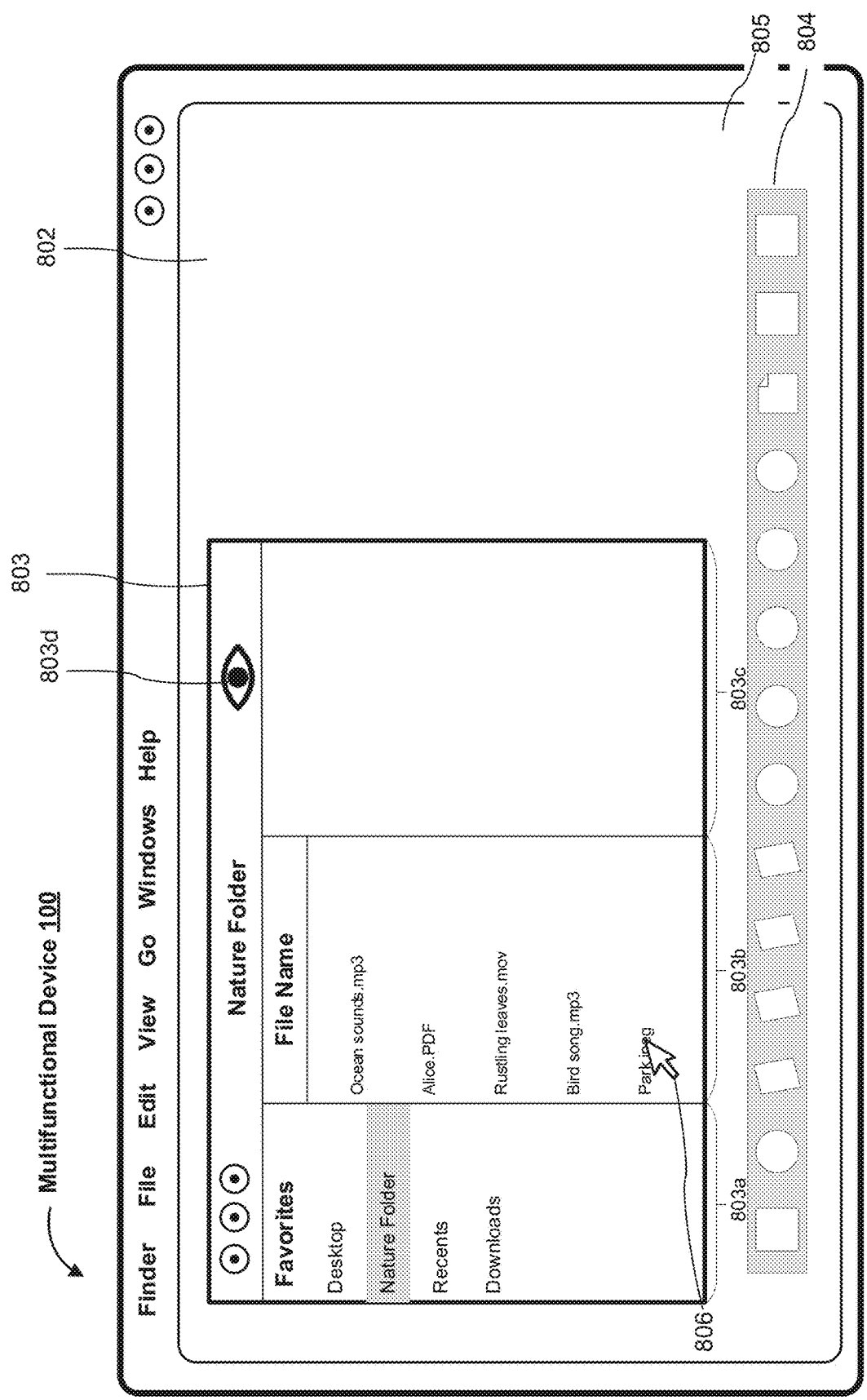
FIGS. 8A-8AL are examples of a method of screen capturing in accordance with some embodiments.

Below, FIGS. 1A-1B, 2-4, 5A-5B, and 6A-6B provide a description of example devices. FIGS. 7A-7Z are examples of a method of previewing files in accordance with some embodiments. The user interfaces in FIGS. 7A-7Z are used to illustrate the processes in FIGS. 9A-9C. FIGS. 8A-8AL are examples of a method of screen capturing in accordance with some embodiments. The user interfaces in FIGS. 8A-8AL are used to illustrate portions of the processes in FIGS. 10A-10E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the electronic device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touch-pads), are, optionally, used. It should also be understood that, in some embodiments, the electronic device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The electronic device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the electronic device optionally use at least one common physical user-interface device, such as the touch-sensitive surface. One or more functions of the touch-sensitive surface as well as corresponding information displayed on the electronic device are, optionally, adjusted and/or varied from one application to the next and/or within a respective application. In this way, a common physical architecture (such as the touch-sensitive surface) of the electronic device optionally supports the variety of applications with user interfaces that are intuitive and transparent to the user.

Figure 1A:
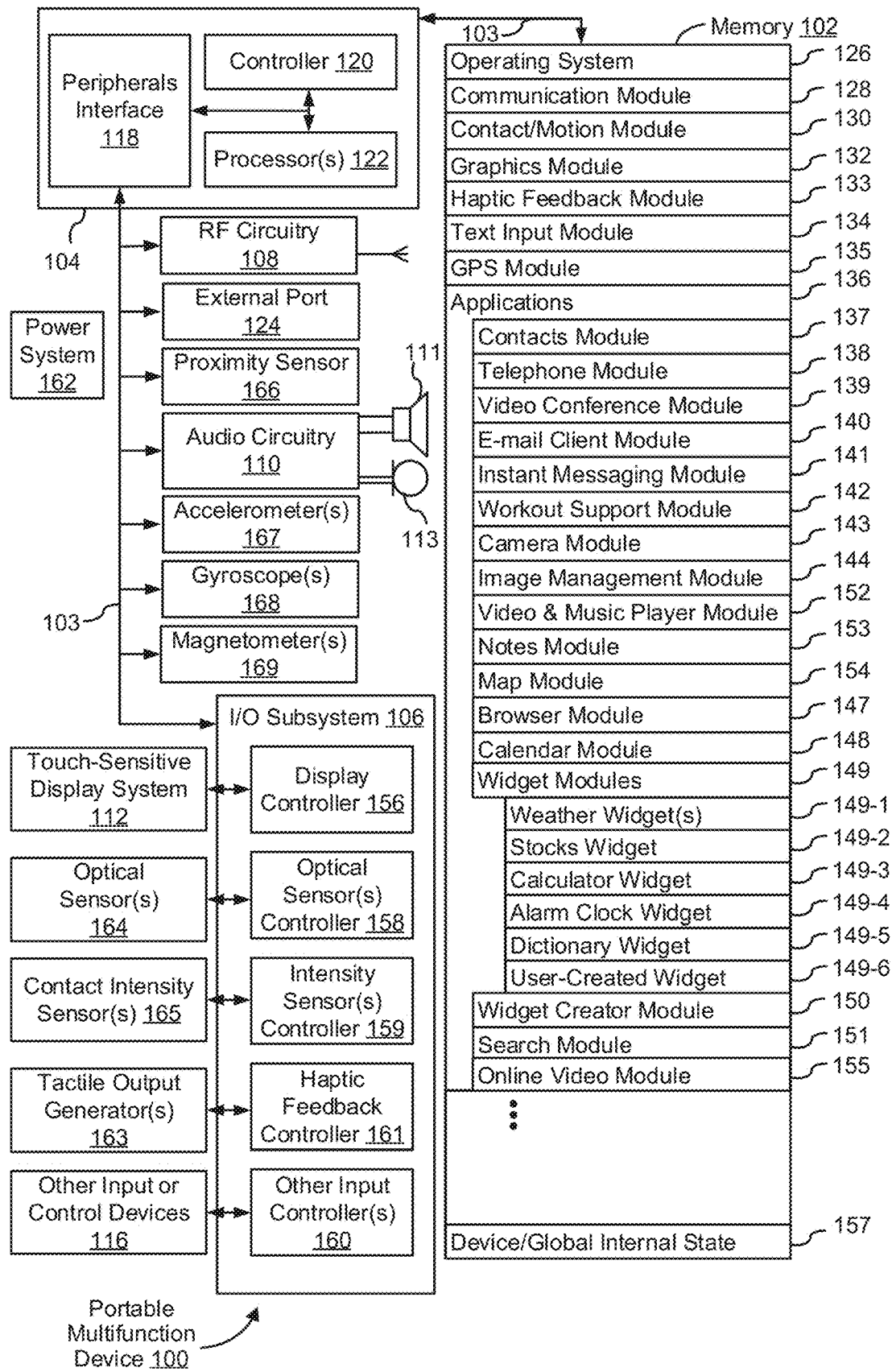
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating a portable multifunction device 100 with touch-sensitive display system 112 in accordance with some embodiments. Touch-sensitive display system 112 is sometimes called a "touch screen" for convenience and is sometimes simply called a touch-sensitive display. The electronic device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. The electronic device 100 optionally includes one or more optical sensors 164. The electronic device 100 optionally includes one or more intensity sensors 165 for detecting intensity of contacts on the electronic device 100 (e.g., a touch-sensitive surface such as touch-sensitive display system 112 of the electronic device 100). The electronic device 100 optionally includes one or more tactile output generators 163 for generating tactile outputs on the electronic device 100 (e.g., generating tactile outputs on a touch-sensitive surface such as touch-sensitive display system 112 of the electronic device 100 or touchpad 355 of device 300). These components optionally communicate over one or more communication buses or signal lines 103.

As used in the specification and claims, the term "tactile output" refers to physical displacement of an electronic device relative to a previous position of the electronic device, physical displacement of a component (e.g., a touch-sensitive surface) of an electronic device relative to another component (e.g., housing) of the electronic device, or displacement of the component relative to a center of mass of the electronic device that will be detected by a user with the user's sense of touch. For example, in situations where the electronic device or the component of the electronic device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the electronic device or the component of the electronic device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," or "roughness"), unless otherwise stated, the generated tactile output corresponds to physical displacement of the electronic device or a component thereof that will generate the described sensory perception for a typical (or average) user.

It should be appreciated that the electronic device 100 is only one example of a portable multifunction device, and that the electronic device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of the electronic device 100, such as CPU(s) 120 and the peripherals interface 118, is, optionally, controlled by memory controller 122.

Peripherals interface 118 can be used to couple input and output peripherals of the electronic device to CPU(s) 120 and memory 102. The one or more processors 120 run or execute various software programs and/or sets of instructions stored in memory 102 to perform various functions for the electronic device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 detects and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and the electronic device 100. Audio circuitry 110 detects audio data from peripherals interface 118, converts the audio data to an electrical signal, and transmits the electrical signal to speaker 111. Speaker 111 converts the electrical signal to human-audible sound waves. Audio circuitry 110 also detects electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on the electronic device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 detect/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the electronic device and a user. Display controller 156 detects and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode)

technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the electronic device translates the rough finger-based input into a precise pointer/cursor position or command for performing the actions desired by the user.

In some embodiments, in addition to the touch screen, the electronic device 100 optionally includes a touchpad for activating or deactivating particular functions. In some embodiments, the touchpad is a touch-sensitive area of the electronic device that, unlike the touch screen, does not display visual output. The touchpad is, optionally, a touch-sensitive surface that is separate from touch-sensitive display system 112 or an extension of the touch-sensitive surface formed by the touch screen.

The electronic device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The electronic device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 detect light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of the electronic device 100, opposite touch-sensitive display system 112 on the front of the electronic device, so that the touch screen is enabled for use as a viewfinder for still and/or video image acquisition. In some embodiments, another optical sensor is located on the front of the electronic device so that the user's image is obtained (e.g., for selfies, for videoconferencing while the user views the other video conference participants on the touch screen, etc.).

The electronic device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 detect contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of the electronic device 100, opposite touch-screen display system 112 which is located on the front of the electronic device 100.

The electronic device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

The electronic device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). Tactile output generator(s) 163 detect tactile feedback generation instructions from haptic feedback module 133 and generates tactile outputs on the electronic device 100 that are capable of being sensed by a user of the electronic device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of the electronic device 100) or laterally (e.g., back and forth in the same plane as a surface of the electronic device 100). In some embodiments, at least one tactile output generator sensor is located on the back of the electronic device 100, opposite touch-sensitive display system 112, which is located on the front of the electronic device 100.

The electronic device 100 optionally also includes one or more accelerometers 167, gyroscopes 168, and/or magnetometers 169 (e.g., as part of an inertial measurement unit (IMU)) for obtaining information concerning the position (e.g., attitude) of the electronic device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data detected from the one or more accelerometers. The electronic device 100 optionally includes a GPS (or GLONASS or other global navigation system) detector for obtaining information concerning the location and orientation (e.g., portrait or landscape) of the electronic device 100.

Figure 3:
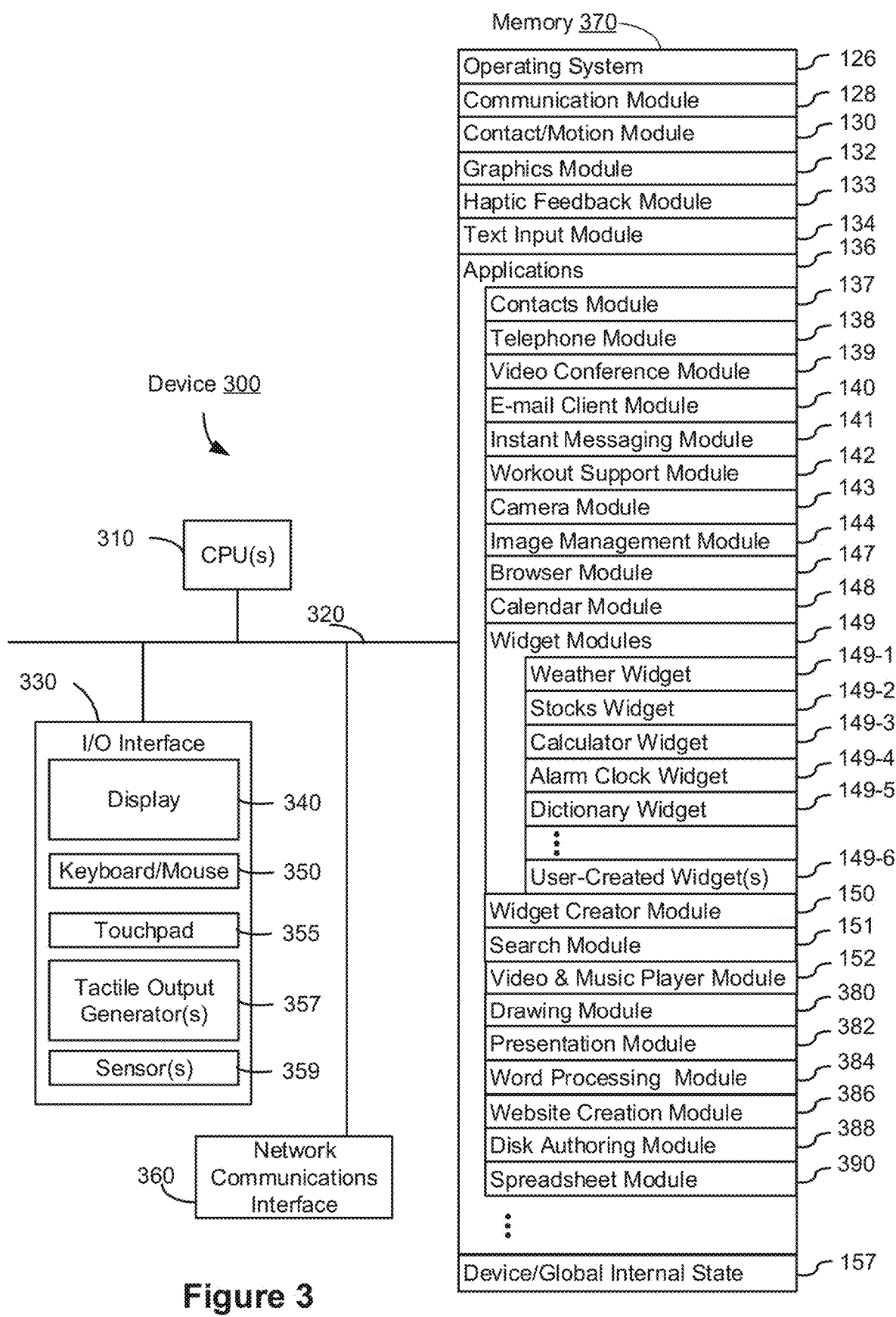
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, position module (or set of instructions), graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the electronic device's various sensors and other input or control devices 116; and location and/or positional information concerning the electronic device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data detected by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 detects contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the electronic device, such as the electronic device's attitude (e.g., roll, pitch, and/or yaw) in a particular frame of reference. Position module 130 includes software components for performing various operations related to detecting the position of the electronic device and detecting changes to the position of the electronic device. In some embodiments, position module 131 uses information detected from a stylus being used with the electronic device to detect positional information concerning the stylus, such as detecting the positional state of the stylus relative to the electronic device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 detects, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on the electronic device 100 in response to user interactions with the electronic device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the electronic device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154;
- online video module 155; and/or
- annotation application 195, which is used for providing annotations to user interfaces and optionally storing and/or accessing saved annotations 196 in memory 102.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, detect, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to detect instant messages and to view detected instant messages. In some embodiments, transmitted and/or detected instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); detect workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, the electronic device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to detect, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, detect (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, the electronic device 100 is an electronic device where operation of a predefined set of functions on the electronic device is performed exclusively through a touch screen and/or a touchpad. By using a touch screen and/or a touchpad as the primary input control device for operation of the electronic device 100, the number of physical input control devices (such as push buttons, dials, and the like) on the electronic device 100 is, optionally, reduced.

The predefined set of functions that are performed exclusively through a touch screen and/or a touchpad optionally include navigation between user interfaces. In some embodiments, the touchpad, when touched by the user, navigates the electronic device 100 to a main, home, or root menu from any user interface that is displayed on the electronic device 100. In such embodiments, a "menu button" is implemented using a touchpad. In some other embodiments, the menu button is a physical push button or other physical input control device instead of a touchpad.

Figure 1B:
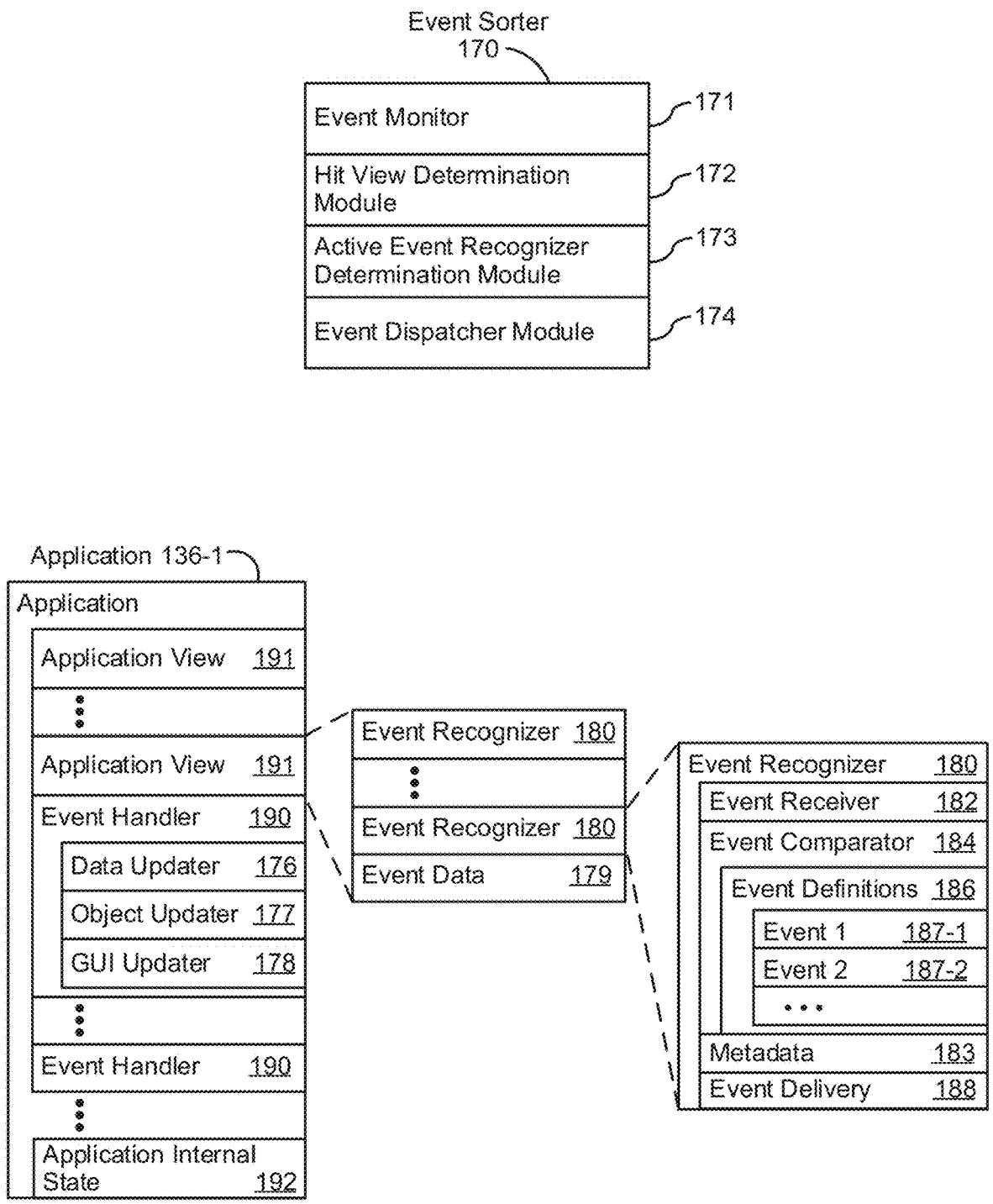
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (in FIG. 3) includes event sorter 170 (e.g., in operating system 126) and a respective application 136-1 (e.g., any of the aforementioned applications 136, 137-155, 380-390).

Event sorter 170 detects event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 detects event information from peripherals interface 118. Event information includes information about a sub-event (e.g., a user touch on touch-sensitive display system 112, as part of a multi-touch gesture). Peripherals interface 118 transmits information it detects from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 detects from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173. Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 detects information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically detects all sub-events related to the same touch or input source for which it was identified as the hit view.

Active event recognizer determination module 173 determines which view or views within a view hierarchy should detect a particular sequence of sub-events. In some embodiments, active event recognizer determination module 173 determines that only the hit view should detect a particular sequence of sub-events. In other embodiments, active event recognizer determination module 173 determines that all views that include the physical location of a sub-event are actively involved views, and therefore determines that all actively involved views should detect a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event detector module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 detected from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 detects event information (e.g., event data 179) from event sorter 170, and identifies an event from the event information. Event recognizer 180 includes event detector 182 and event comparator 184. In some embodiments, event recognizer 180 also includes at least a subset of: metadata 183, and event delivery instructions 188 (which optionally include sub-event delivery instructions).

Event detector 182 detects event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the electronic device from one orientation to another (e.g., from a portrait orientation to a landscape orientation, or vice versa), and the event information includes corresponding information about the current orientation (also called device attitude) of the electronic device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views detect the event information and perform a predetermined process.

In some embodiments, data updater 176 creates and updates data used in application 136-1. For example, data updater 176 updates the telephone number used in contacts module 137 or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the electronic device; oral instructions; detected eye movements; biometric inputs; and/or any combination thereof are optionally utilized as inputs corresponding to sub-events which define an event to be recognized.

Figure 2:
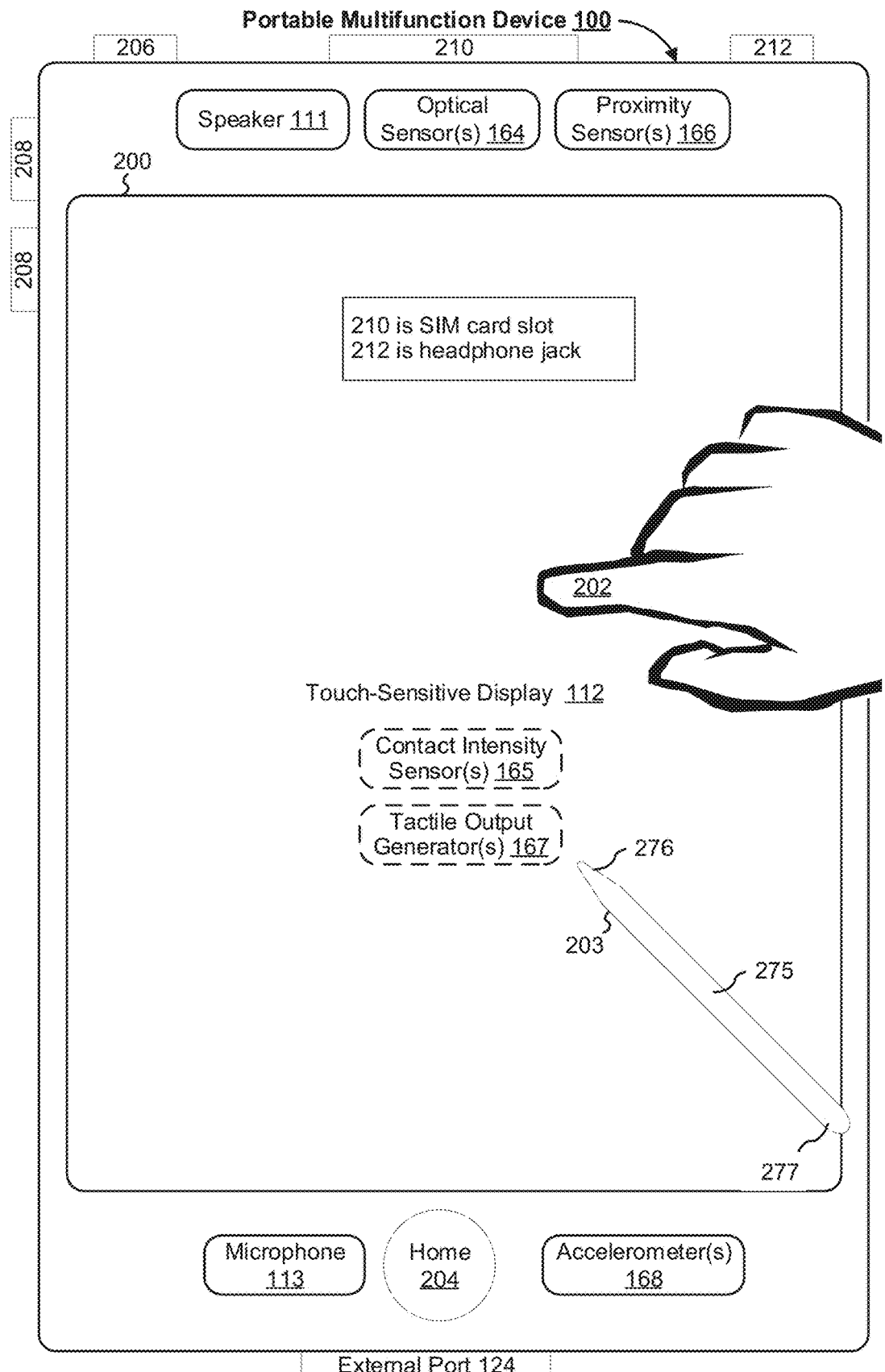
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with the electronic device 100. In some embodiments or circumstances, inadvertent contact with a graphic does not select the graphic. For example, a swipe gesture that sweeps over an application icon optionally does not select the corresponding application when the gesture corresponding to selection is a tap.

The stylus 203 includes a first end 276 and a second end 277. In various embodiments, the first end 276 corresponds to a tip of the stylus 203 (e.g., the tip of a pencil) and the second end 277 corresponds to the opposite or bottom end of the stylus 203 (e.g., the eraser of the pencil).

The stylus 203 includes a touch-sensitive surface 275 to detect touch inputs from a user. In some embodiments, the touch-sensitive surface 275 corresponds to a capacitive touch element. The stylus 203 includes a sensor or set of sensors that detect inputs from the user based on haptic and/or tactile contact with the touch-sensitive surface 275. In some embodiments, the stylus 203 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 275. Because the stylus 203 includes a variety of sensors and types of sensors, the stylus 203 can detect different a variety of inputs from the user, including the gestured disclosed herein with respect to the touch screen of the portable multifunction device 100. In some embodiments, the one or more sensors can detect a single touch input or successive touch inputs in response to a user tapping once or multiple times on the touch-sensitive surface 275. In some embodiments, the one or more sensors can detect a swipe input on the stylus 203 in response to the user stroking along the touch-sensitive surface 275 with one or more fingers. In some embodiments, if the speed with which the user strokes along the touch-sensitive surface 275 breaches a threshold, the one or more sensors detect a flick input rather than a swipe input.

The stylus 203 also includes one or more sensors that detect orientation (e.g., angular position relative to the electronic device) and/or movement of the stylus 203, such as an accelerometer, magnetometer, gyroscope, and/or the like. The one or more sensors can detect a variety of rotational movements of the stylus 203 by the user, including the type and direction of the rotation. For example, the one or more sensors can detect the user rolling and/or twirling the stylus 203, and can detect the direction (e.g., clockwise or counterclockwise) of the rolling/twirling. In some embodiments, the detected input depends on the angular position of the first end 276 and the second end 277 of the stylus 203 relative to the electronic device. For example, in some embodiments, if the stylus 203 is substantially perpendicular to the electronic device and the second end 277 (e.g., the eraser) is nearer to the electronic device, then contacting the surface of the electronic device with the second end 277 results in an erase operation. On the other hand, if the stylus 203 is substantially perpendicular to the electronic device and the first end 276 (e.g., the tip) is nearer to the electronic device, then contacting the surface of the electronic device with the first end 276 results in a marking operation.

The electronic device 100 optionally also includes one or more physical buttons, such as "home" or menu button 204. As described previously, menu button 204 is, optionally, used to navigate to any application 136 in a set of applications that are, optionally executed on the electronic device 100. Alternatively, in some embodiments, the menu button is implemented as a soft key in a GUI displayed on the touch-screen display.

In some embodiments, the electronic device 100 includes the touch-screen display, menu button 204, push button 206 for powering the electronic device on/off and locking the electronic device, volume adjustment button(s) 208, Subscriber Identity Module (SIM) card slot 210, head set jack 212, and docking/charging external port 124. Push button 206 is, optionally, used to turn the power on/off on the electronic device by depressing the button and holding the button in the depressed state for a predefined time interval; to lock the electronic device by depressing the button and releasing the button before the predefined time interval has elapsed; and/or to unlock the electronic device or initiate an unlock process. In some embodiments, the electronic device 100 also accepts verbal input for activation or deactivation of some functions through microphone 113. The electronic device 100 also, optionally, includes one or more contact intensity sensors 165 for detecting intensity of contacts on touch-sensitive display system 112 and/or one or more tactile output generators 163 for generating tactile outputs for a user of the electronic device 100.

FIG. 3 is a block diagram of an example multifunction device 300 with a display and a touch-sensitive surface in accordance with some embodiments. The electronic device 300 need not be portable. In some embodiments, the electronic device 300 is a laptop computer, a desktop computer, a tablet computer, a multimedia player device, a navigation device, an educational device (such as a child's learning toy), a gaming system, or a control device (e.g., a home or industrial controller). The electronic device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on the electronic device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of the portable multifunction device 100 (FIG. 1A), or a subset thereof. Furthermore, memory 370 optionally stores additional programs, modules, and data structures not present in memory 102 of the portable multifunction device 100. For example, memory 370 of device 300 optionally stores drawing module 380, presentation module 382, word processing module 384, website creation module 386, disk authoring module 388, and/or spreadsheet module 390, while memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
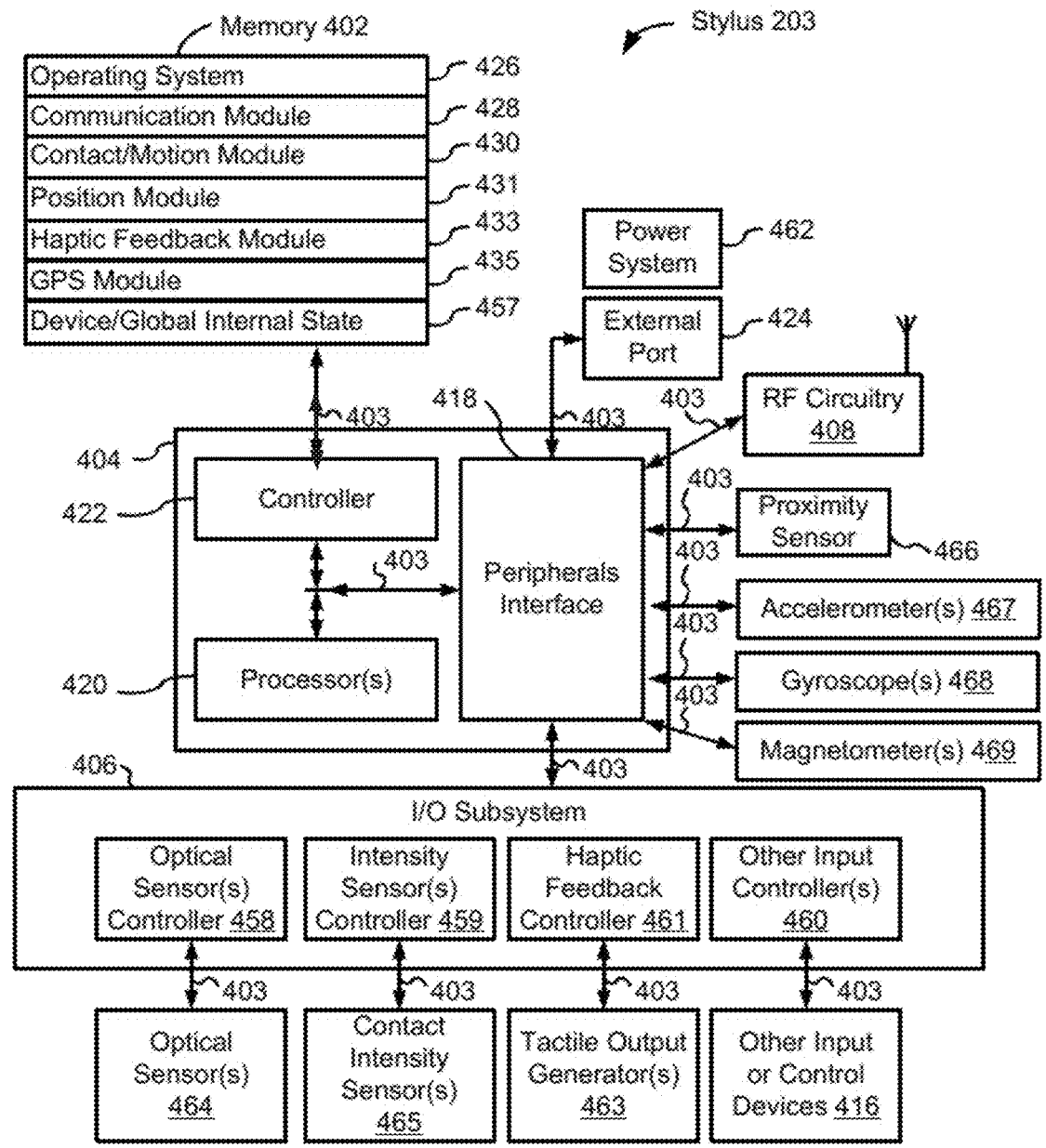
FIG. 4 is a block diagram of an example electronic stylus in accordance with some embodiments.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on the electronic device 100 (e.g., when stylus 203 is used with a touch-sensitive surface such as touch-sensitive display system 112 of the electronic device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random-access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 detects and sends RF signals, also called electromagnetic signals. RF circuitry 408 converts electrical signals to/from electromagnetic signals and communicates with the electronic device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 detect/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 detect light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 detect contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., the electronic device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). Tactile output generator(s) 463 detect tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 469 (e.g., as part of an inertial measurement unit (IMU)) for obtaining information concerning the location and positional state of stylus 203. FIG. 4 shows sensors 467, 468, and 469 coupled with peripherals interface 418. Alternately, sensors 467, 468, and 469 are, optionally, coupled with an input controller 460 in I/O subsystem 406. Stylus 203 optionally includes a GPS (or GLONASS or other global navigation system) detector for obtaining information concerning the location of stylus 203.

Figure 5A:
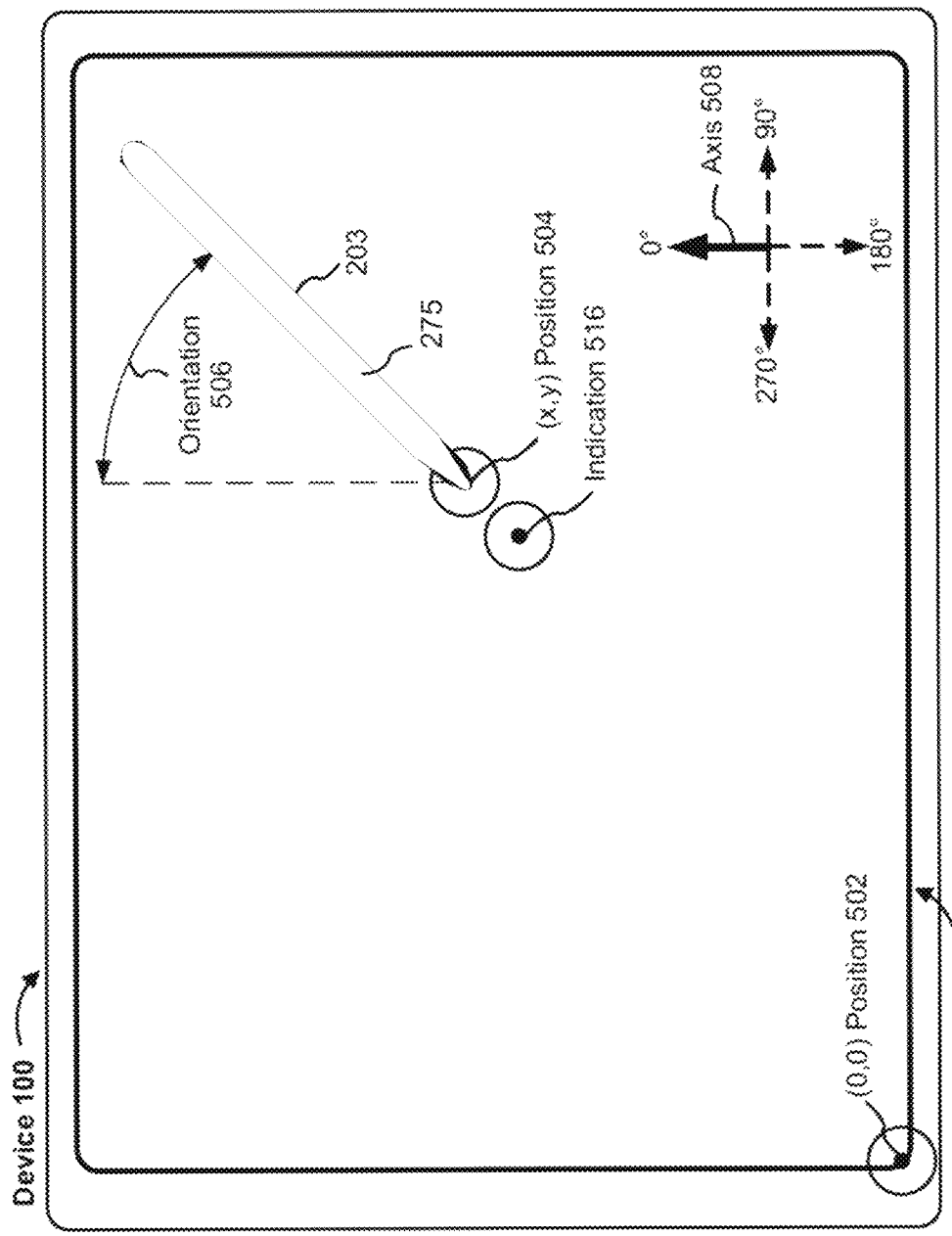
FIGS. 5A-5B illustrate a positional state of a stylus relative to a touch-sensitive surface in accordance with some embodiments.
Figure 5A:
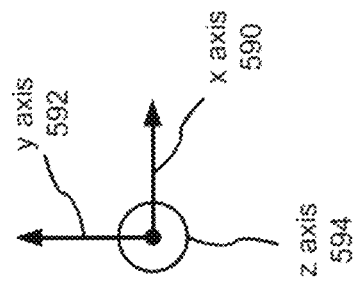
Figure 5B:
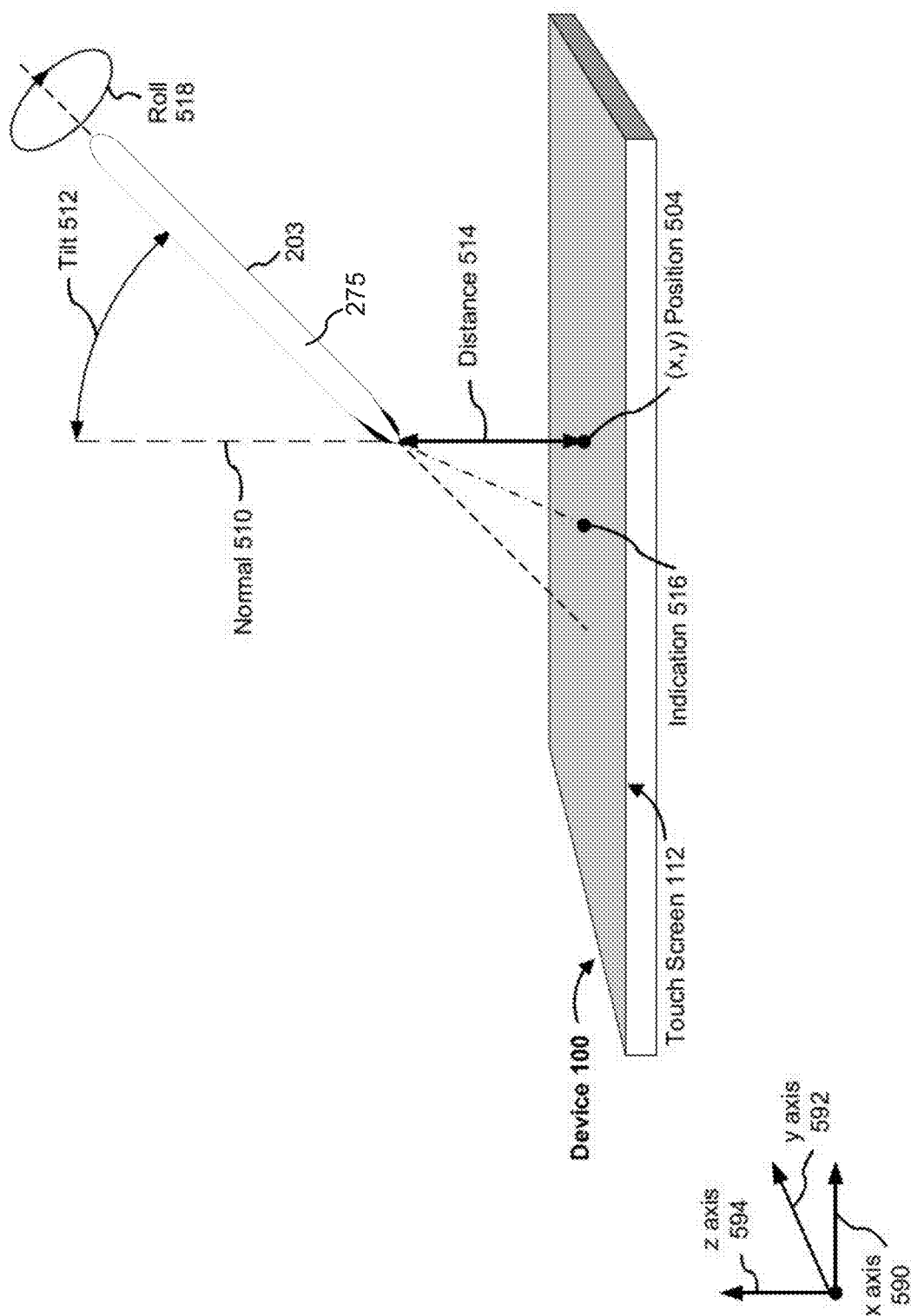

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to an electronic device (e.g., the electronic device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data detected by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of the electronic device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of the electronic device 100), and determining if the contact has ceased (e.g., detecting a lift-off event or a break in contact). In some embodiments, contact/motion module 430 detects contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the electronic device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the electronic device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the electronic device and detects changes to the positional state of the stylus relative to the electronic device. As noted above, in some embodiments, the electronic device 100 or 300 determines the positional state of the stylus relative to the electronic device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of the electronic device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., the electronic device 100). For example, the stylus measures the tilt (e.g., tilt 512, FIG. 5B) and/or the orientation (e.g., orientation 506, FIG. 5A) of the stylus and sends the measurement to the electronic device 100. In some embodiments, the positional state is detected in accordance with raw output, from one or more electrodes in the stylus, that is sensed by a touch-sensitive surface (e.g., touch screen 112 of the electronic device 100) instead of, or in combination with positional state detected in accordance with one or more measurements from stylus 203. For example, the touch-sensitive surface detects raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of the electronic device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of the electronic device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of the electronic device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on a portable multifunction device 100.

Figure 6A:
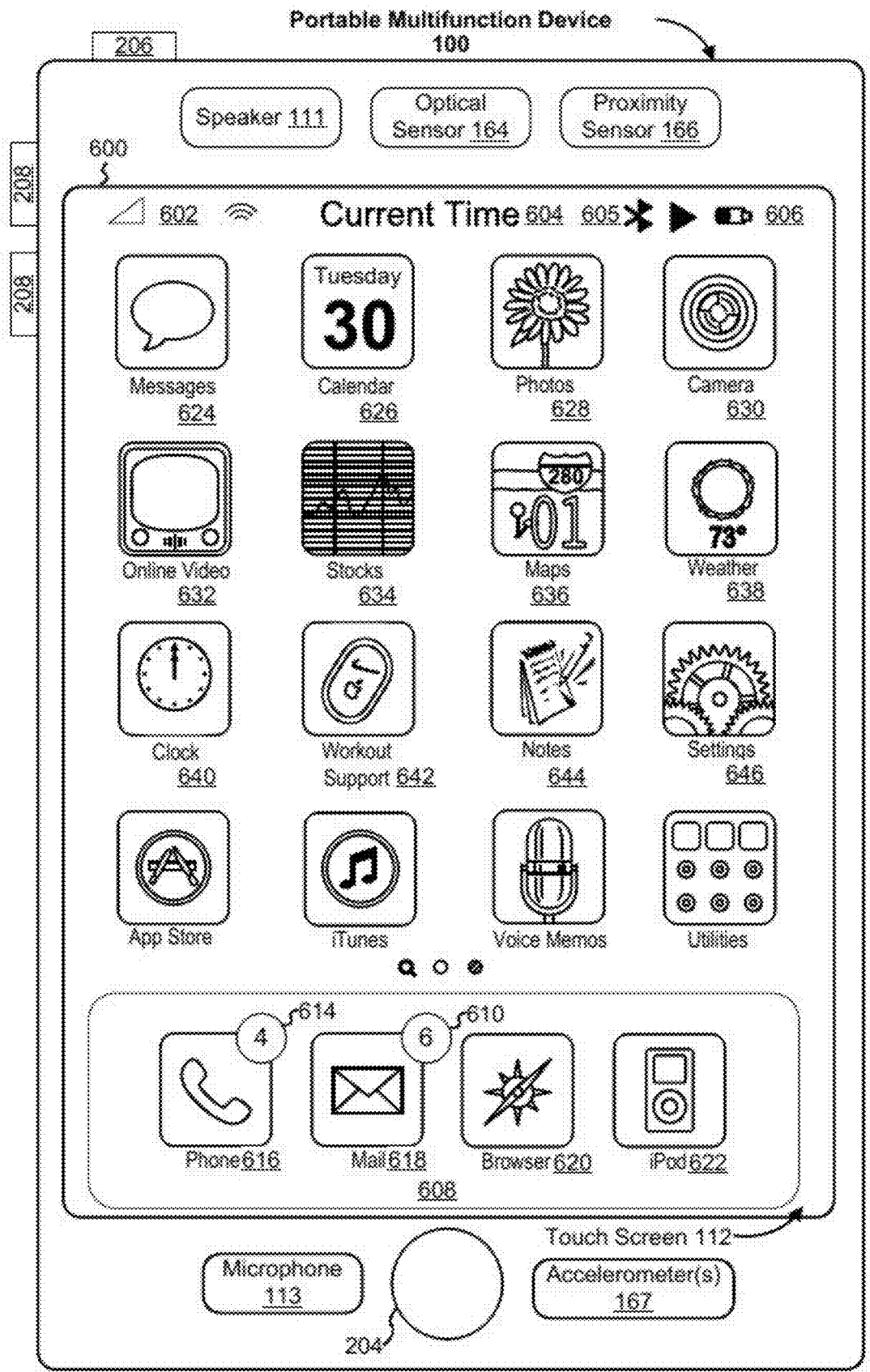
FIG. 6A illustrates an example user interface for a menu of applications on a portable multifunction device in accordance with some embodiments.

FIG. 6A illustrates an exemplary user interface for a menu of applications on the portable multifunction device 100 in accordance with some embodiments. Similar user interfaces are, optionally, implemented on the electronic device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod® (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for video editing module 155, labeled "Video Editing;"
  Icon 634 for stocks widget 149-2, labeled "Stocks;"
  Icon 636 for map module 154, labeled "Map;"
  Icon 638 for weather widget 149-1, labeled "Weather;"
  Icon 640 for alarm clock widget 149-4, labeled "Clock;"
  Icon 642 for workout support module 142, labeled "Workout Support;"
  Icon 644 for notes module 153, labeled "Notes;" and
  Icon 646 for a settings application or module, which provides access to settings for the electronic device 100 and its various applications 136.

It should be noted that the icon labels illustrated in FIG. 6A are merely examples. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
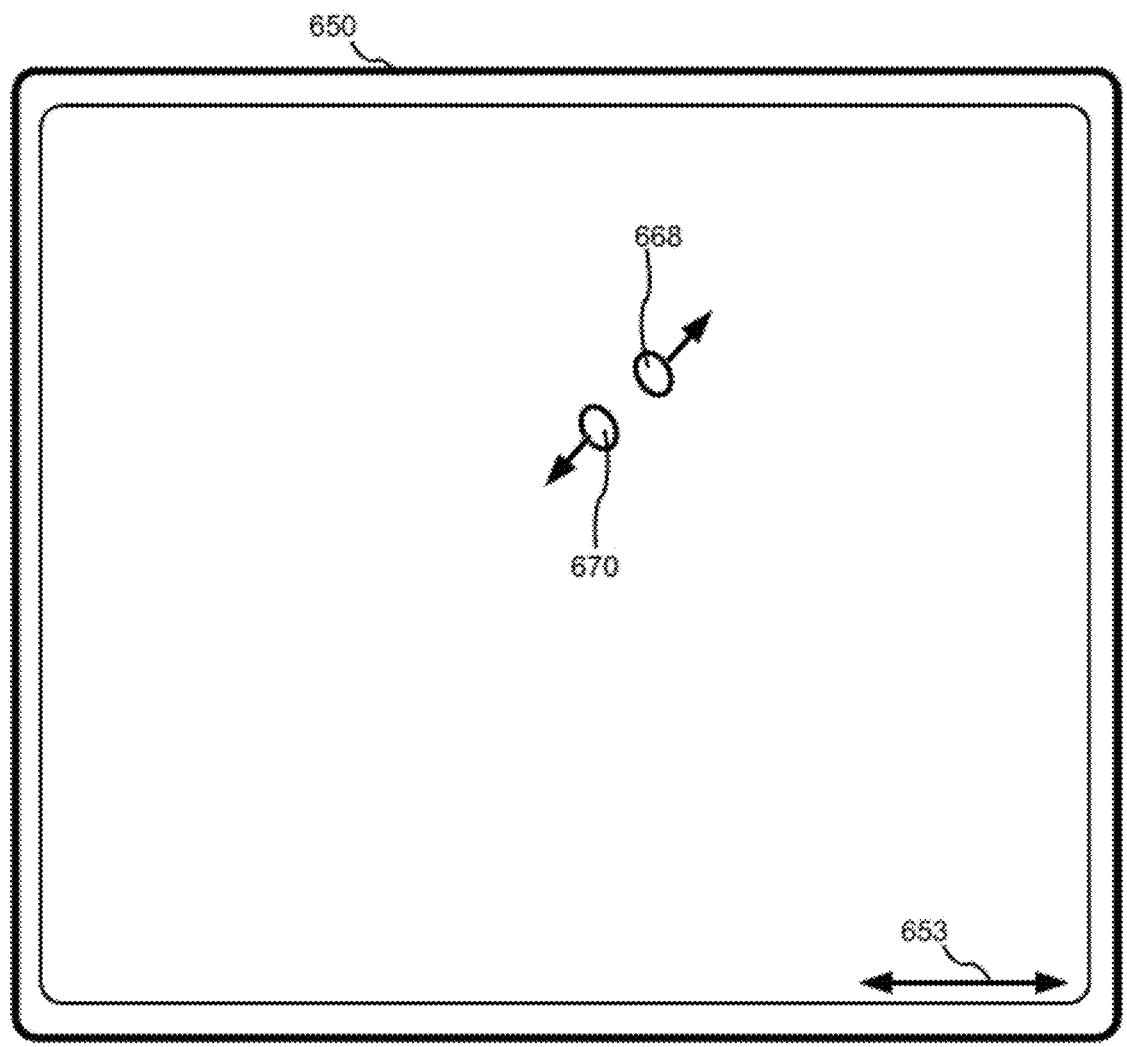
FIG. 6B illustrates an example user interface for a multifunction device with a touch-sensitive surface that is separate from the display in accordance with some embodiments.
Figure 6B:
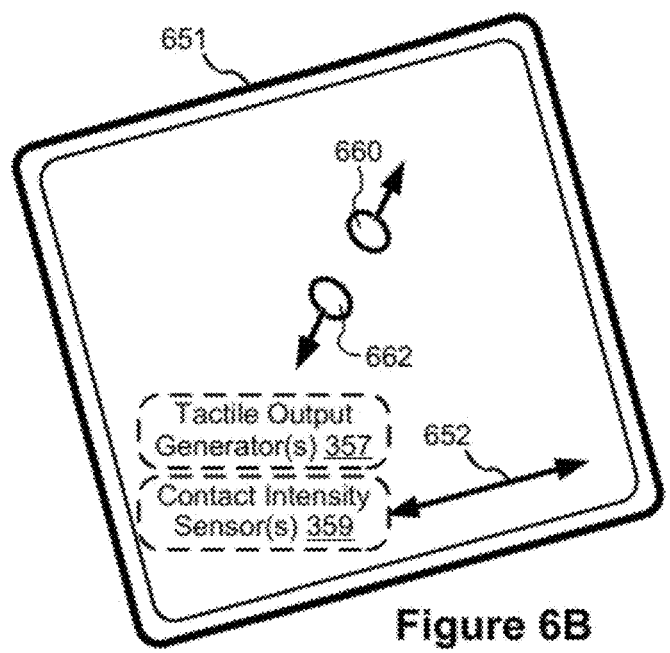

FIG. 6B illustrates an exemplary user interface on an electronic device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 357 for generating tactile outputs for a user of device 300.

FIG. 6B illustrates an exemplary user interface on an electronic device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch-sensitive surface and the display are combined), in some embodiments, the electronic device 100 detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the electronic device 100 detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the electronic device on the touch-sensitive surface (e.g., 651 in FIG. 6B) are used by the electronic device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) and/or stylus inputs, it should be understood that, in some embodiments, one or more of the finger inputs are replaced with input from another input device (e.g., a mouse-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts (or stylus contacts) are, optionally, used simultaneously.

User Interfaces and Associated Processes

Attention is now directed towards embodiments of user interfaces ("UI") and associated processes that may be implemented on an electronic device, such as the portable multifunction device 100 in FIG. 1 or the electronic device 300 in FIG. 3, with one or more processors, a non-transitory memory, one or more input devices, and a display.

FIGS. 7A-7Z are examples of user interfaces for previewing files in accordance with some embodiments. The user interfaces in these figures are used to illustrate the processes described below, including the processes in FIGS. 9A-9C. In various embodiments, the electronic device 100 manipulates a user interface based on one or more detected inputs.

As illustrated in FIG. 7A, the electronic device 100 displays a user interface 702. The user interface 702 includes three file browsing user interfaces: a dock 704, a file manager 703 (sometimes referred to herein as a window 703) corresponding to "Nature Folder," and a desktop 705 including a file "Walden excerpt.pdf" 706. One of ordinary skill in the art will appreciate that the user interface 702 may include any number and type(s) of file browsing user interfaces.

The file manager 703 includes a favorites dock 703a, a file window pane 703b including file representations corresponding to files in a "Nature Folder," and a preview pane 703c. Specifically, the plurality of file representations correspond to files: "Ocean Sounds.mp3," "Alice.pdf," "Rustling leaves.mov," "Bird song.mp3," and "Park.jpeg." In some embodiments, as illustrated in FIG. 7A, the plurality of representations of files are included within the file window pane 703b. One of ordinary skill in the art will appreciate that the file manager 703 may include any number of window panes configured in any manner and/or representations of files corresponding to any file type(s) files. The file manager 703 additionally includes a preview affordance 703d provided for displaying an enlarged preview of one or more files.

Figure 7B:
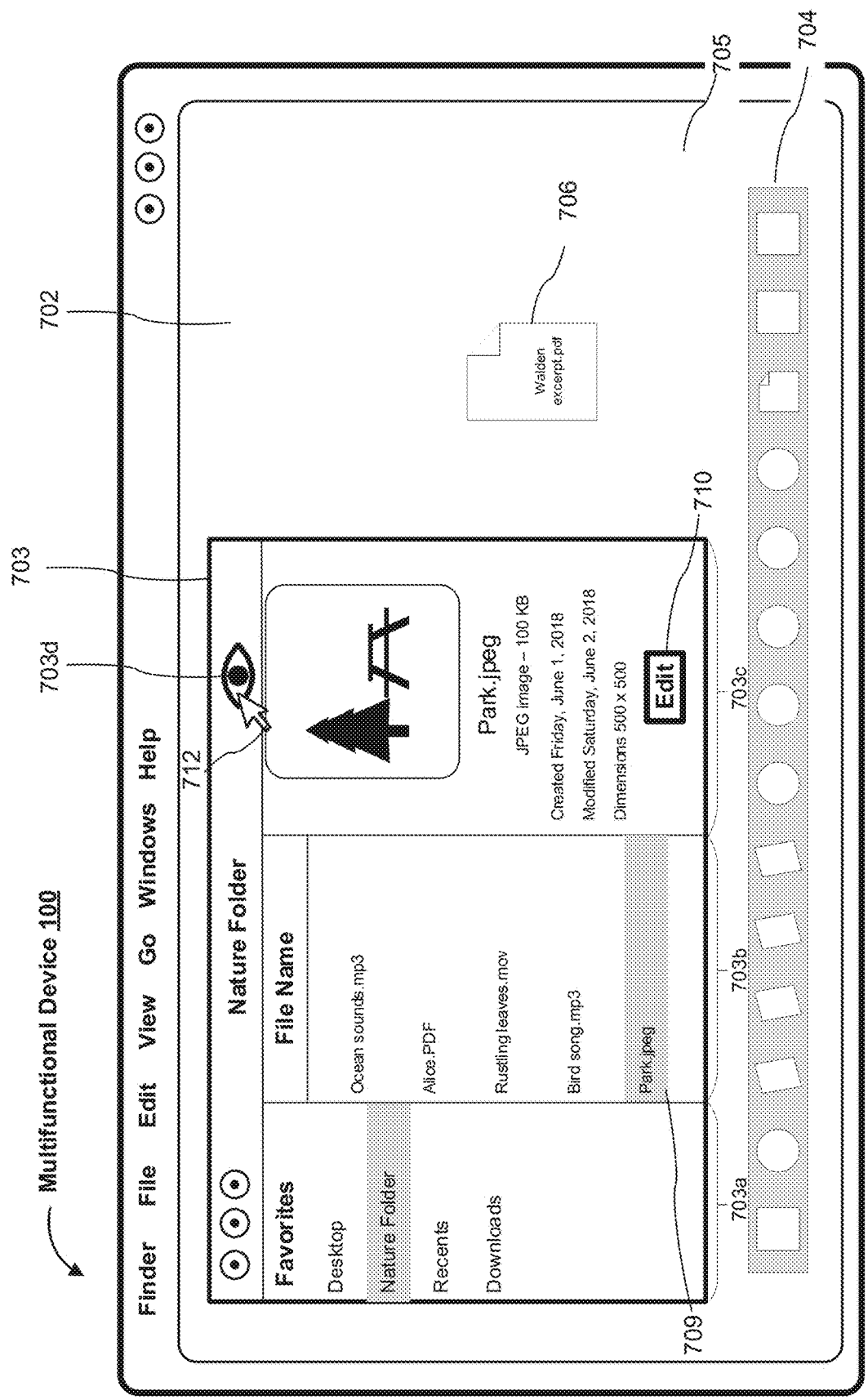

As further illustrated in FIG. 7A, the electronic device 100 detects an input 708 directed to the file representation of image file "Park.jpeg." In response to detecting the input 708, in FIG. 7B the electronic device 100 displays within the preview pane 703c a preview (e.g., thumbnail) of "Park.jpeg" along with some metadata associated with "Park.jpeg." One of ordinary skill in the art will appreciate that the preview and/or the metadata may vary. The preview pane 703c also includes an edit affordance 710, the functionality of which will be described in numerous examples below. In further response to detecting the input 708 corresponding to the representation of "Park.jpeg", the electronic device 100 displays a highlight 709 on the representation in FIG. 7B.

Figure 7C:
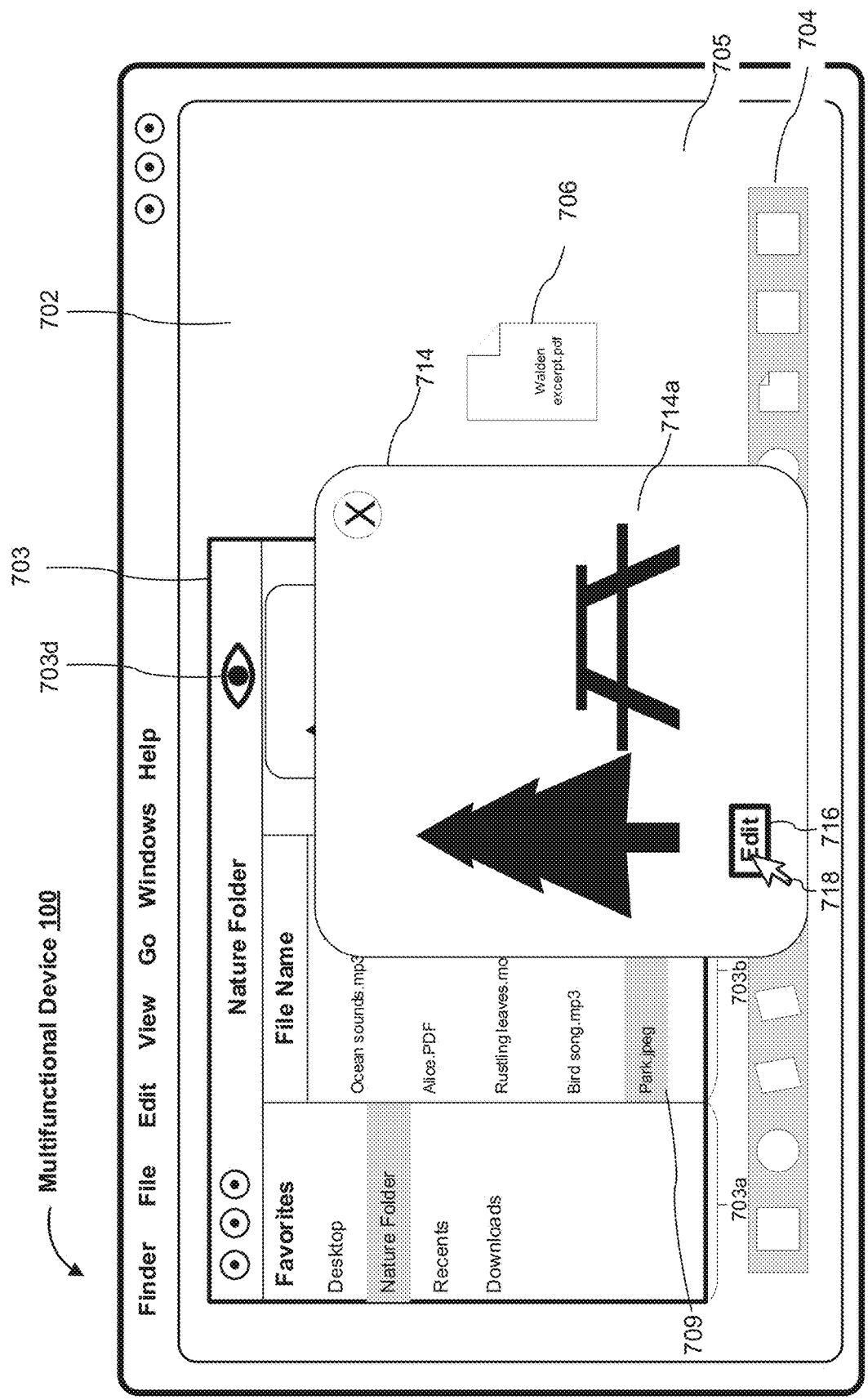

As further illustrated in FIG. 7B, the electronic device 100 detects an input 712 directed to the preview affordance 703d. In response to detecting the input 712 in FIG. 7B, the electronic device 100 displays an image preview window 714 of the "Park.jpeg" file, as illustrated in FIG. 7C. The preview window 714 includes a content preview (e.g., enlarged preview) 714a of "Park.jpeg" and an edit affordance 716.

As further illustrated in FIG. 7C, the electronic device 100 detects an input 718 directed to the edit affordance 716. In some embodiments, the electronic device 100 determines whether the input 718 is of a first input type corresponding to a request to display a preview of the "Park.jpeg" file.

Figure 7D:
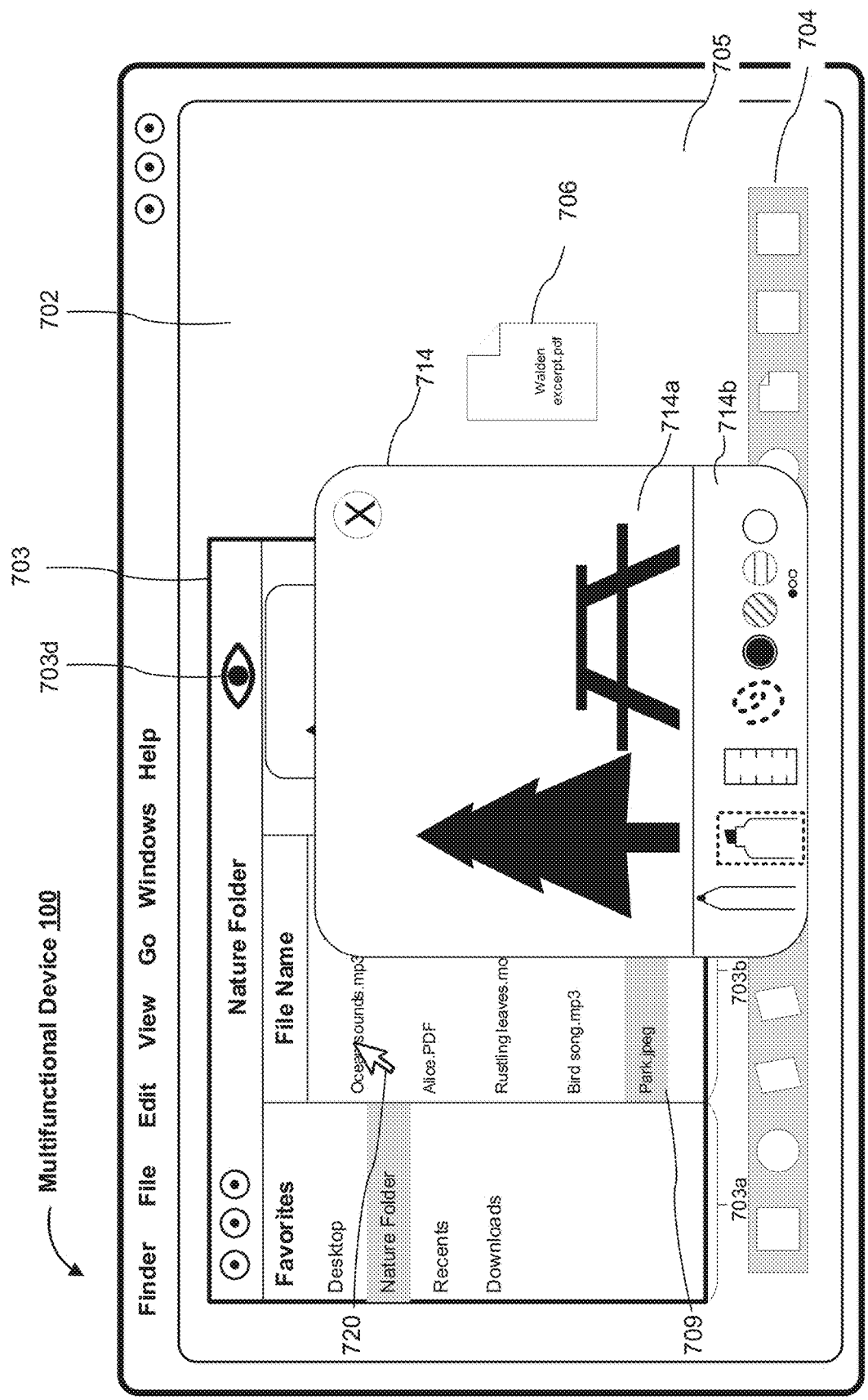

In accordance with a determination that the file includes content of a first type, the electronic device 100 displays a first set of one or more selectable affordances for performing actions associated with the first file. In accordance with a determination that the file includes content of a second type, the electronic device 100 displays a second set of one or more selectable affordances for performing actions associated with the file. As illustrated in FIG. 7D, in response to determining that the input 718 is of the first input type, the electronic device 100 concurrently displays a content preview 714a of the "Park.jpeg" file and one or more selectable affordances 714b for performing actions associated with the content preview.

The particular set of affordances depends on the file type. For example, as illustrated in FIG. 7D, because the file type is an image file, the electronic device 100 displays affordances 714b for editing the image file, such as pen and highlighter tools for marking up the image. One of ordinary skill in the art will appreciate that the affordances may include any affordance(s) that are sensible for editing and/or otherwise interacting with the content preview.

Figure 7E:
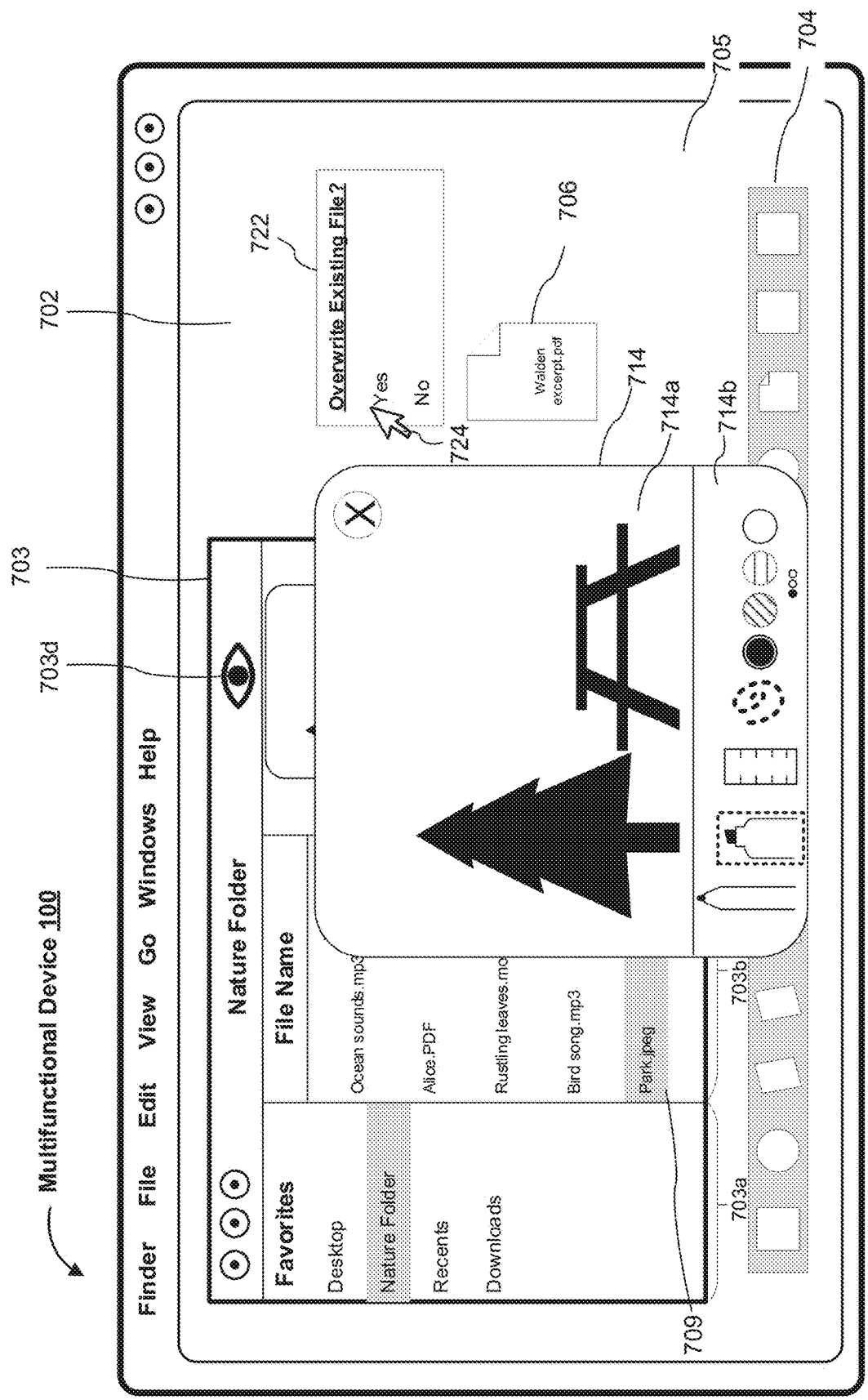

As further illustrated in FIG. 7D, the electronic device 100 detects an input 720 directed to the file representation of audio file "Ocean sounds.mp3." In response to detecting the input 720 in FIG. 7D, the electronic device 100 displays a save prompt 722 provided to enable overwriting of the file being previewed, as illustrated in FIG. 7E. Accordingly, the user interface provides an efficient mechanism for saving files edited within the preview window 714.

Figure 7F:
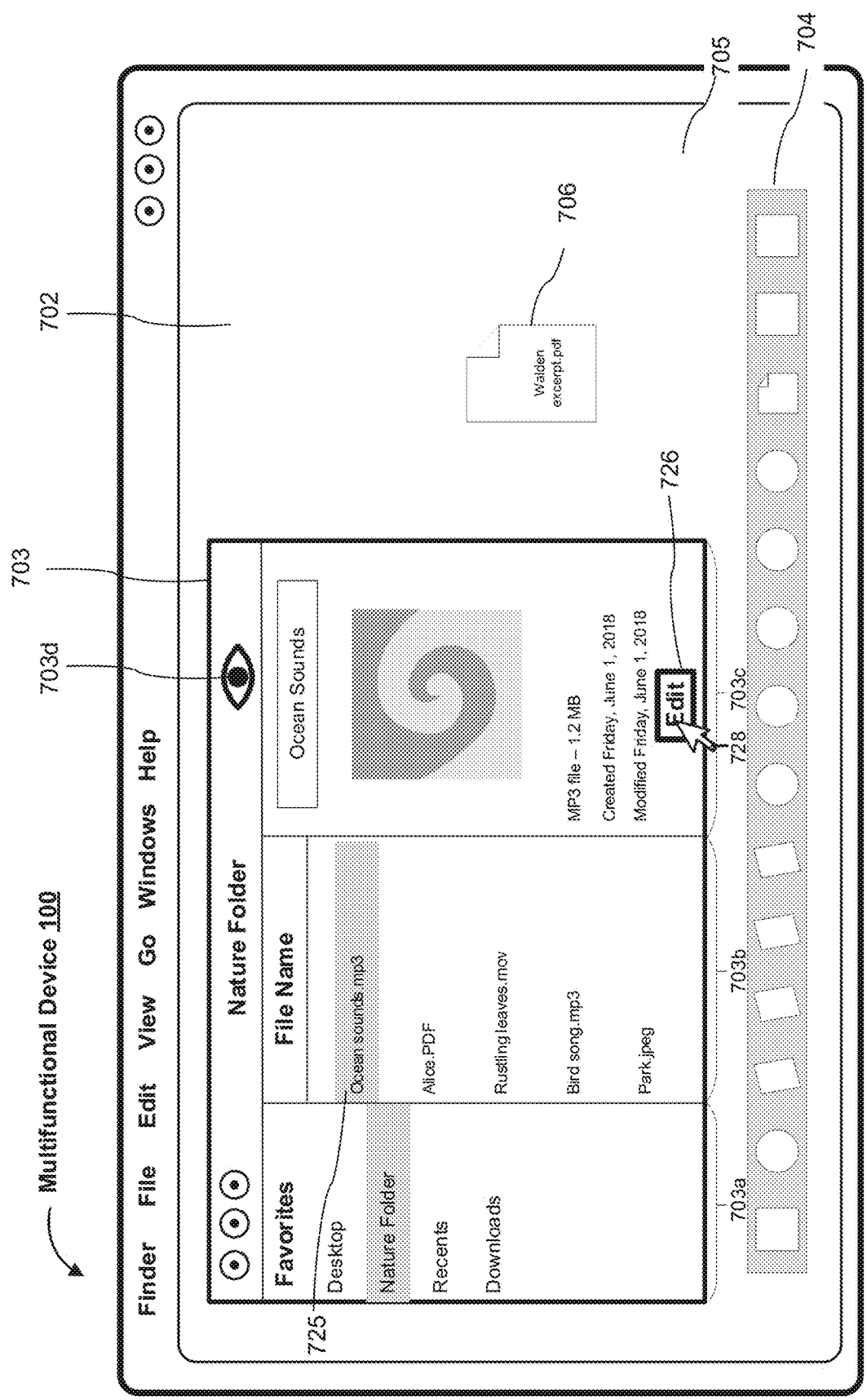

As further illustrated in FIG. 7E, the electronic device 100 detects an input 724 corresponding to a request to overwrite "Park.jpeg." In response to detecting the input 724, the electronic device 100 overwrites "Park.jpeg," although overwriting does not change the content of "Park.jpeg" because no edits were made to the content preview 714a of "Park.jpeg" in the preview window 714. In further response to detecting the input 724, the electronic device 100 displays a highlight 725 on the representation of "Ocean sounds.mp3," as illustrated in FIG. 7F. Moreover, the electronic device 100 ceases display of content of "Park.jpeg" in the preview pane 703c and displays content of "Ocean sounds.mp3." The electronic device 100 further displays an associated edit affordance 726 in the preview pane 703c, as illustrated in FIG. 7F. The content related to "Ocean sounds.mp3" corresponds to an image that resembles an ocean wave, which is based on the title of the audio file. In some embodiments, the electronic device 100 retrieves content (e.g., image, audio, video) that is pertinent to the file, from, for example, a database (e.g., the Internet). In some embodiments, the content corresponds to an animation, such as an animation that moves based on a feature of the song file (e.g., the beat of the song).

Figure 7G:
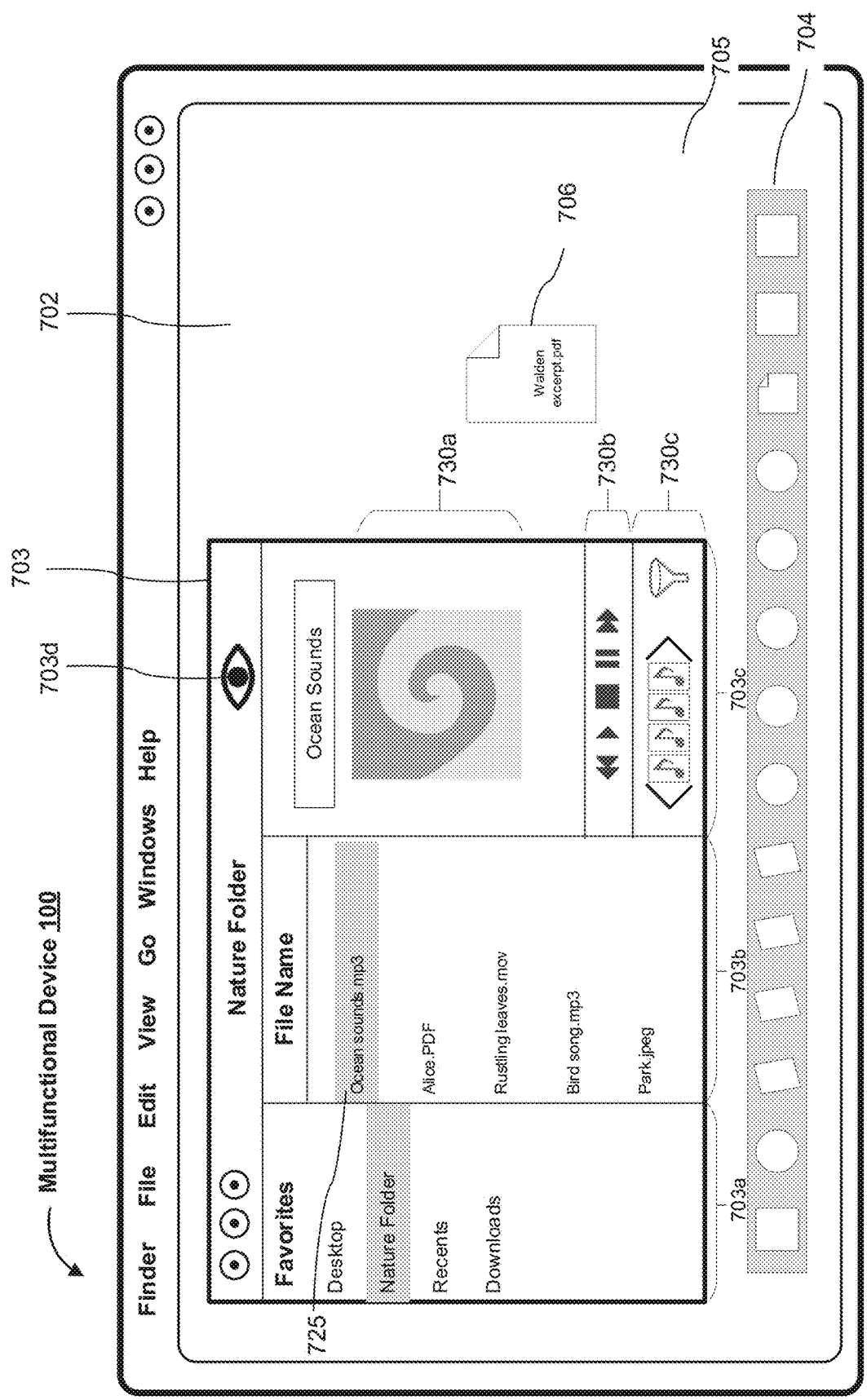

As further illustrated in FIG. 7F, the electronic device 100 detects an input 728 corresponding to the edit affordance 726. As illustrated in FIG. 7G, in response to detecting the input 728, the electronic device 100 concurrently displays, within the preview pane 703c, a content preview 730a of "Ocean sounds.mp3," along with a first set of selectable affordances 730b and a second set of selectable affordances 730c for performing actions associated with the file. In some embodiments, the electronic device 100 concurrently displays a preview of file content and associated affordances in a window pane different from the preview pane 703c. In some embodiments, after displaying the preview of file content and the associated affordances within the preview pane 703c, the electronic device 100 moves and/or resizes the preview pane 703c (e.g., pops-out the preview pane 703c).

The first set of selectable affordances 730b correspond to playback affordances (e.g., rewind, play, stop, pause, fast-forward) provided to interact with "Ocean sounds.mp3." The second set of selectable affordances 730c correspond to editing affordances, including a trimming tool and a filter tool. One of ordinary skill in the art will appreciate that the selectable affordance may correspond to any type of affordance that is pertinent for interacting with the associated file.

Figure 7H:
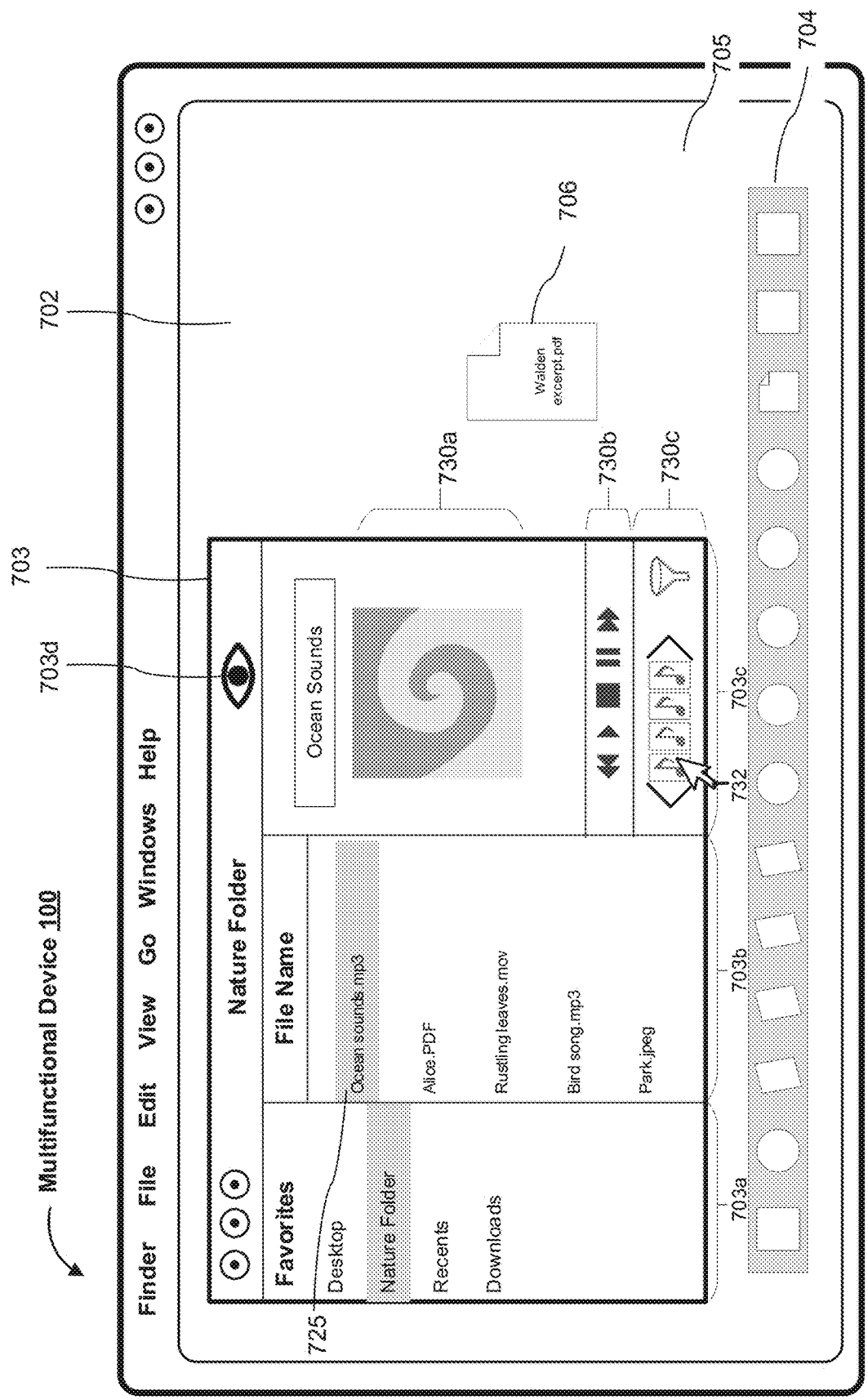
Figure 7I:
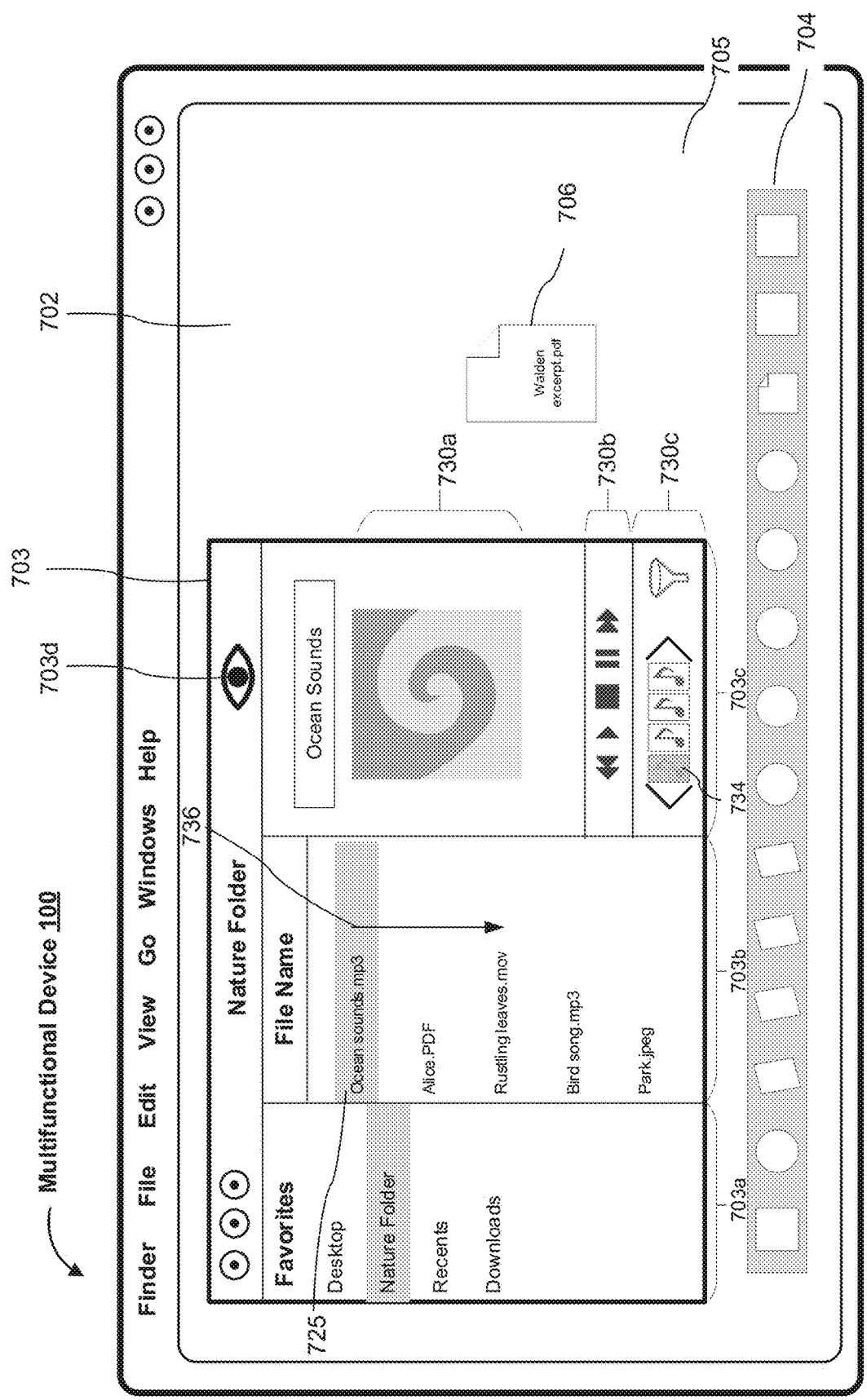

As illustrated in FIG. 7H, the electronic device 100 detects an input 732 corresponding to the trimming tool of the second set of selectable affordances 730c. Namely, the input 732 corresponds to a request to select the first portion of "Ocean Sounds.mp3," as indicated by the cursor 732 corresponding to the left-most square-note box. As illustrated in FIG. 7I, in response to detecting the input 732, the electronic device 100 displays a highlight 734 corresponding to the left-most square-note box.

Figure 7J:
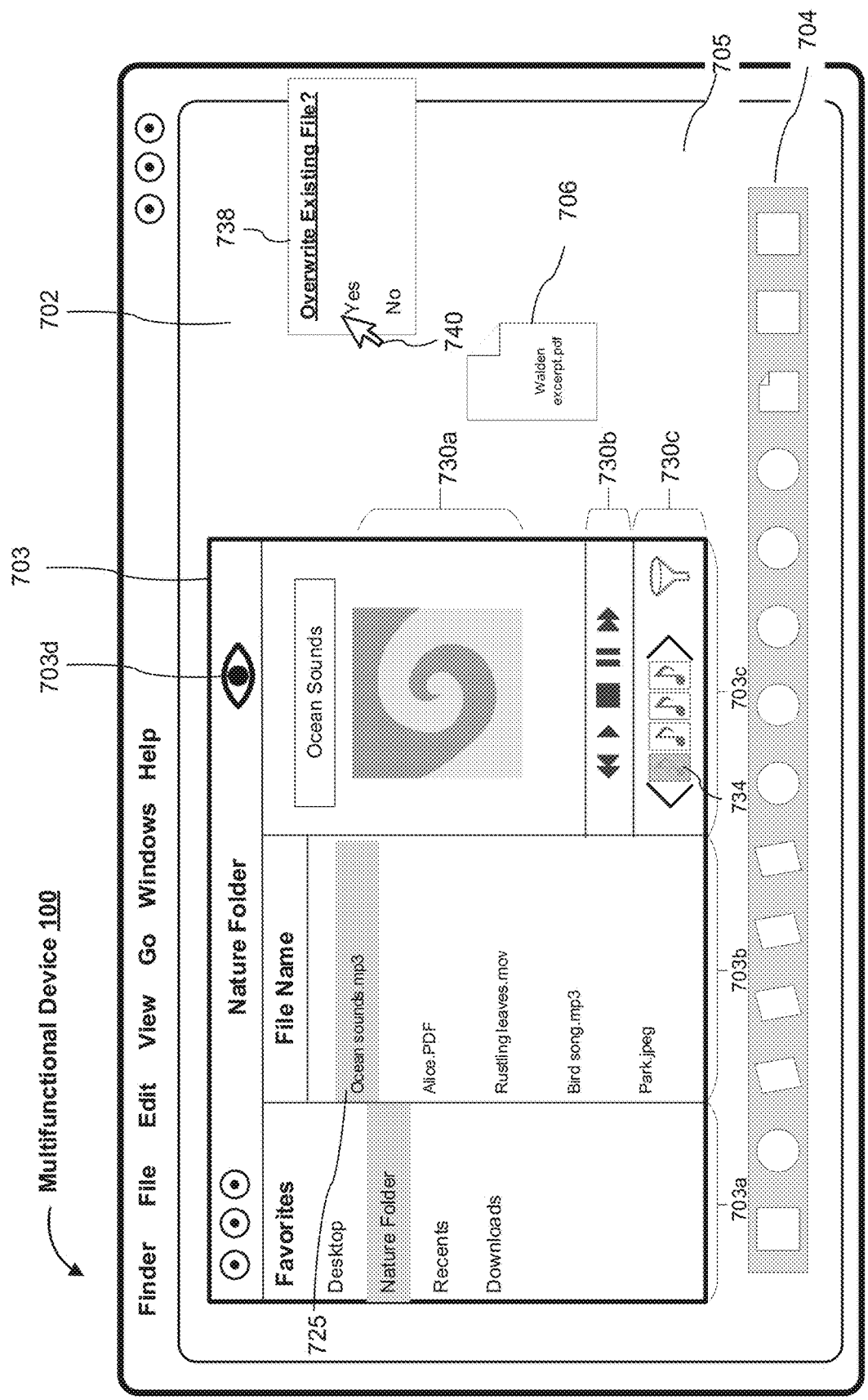

As further illustrated in FIG. 7I, the electronic device 100 detects an input 736 corresponding to a keyboard arrow-down input for requesting selection of "Rustling leaves.mov." As illustrated in FIG. 7J, in response to detecting the input 736 in FIG. 7I, the electronic device 100 displays a save prompt 738 provided to enable overwriting of the file being previewed ("Ocean Sounds.mp3"). The electronic device 100 detects an input 740 corresponding to a request to overwrite "Ocean Sounds.mp3." In response to detecting the input 740, the electronic device 100 overwrites the file.

Figure 7K:
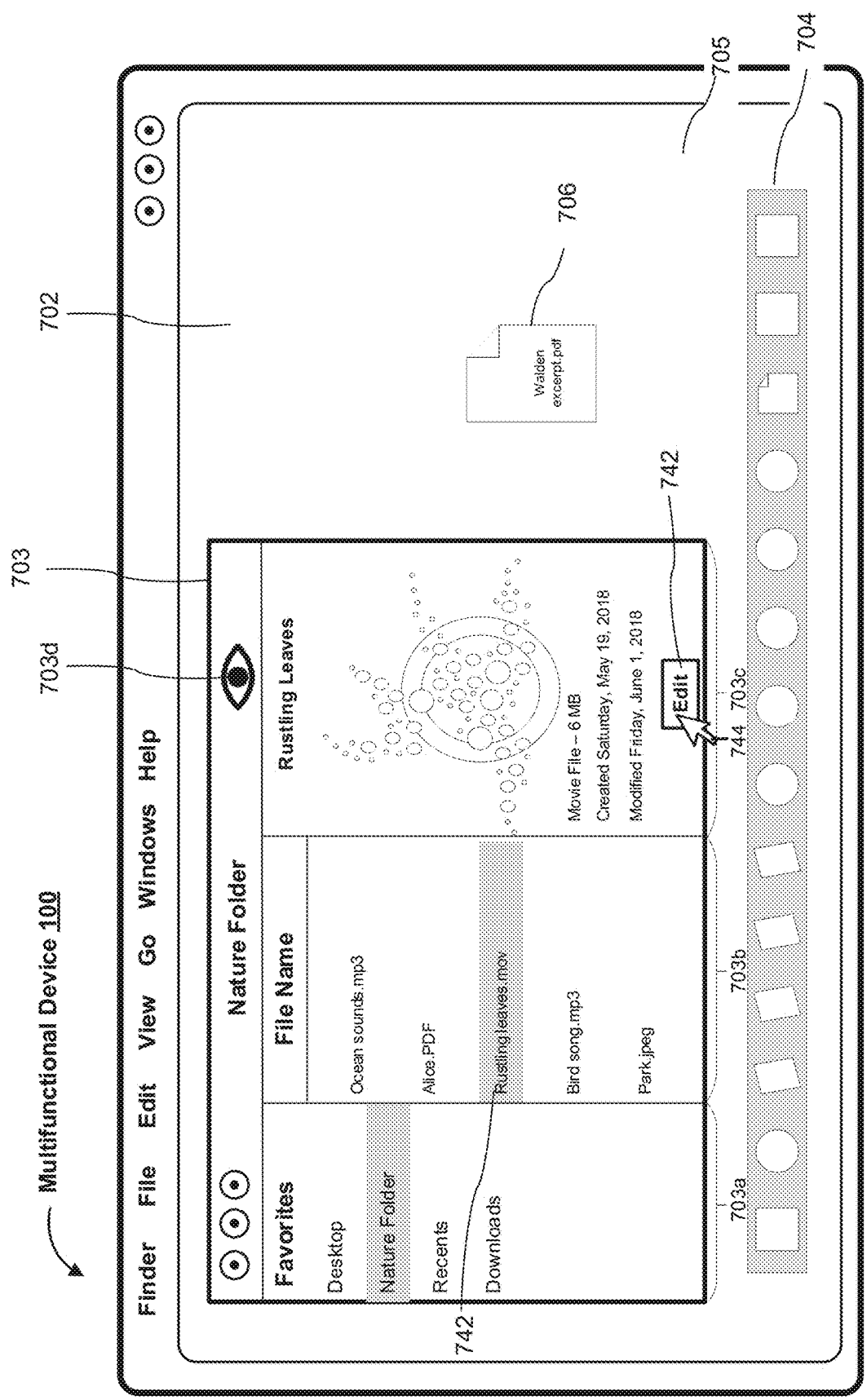

As illustrated in FIG. 7K, the electronic device 100 displays highlight 742 over the representation of "Rustling leaves.mov" in response to the corresponding input 736 in FIG. 7I. Moreover, the electronic device 100 displays content and metadata associated with "Rustling leaves.mov" in the preview pane 703c. As further illustrated in FIG. 7K, the electronic device 100 detects an input 744 corresponding to the edit affordance 742 within the preview pane 703c.

Figure 7L:
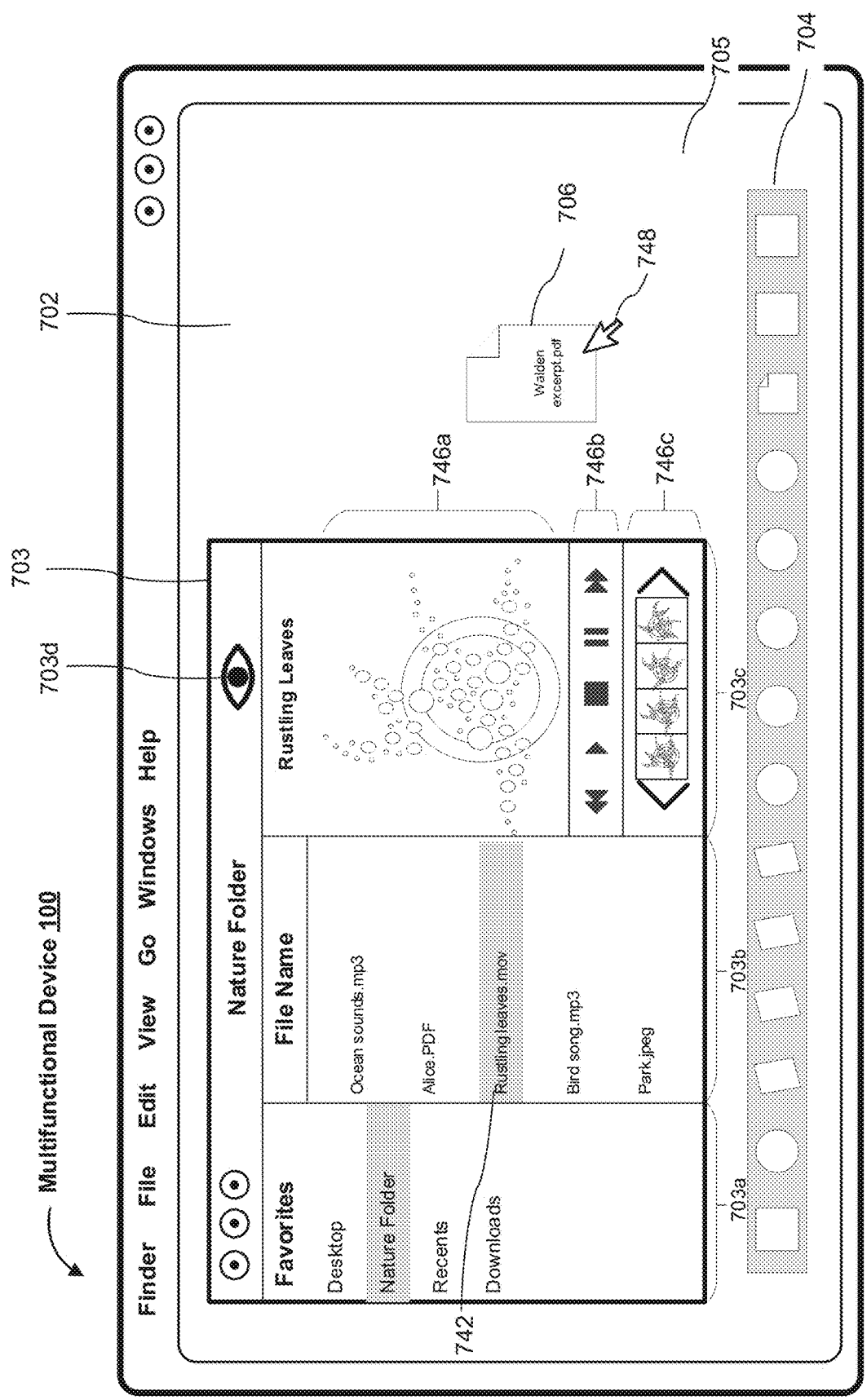

As illustrated in FIG. 7L, in response to detecting the input 744 in FIG. 7K, the electronic device 100 concurrently displays, within the preview pane 703c, a preview 746a of "Rustling leaves.mov," along with a first set of selectable affordances 746b and a second set of selectable affordances 746c for performing actions associated with the file.

The first set of selectable affordances 746b corresponds to playback affordances (e.g., rewind, play, stop, pause, fast-forward) provided to interact with "Rustling leaves.mov." The second set of selectable affordances 746c corresponds to editing affordance, including a trimming tool. One of ordinary skill in the art will appreciate that the selectable affordances may correspond to any type of affordance that is pertinent for interacting with the associated file.

As further illustrated in FIG. 7L, the electronic device 100 detects an input 748 corresponding to "Walden exerpt.pdf" 706 on the desktop 705. In response to detecting the input 748, the electronic device 100 displays a highlight of "Walden exerpt.pdf" in FIG. 7M.

Figure 7M:
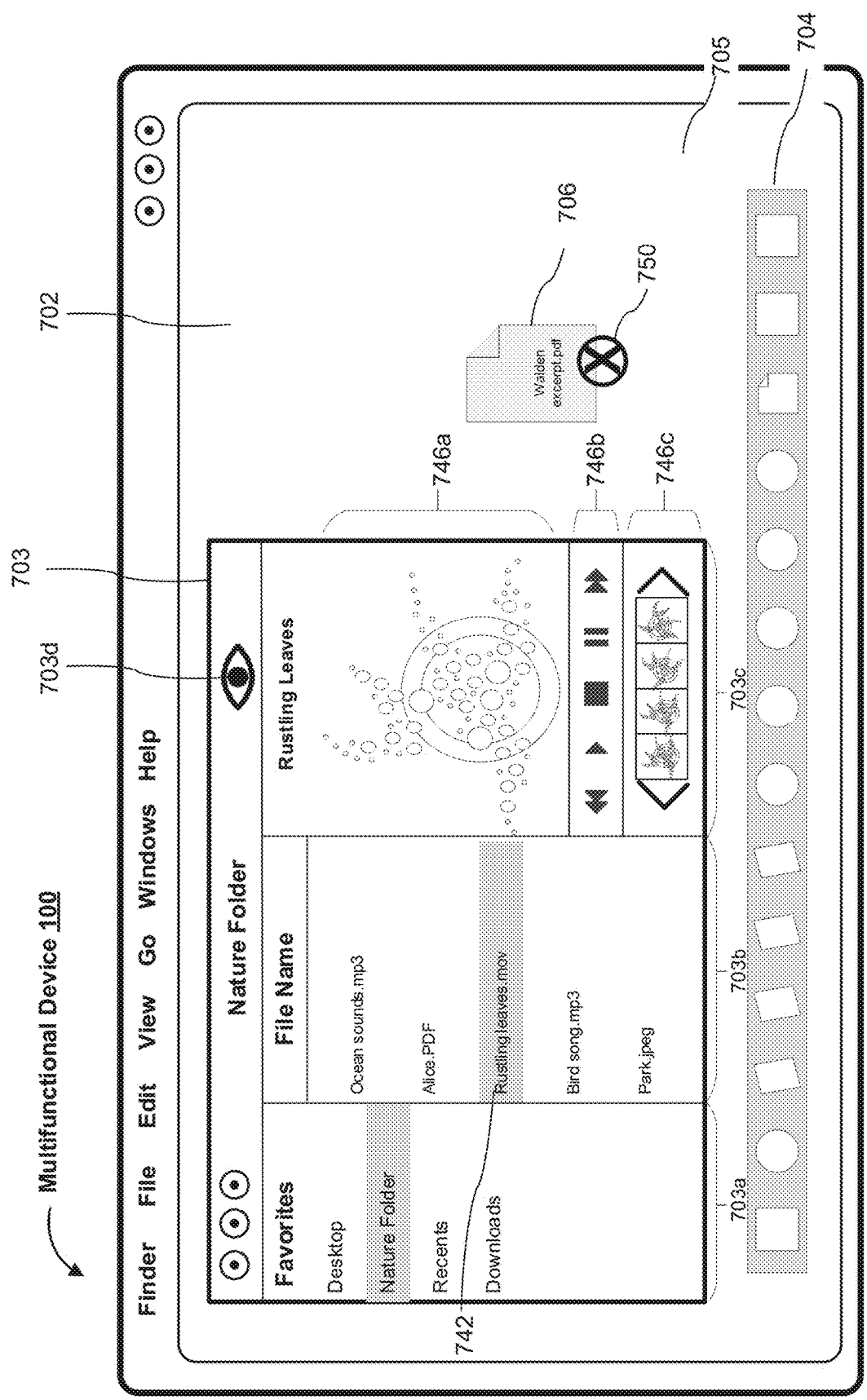
Figure 7N:
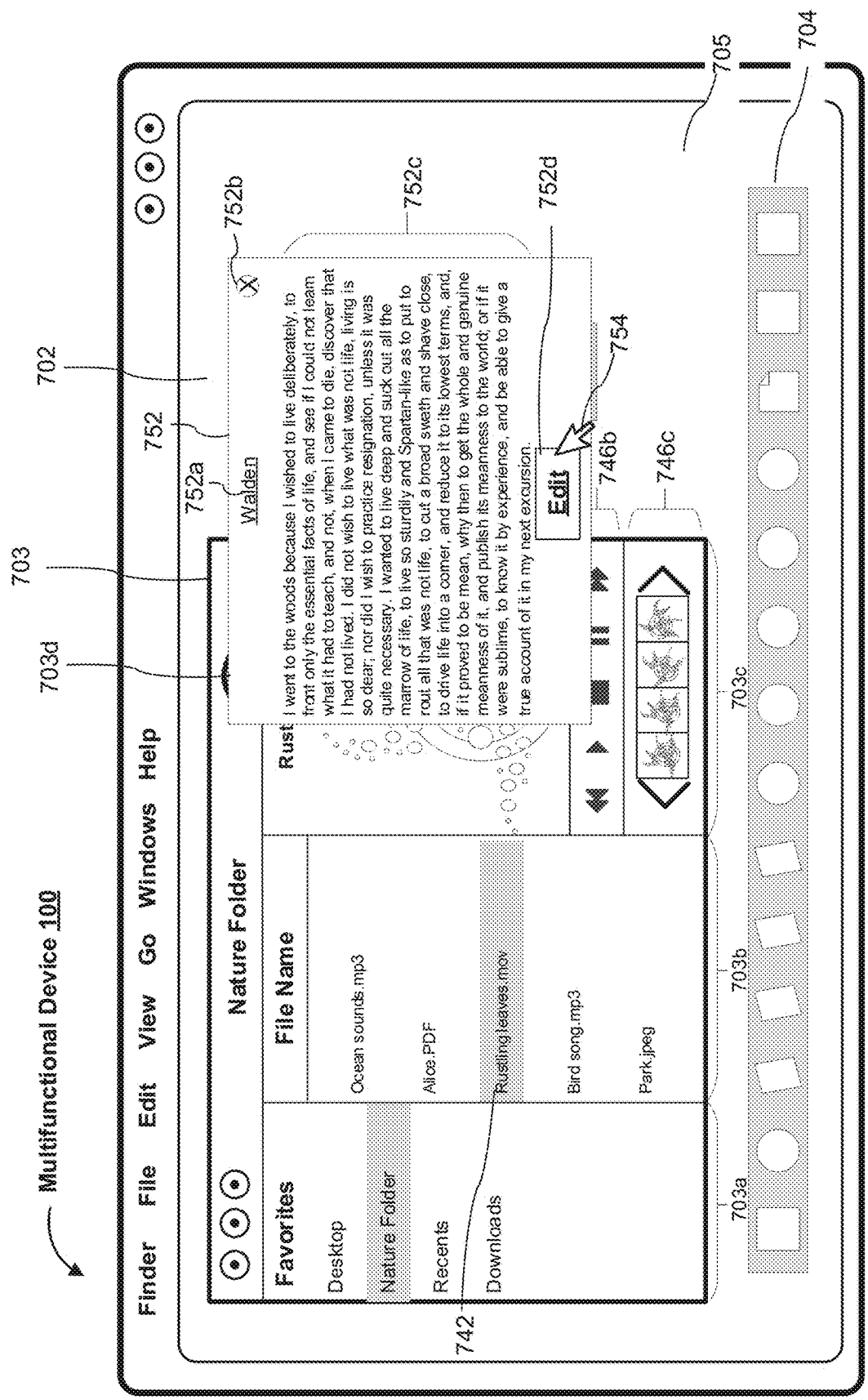
Figure 7O:
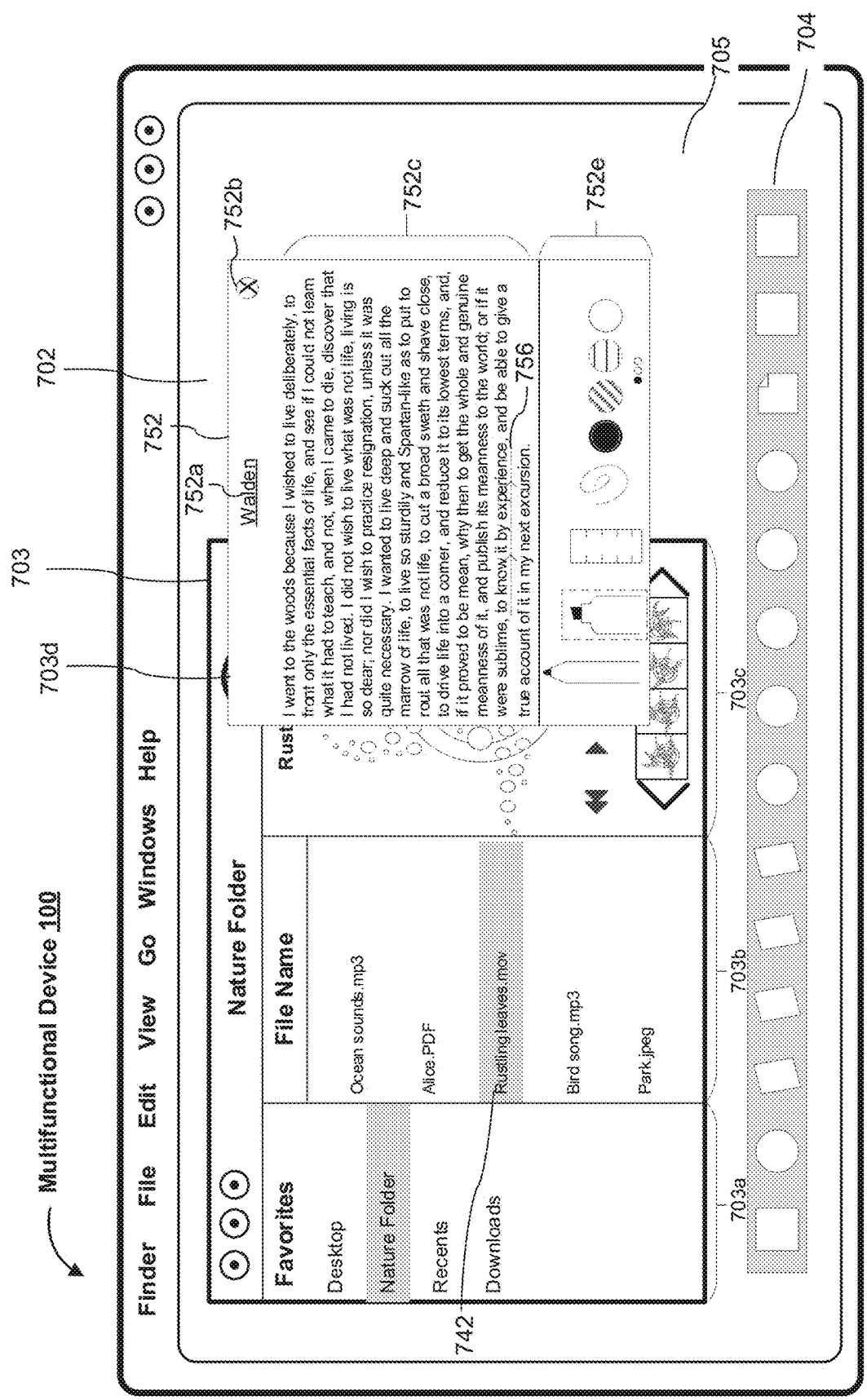

As further illustrated in FIG. 7M, the electronic device 100 detects a special input 750 (e.g., hold shift and click mouse) different from a mouse click (e.g., mouse click input 744 in FIG. 7K). The special input 750 corresponds to "Walden exerpt.pdf." As illustrated in FIG. 7N, in response to detecting the special input 750, the electronic device 100 displays a PDF preview window 752. The PDF preview window 752 includes a title 752a, a close affordance 752b provided to close the PDF preview window 752, a content preview 752c of the file, and an edit affordance 752d. As further illustrated in FIG. 7N, the electronic device 100 detects an input 754 corresponding to the edit affordance 752d. As illustrated in FIG. 7O, in response to detecting the input 754 in FIG. 7N, the electronic device 100 concurrently displays, within the PDF preview window 752, the content preview 752c and a set of affordances 752e provided for editing the PDF file. The set of affordances 752e corresponds to editing tools, such as a pencil, pen, highlighter, etc. One of ordinary skill in the art will appreciate that the set of PDF editing tools 752e may correspond to any number and type(s) of tool for interacting with the PDF content preview 752c.

In various embodiments, the electronic device 100 modifies the content preview 752c based on one or more inputs corresponding to the content preview 752c and based on the particular PDF editing tool having focus. For example, as illustrated in FIG. 7O, a highlighter tool has focus. In some embodiments, the electronic device 100 places focus on the highlighter tool based on an input, such as a mouse-click input to the electronic device 100 corresponding to the highlighter tool. In some embodiments, the electronic device 100 places focus on the highlighter tool by default. In other words, the electronic device 100 places focus on the highlighter tool in response to detecting the input 754.

Figure 7P:
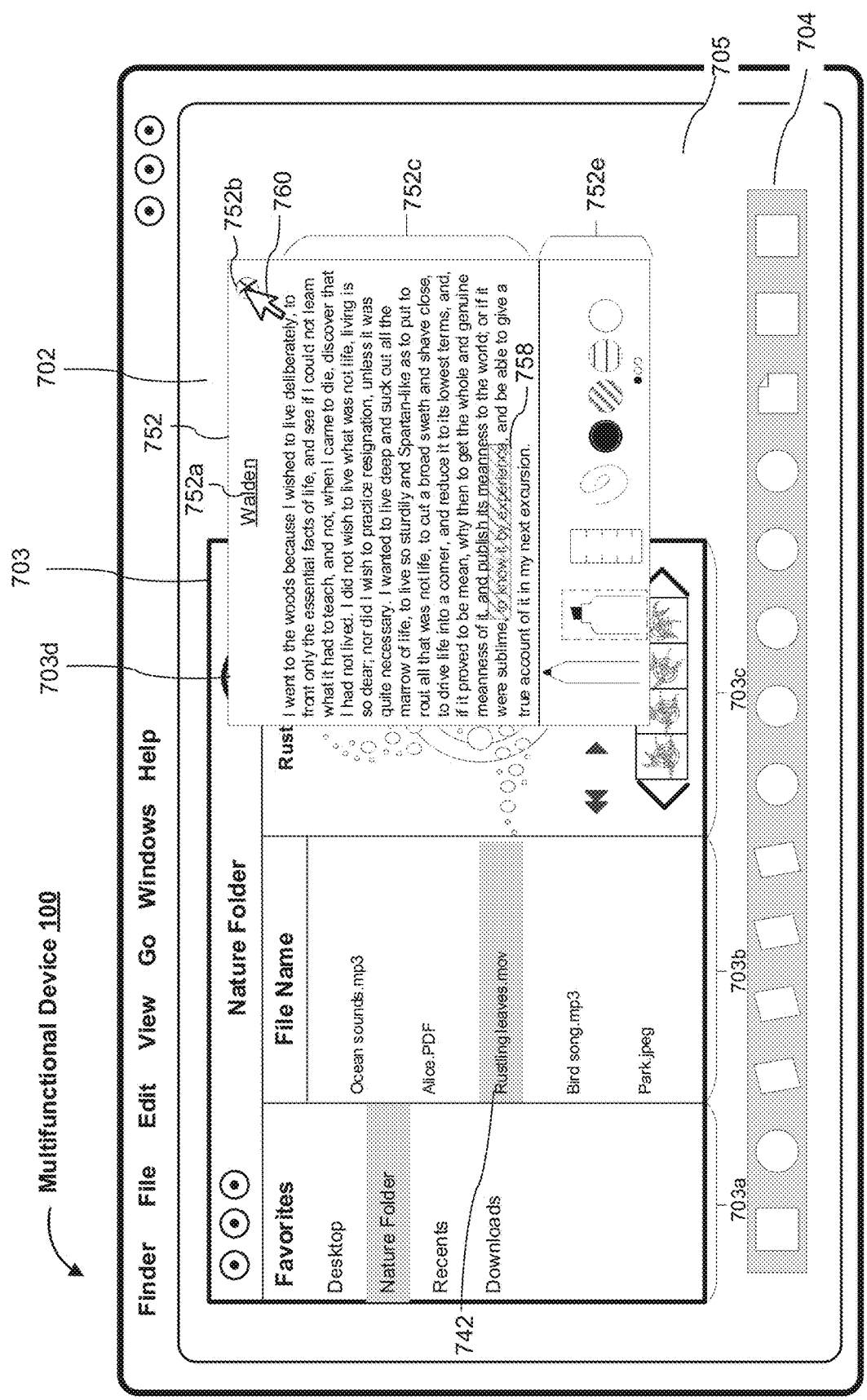

As further illustrated in FIG. 7O, the electronic device 100 detects an editing input 756 corresponding to a portion of text within the content preview 752c. In response to detecting the input 756 in FIG. 7O, the electronic device 100 modifies the content preview 752c, as illustrated in FIG. 7P. Namely, in FIG. 7P, the electronic device 100 displays a highlighted section 758 corresponding to the portion of the text selected by the editing input 756 in FIG. 7O.

Figure 7Q:
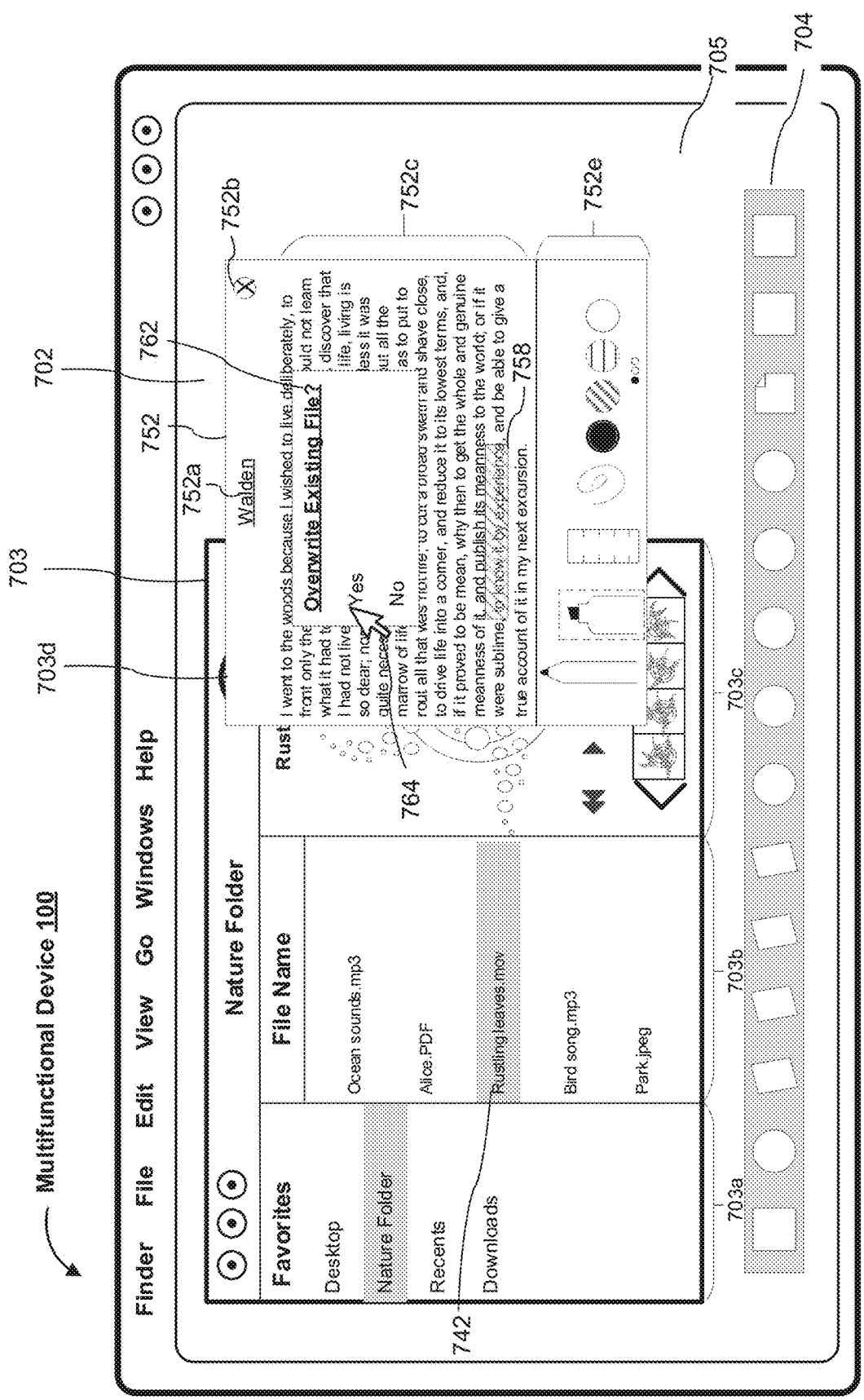

As further illustrated in FIG. 7P, the electronic device 100 detects an input 760 corresponding to the close affordance 752b. As illustrated in FIG. 7Q, in response to detecting the input 760 in FIG. 7P, the electronic device 100 displays a save prompt 762 provided to enable overwriting of the file being previewed ("Rustling Leaves.mov."). As further illustrated in FIG. 7Q, the electronic device 100 detects an input 764 corresponding to a request to overwrite "Rusting Leaves.mov." In response to detecting the input 764, the electronic device 100 overwrites the file.

Figure 7R:
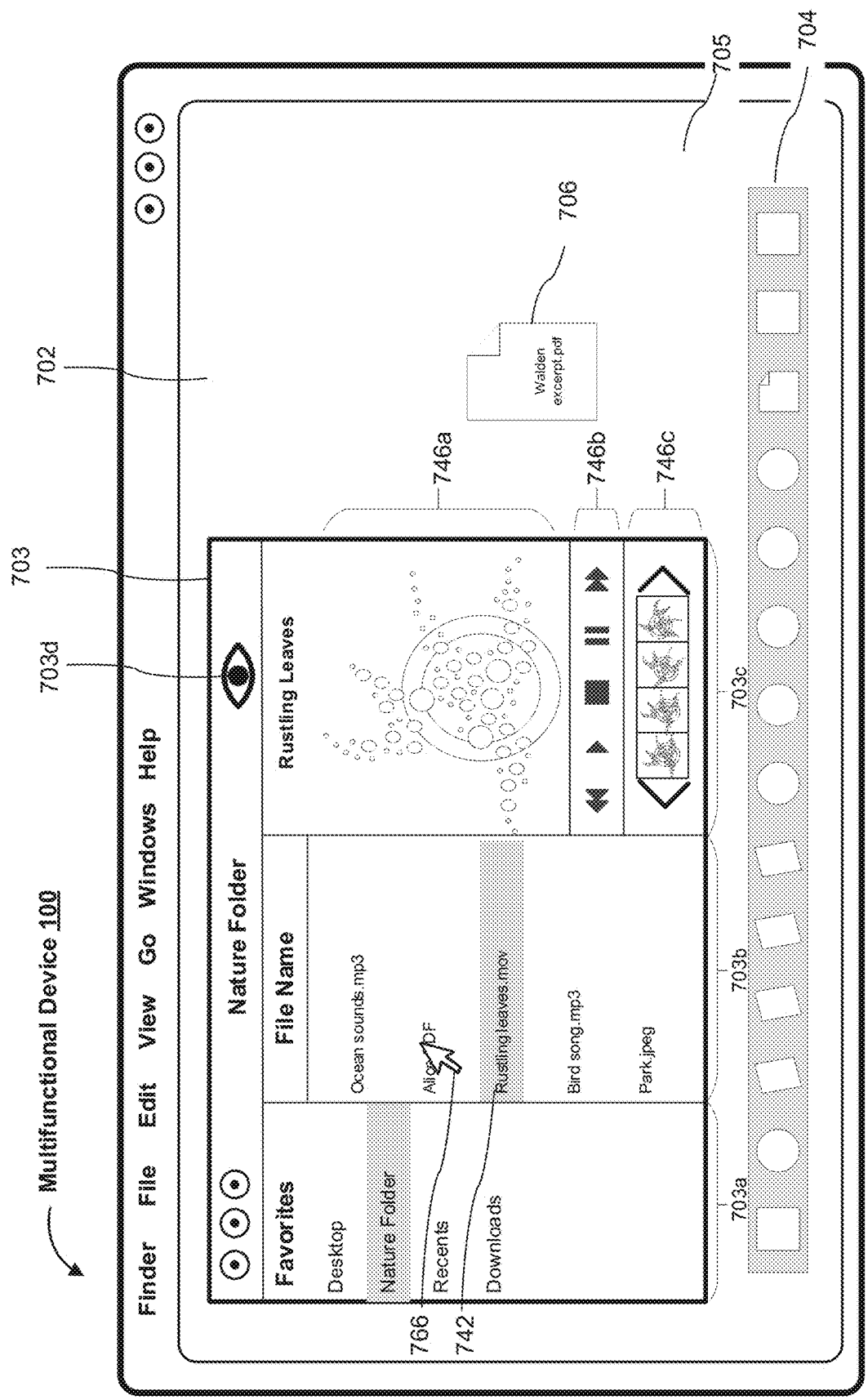

As illustrated in FIG. 7R, the electronic device 100 ceases display of the PDF preview window 752. As further illustrated in FIG. 7R, the electronic device 100 detects an input 766 directed to the file representation of "Alice.pdf." As illustrated in FIG. 7S, in response to detecting the input 766 in FIG. 7R, the electronic device 100 displays a highlight 768 on the representation of "Alice.pdf." In further response to detecting the input 766 in FIG. 7R, the electronic device 100 displays content and metadata associated with "Alice.pdf" within the preview pane 703c in FIG. 7S.

Figure 7S:
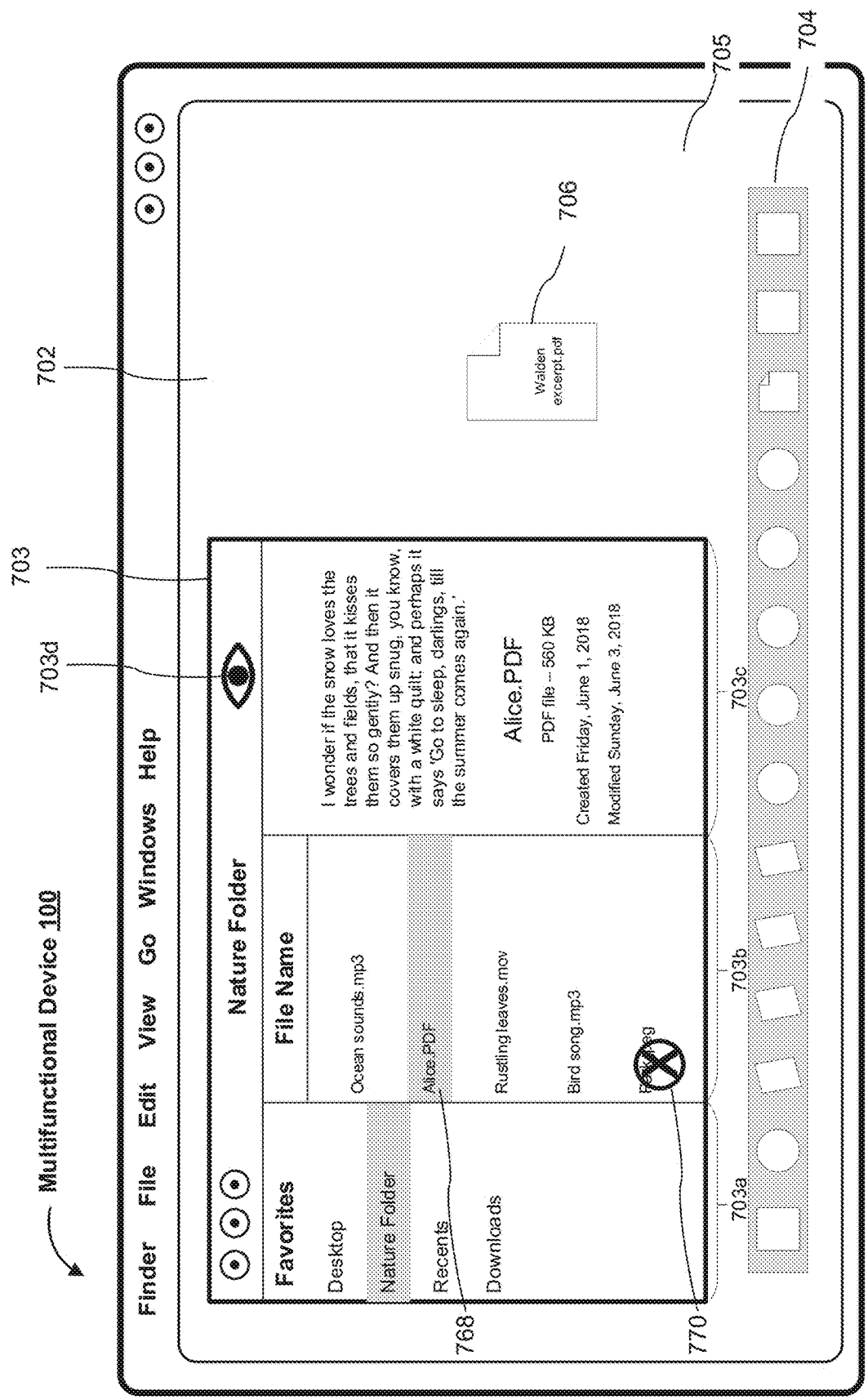
Figure 7T:
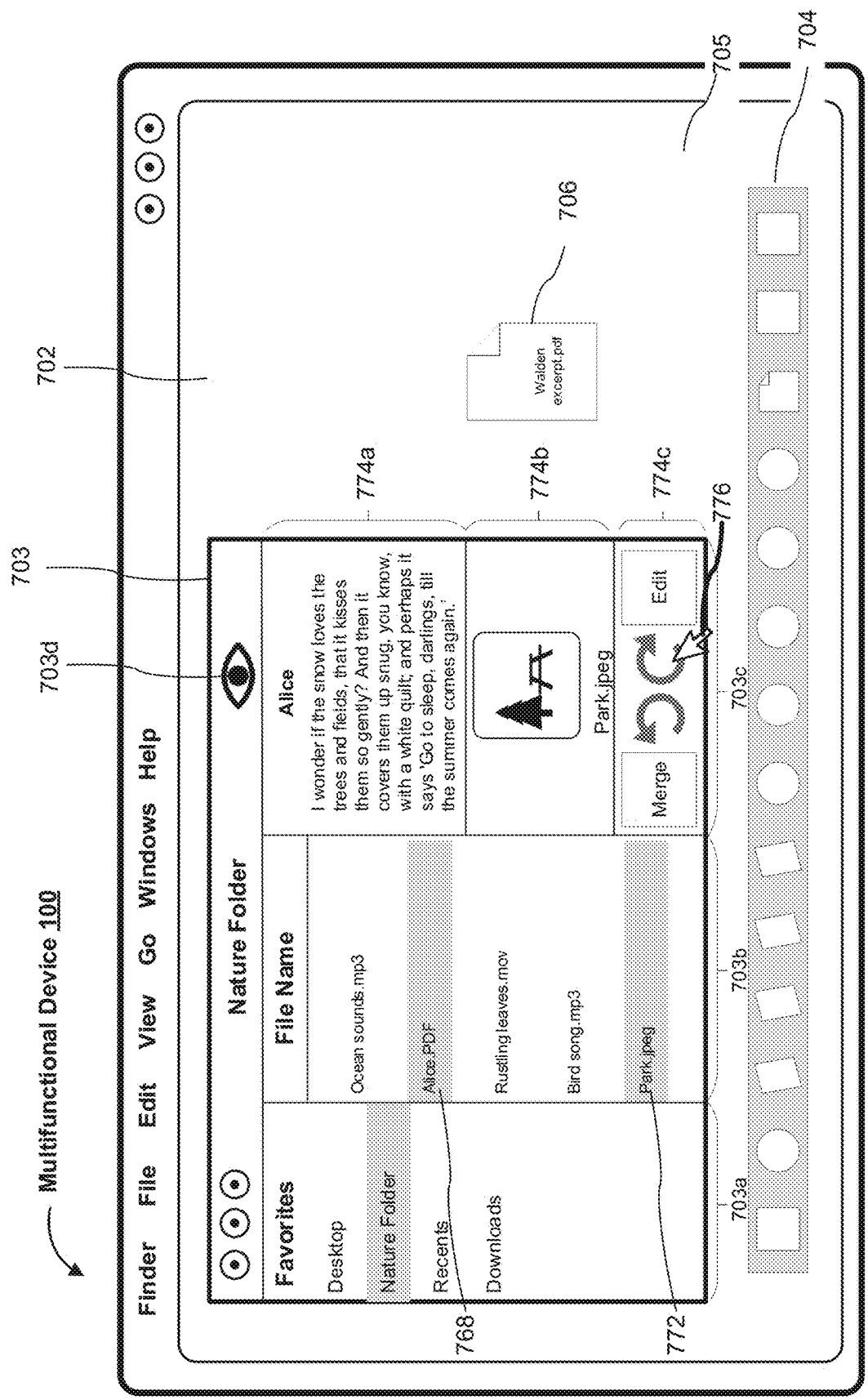

As further illustrated in FIG. 7S, the electronic device 100 detects a special input 770 corresponding to the representation of "Park.jpeg." As illustrated in FIG. 7T, in response to detecting the special input 770, rather than switching file representations between "Alice.pdf" and "Park.jpeg," the electronic device 100 concurrently selects (e.g., displays highlighting 768 and 772 associated with) both file representations. Accordingly, as illustrated in FIG. 7T, the electronic device 100 concurrently displays a first content preview 774a and a second content preview 774b corresponding to "Alice.pdf" and "Park.jpeg," respectively. One of ordinary skill in the art will appreciate that the content previews may be arranged in any manner (e.g., horizontal side-by-side) and/or may include any number of content previews.

As further illustrated in FIG. 7T, the electronic device 100 displays a common set of affordances 774c. The common set of affordances 774c provides interactions with both file types. Thus, for example, the merge affordance in FIG. 7T provides enables merging the two files into a single file. Moreover, counterclockwise and clockwise rotation affordances enable concurrent rotation of both the PDF and the JPEG file. On the other hand, a text highlight affordance is not appropriate because "Park.jpeg" does not contain any text.

Figure 7U:
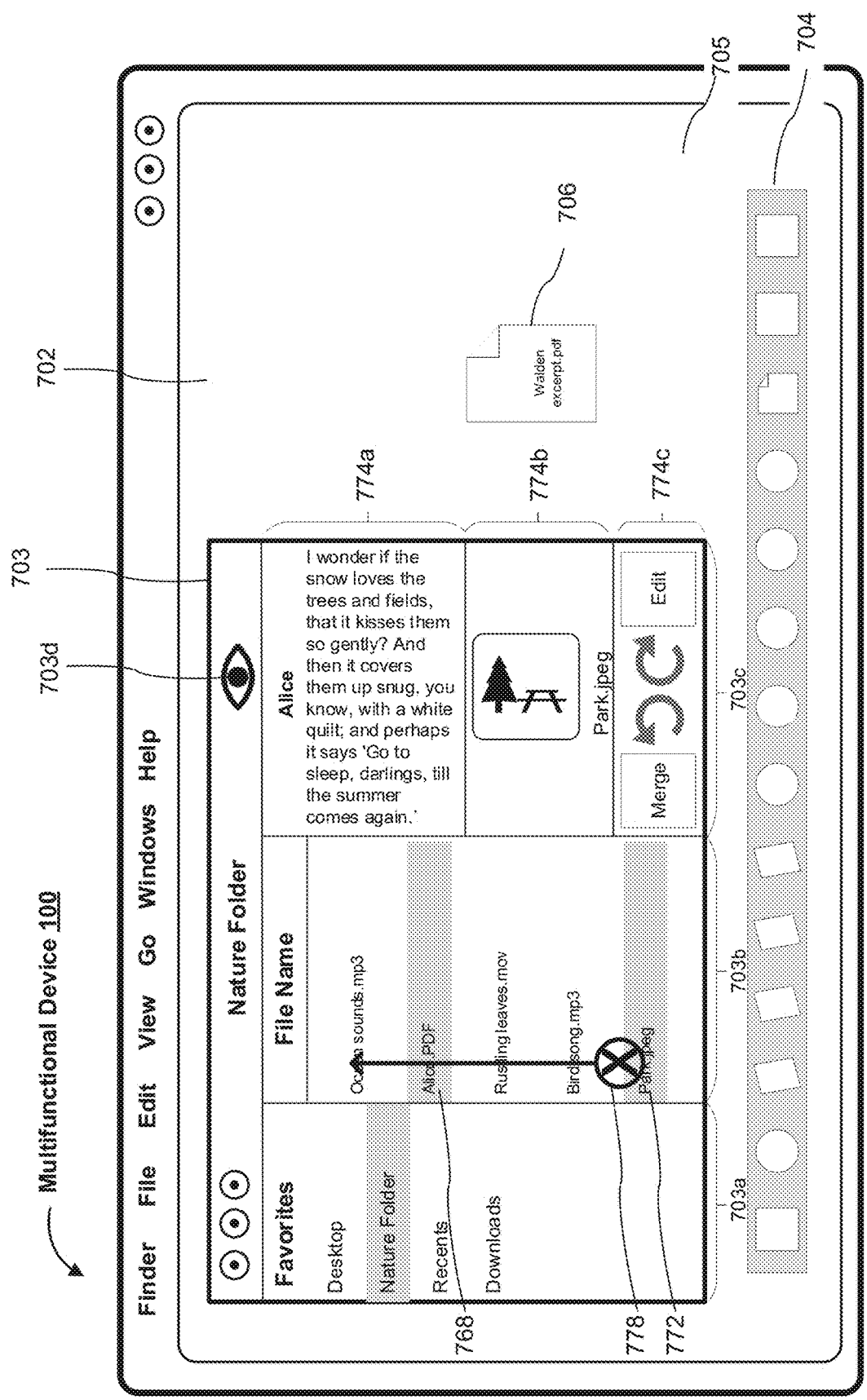

As further illustrated in FIG. 7T, the electronic device 100 detects an input 776 corresponding to the clockwise rotation affordance within the common set of affordances 774c. In response to detecting the input 776 in FIG. 7T, the electronic device 100 concurrently clockwise rotates the "Alice.pdf" preview and the "Park.jpeg" preview, as illustrated in FIG. 7U. As further illustrated in FIG. 7U, the electronic device 100 detects a special input 778 (e.g., hold shift and four keyboard up arrow strikes) in order to request selection of the representation of "Ocean sounds.mp3" while maintaining selection of the representation of "Alice.pdf."

Figure 7V:
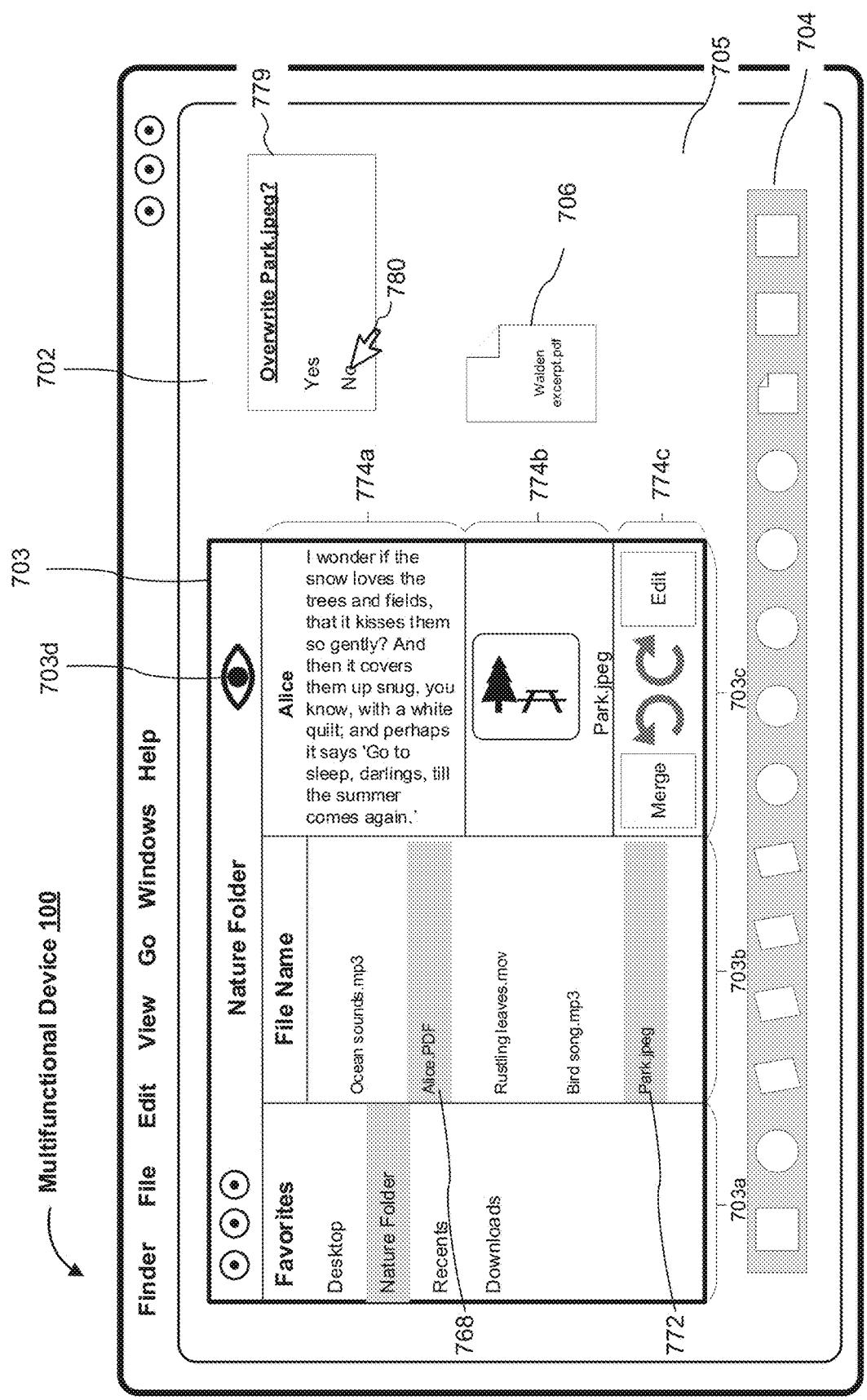

In response to detecting the special input 778, as illustrated in FIG. 7V, the electronic device 100 displays a save prompt 779 provided to enable overwriting of "Park.jpeg" and not "Alice.pdf" because the special input 778 requests de-selection of "Park.jpeg." The electronic device 100 detects a "No" input 780 to the save prompt 779, and accordingly "Park.jpeg" is not overwritten.

Figure 7W:
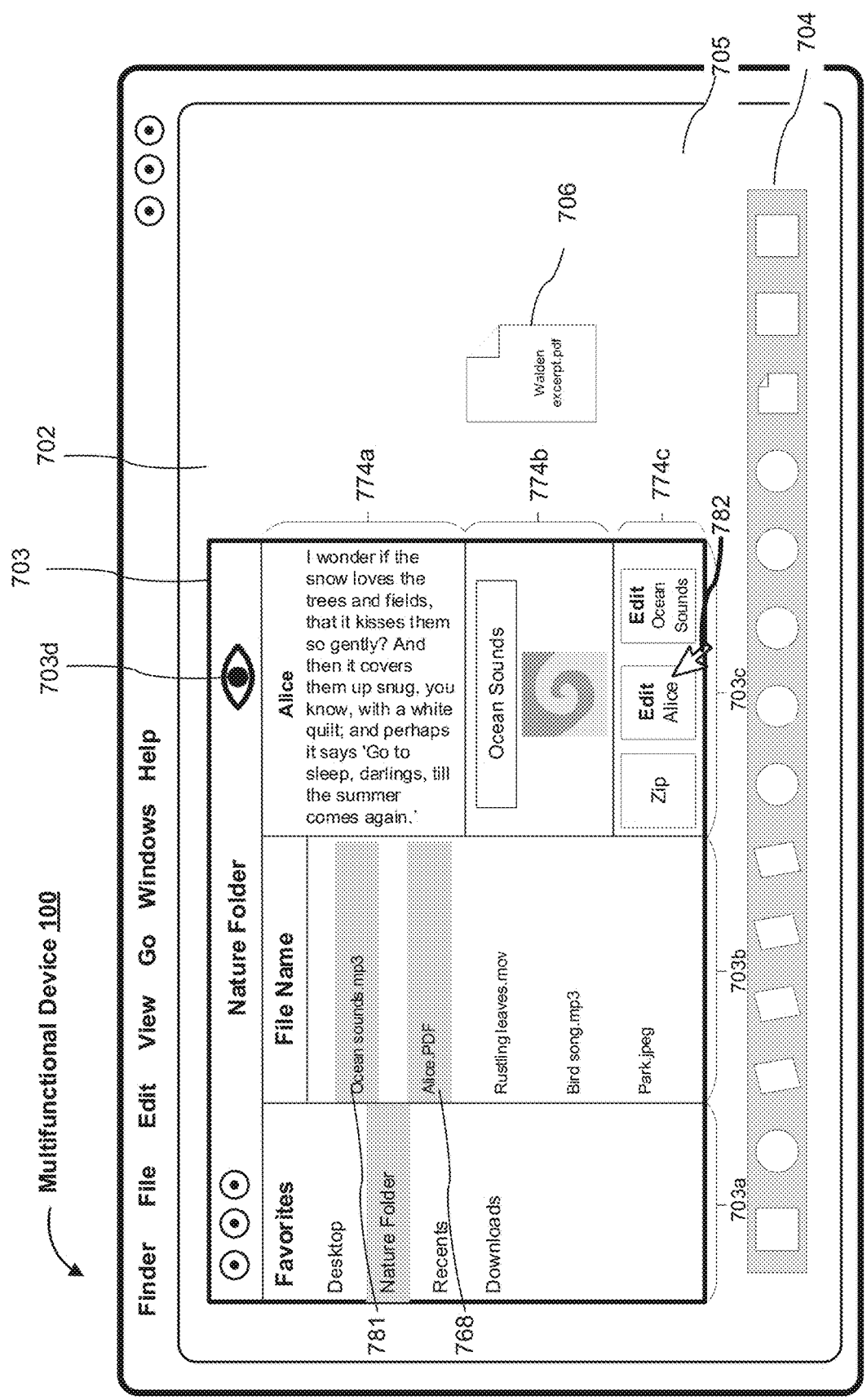

As illustrated in FIG. 7W, the electronic device 100 concurrently displays highlighting 781 over the representation of "Ocean sounds.mp3" and highlighting 768 over the representation of "Alice.pdf." As further illustrated in FIG. 7W, the electronic device 100 ceases display of content associated with "Park.jpeg" within the second content preview 774b and display content associated with "Ocean Sounds.mp3" within the second content preview 774b. Moreover, the electronic device 100 changes the common set of affordances 774c. Namely, the clockwise/counterclockwise affordances are removed because it is nonsensical to rotate an audio file ("Ocean sounds.mp3"). On the other hand, a zip affordance is included in order to zip together "Alice.pdf" and "Ocean sounds.mp3."

Figure 7X:
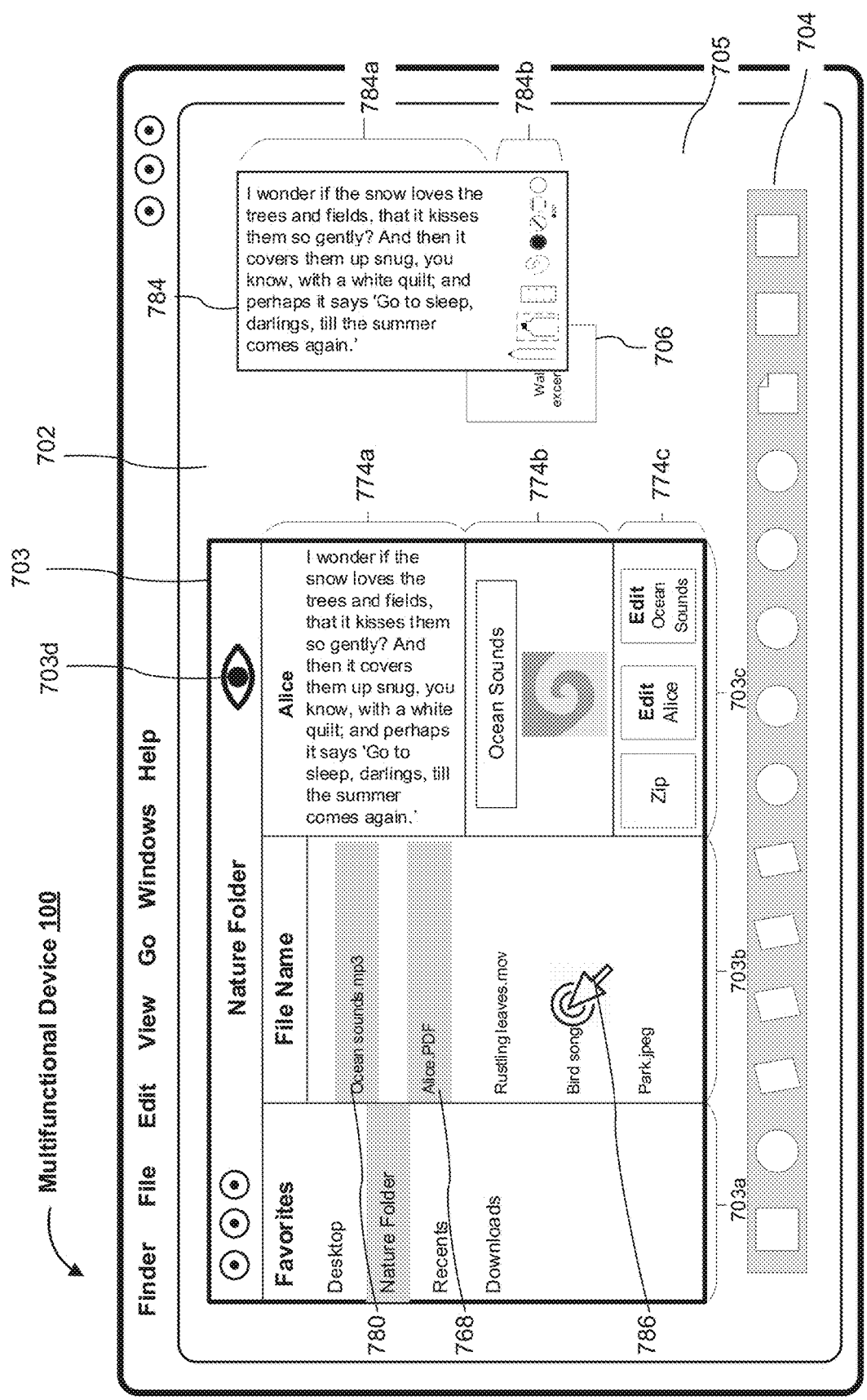

As further illustrated in FIG. 7W, the electronic device 100 detects an input 782 corresponding to an edit Alice affordance. As illustrated in FIG. 7X, in response to detecting the input 782, the electronic device 100 display a popped-out window 784 including a content preview 784a of "Alice.pdf" and a set of associated affordances 784b (e.g., editing tools). As further illustrated in FIG. 7X, the electronic device 100 detects an activation input 786 (e.g., double-click) corresponding to a request to run "Bird song.mp3" in an MP3-native application (e.g., media player), rather than quick previewing the file as described in the previous examples.

Figure 7Y:
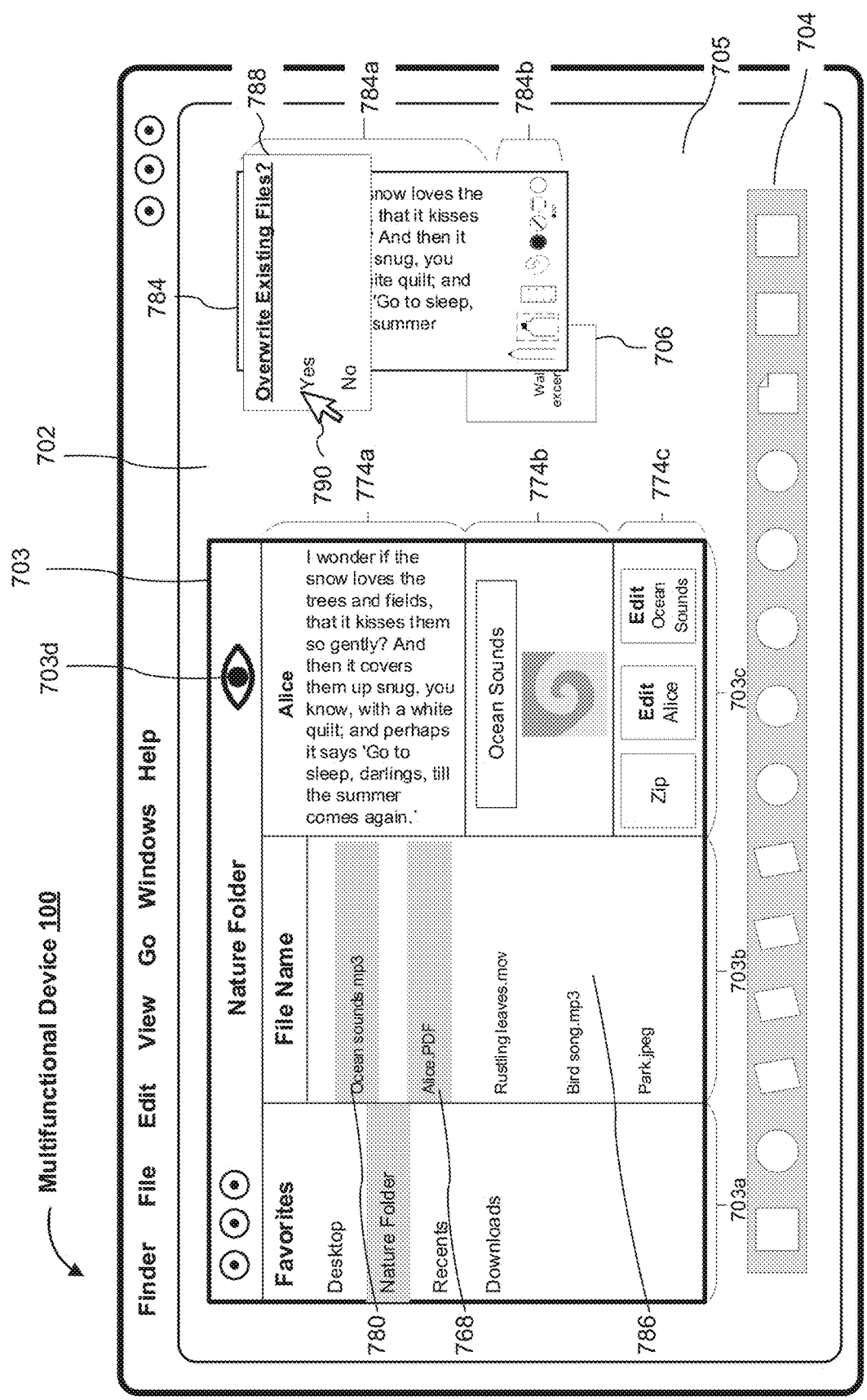

As illustrated in FIG. 7Y, in response to detecting the activation input 786, the electronic device 100 displays a save prompt 788 provided to enable overwriting of the files being previewed ("Ocean sounds.mp3" and/or "Alice.pdf"). As further illustrated in FIG. 7Y, the electronic device 100 detects an input 790 corresponding to a request to overwrite both files.

As illustrated in FIG. 7Z, the electronic device 100 ceases display of the popped-out window 784. Moreover, the electronic device 100 displays an application 794 that is native to "Bird song.mp3," in response to detecting the activation input 786 in FIG. 7X.

FIGS. 8A-8AL are examples of user interfaces for screen capturing in accordance with some embodiments. The user interfaces in these figures are used to illustrate the processes described below, including the processes in FIGS. 10A-10E. In various embodiments, the electronic device 100 manipulates a user interface based on one or more detected inputs.

As illustrated in FIG. 8A, the electronic device 100 displays a user interface 802. The user interface 802 includes three file browsing user interfaces: a dock 804, a file manager 803 corresponding to "Nature Folder," and a desktop. 706. One of ordinary skill in the art will appreciate that the user interface 802 may include any number and type(s) of file browsing user interfaces.

The file manager 803 includes a favorites dock 803*a*, a file window pane 803*b* including file representations corresponding to files in a "Nature Folder," and a preview pane 803*c*. Specifically, the plurality of file representations correspond to files: "Ocean Sounds.mp3," "Alice.pdf," "Rustling leaves.mov," "Bird song.mp3," and "Park.jpeg." In some embodiments, as illustrated in FIG. 8A, the plurality of representations of files are included within the file window pane 803*b*. One of ordinary skill in the art will appreciate that the file manager 803 may include any number of window panes configured in any manner, and/or representations of files corresponding to any file type(s) files. The file manager 803 additionally includes a preview affordance 803*d* provided for displaying an enlarged preview of one or more files.

Figure 8B:
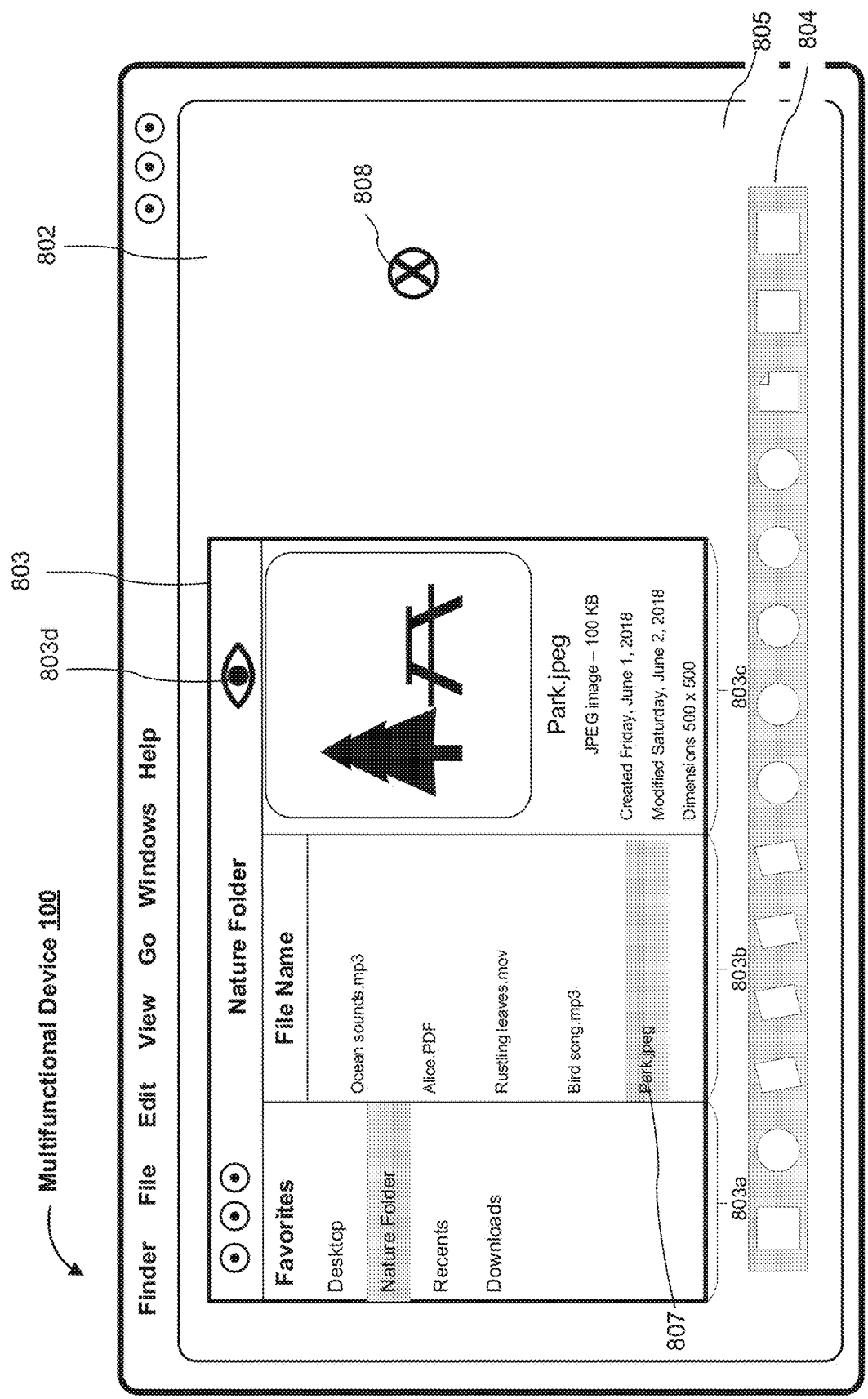

As illustrated in FIG. 8A, the electronic device 100 detects an input 806 corresponding to the representation of "Park.jpeg." In response to detecting the input 806, the electronic device 100 displays highlighting 807 corresponding to the representation of "Park.jpeg" in FIG. 8B.

As further illustrated in FIG. 8B, the electronic device 100 detects a special input 808 (e.g., hold space bar and double-click mouse) corresponding to a request to display a screen capture user interface. The special input may be preset in various embodiments, and in some embodiments preset based on previous inputs to the electronic device 100.

Figure 8C:
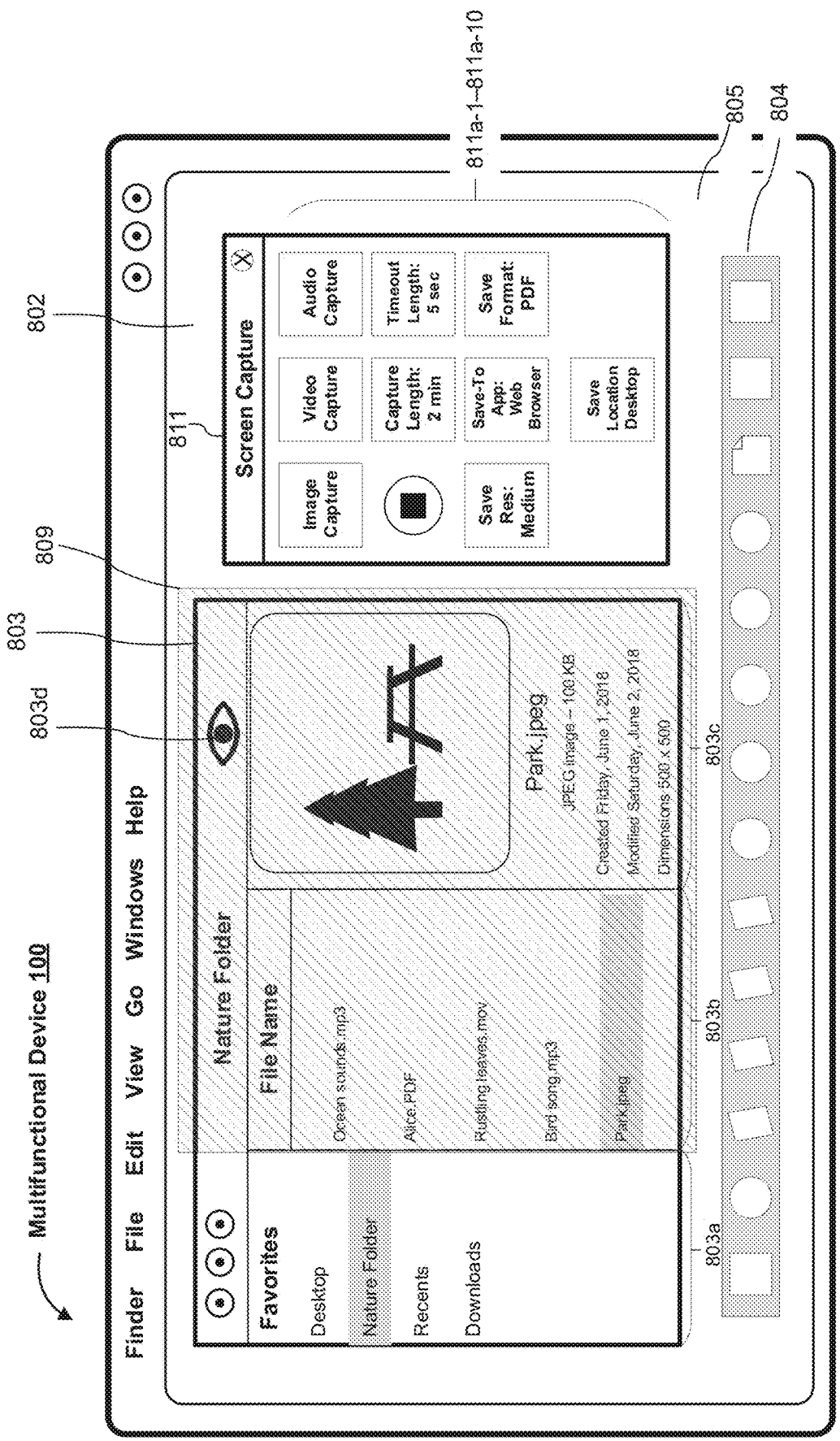

As illustrated in FIG. 8C, in response to detecting the special input 808, the electronic device 100 displays a screen capture interface 811 according to some embodiments. The screen capture interface 811 includes a variety of affordances provided to facilitate screen capturing content displayed on the display. As further illustrated in FIG. 8C, the screen capture interface 811 includes the following affordances: image capture affordance 811*a*-1 for initiating an image capture; video capture affordance 811*a*-2 for initiating a video capture; audio capture affordance 811*a*-3 for initiating an audio capture; stop affordance 811*a*-4 for stopping a capture; capture length affordance 811*a*-5 for setting the duration of the capture; timeout affordance 811*a*-6 for setting an inactivity timer for a displayed screenshot representation (e.g., thumbnail), which, if satisfied, causes ceasing display of the screenshot representation; save resolution affordance 811*a*-7 for setting the capture resolution; save-to-application affordance 811*a*-8 for setting an application in which to display a captured screenshot; save format affordance 811*a*-9 for setting the format of the captured screenshot file; and a save location affordance 811*a*-10 for setting the location to save the captured screenshot. Each affordance includes a respective current value. One of ordinary skill in the art will appreciate that the screen capture interface 811 may include any number of affordances arranged in any manner.

Moreover, a sub-region 809 (hashed region) is illustrated in FIG. 8C. In some embodiments, as illustrated in FIGS. 8B-8C, the sub-region 809 is designated before the electronic device 100 detects the special input 808 requesting display of the screen capture interface 811. The sub-region may be set by default or by previous input(s) to the electronic device 100.

Figure 8D:
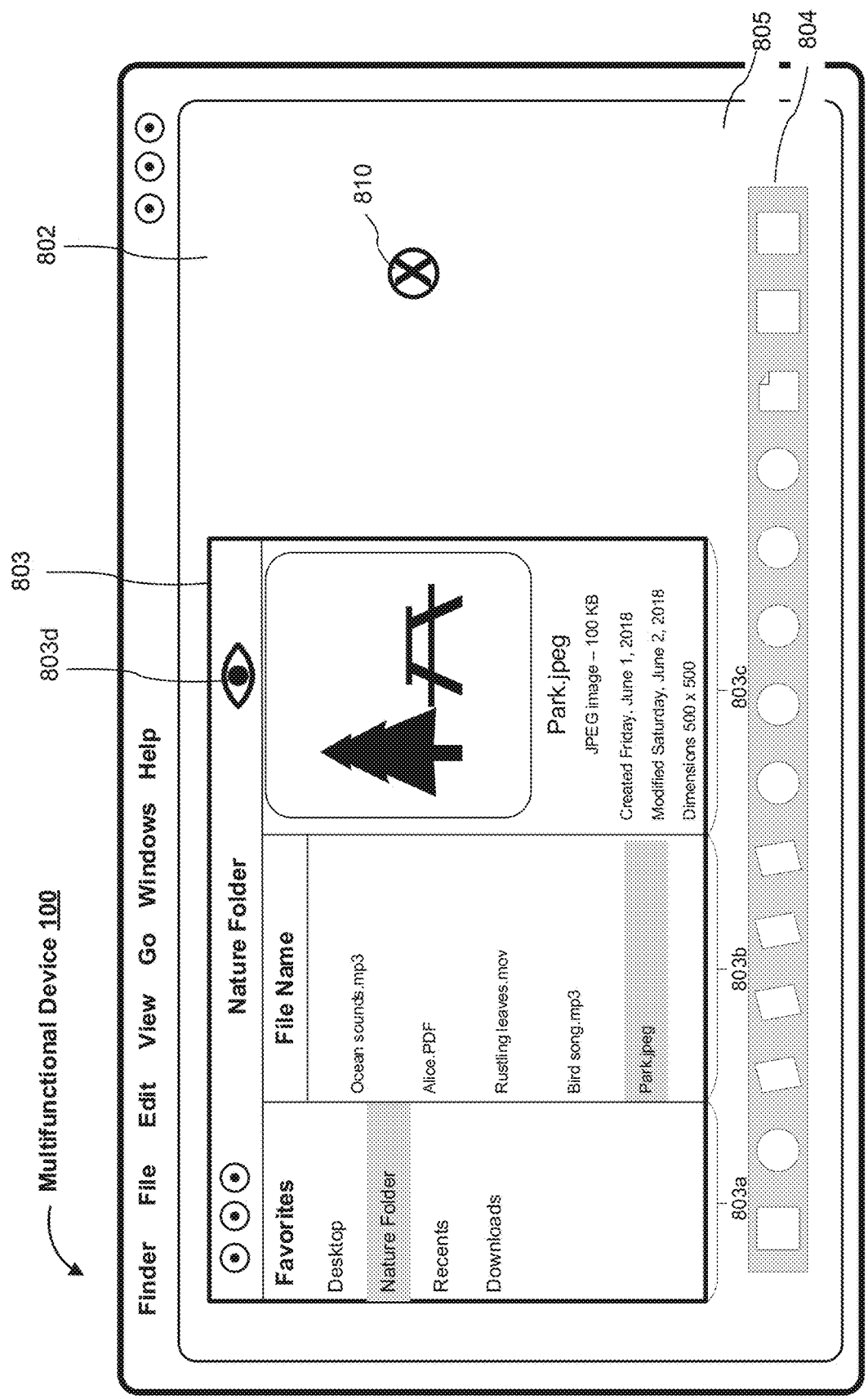
Figure 8E:
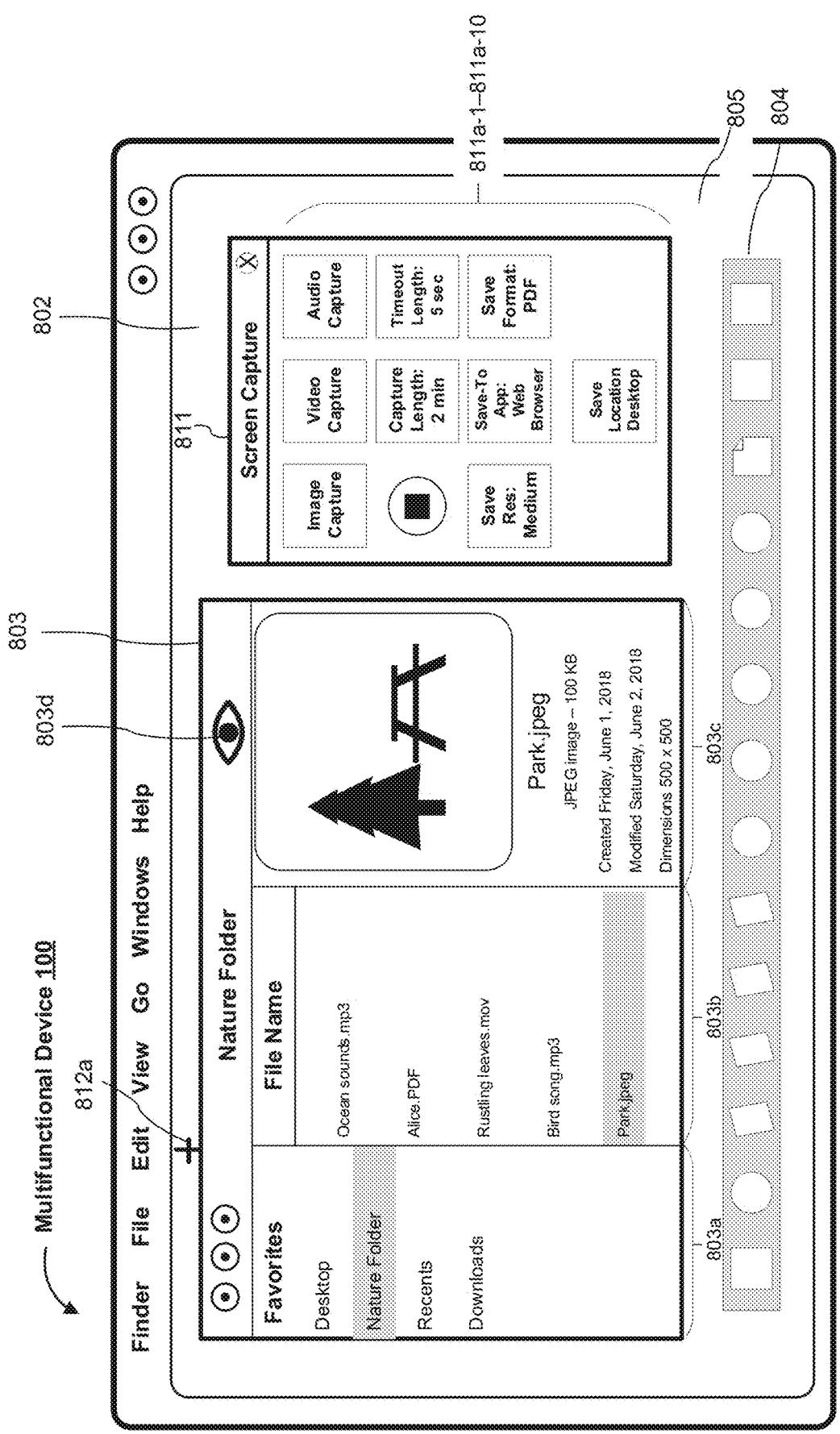

Examples of screen capturing based on input-designated sub-regions are illustrated in FIGS. 8D-8AL according to some embodiments. As illustrated in FIG. 8D, the electronic device 100 detects a special input 810 corresponding to a request to display a screen capture user interface. As illustrated in FIG. 8E, in response to detecting the special input 810 in FIG. 8D, the electronic device 100 displays the screen capture interface 811 according to some embodiments.

Figure 8F:
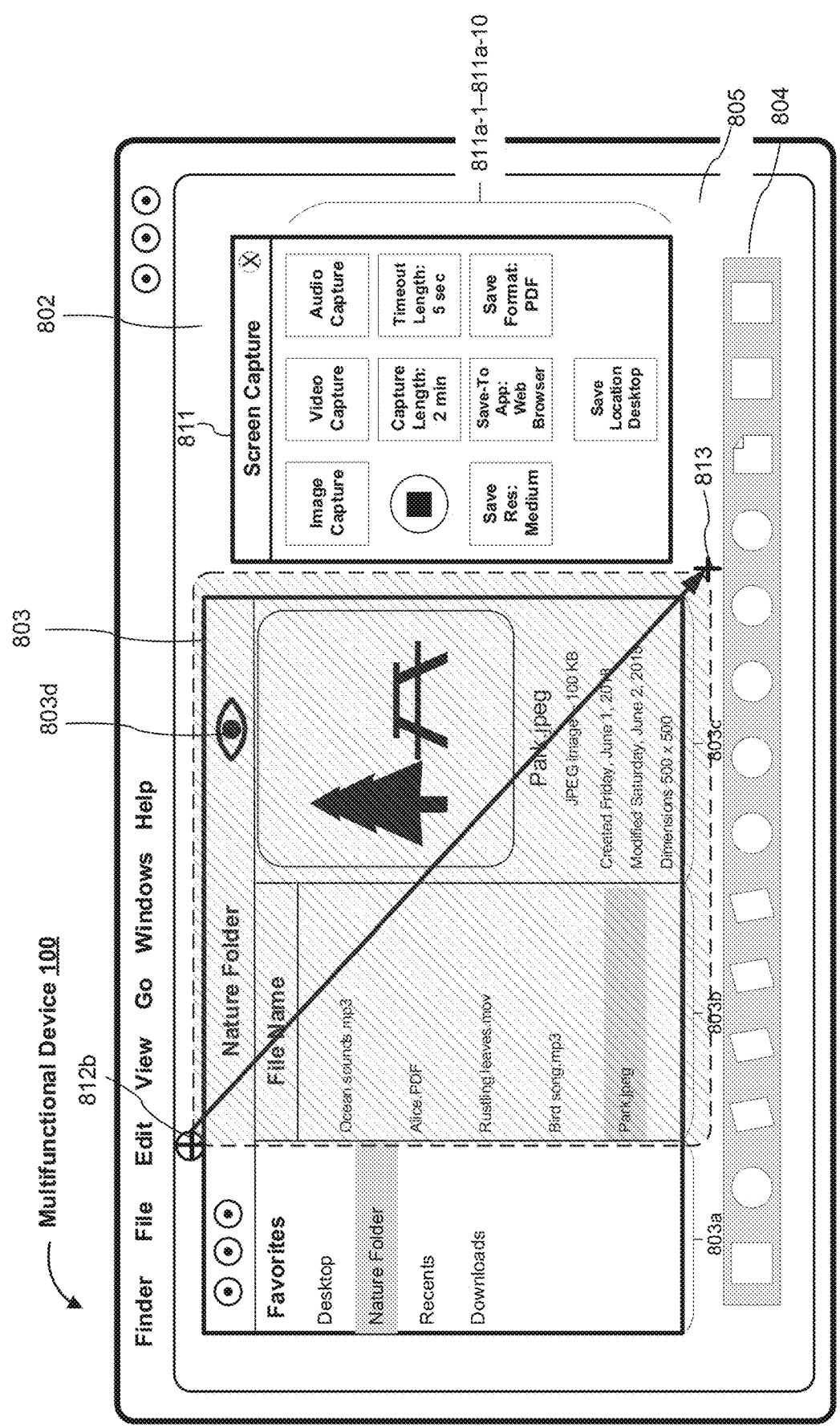

As illustrated in FIGS. 8E-8F, a sub-region is designated based on one or more inputs to the electronic device 100. In some embodiments, the electronic device 100 detects a set input 812*a* in FIG. 8E. As illustrated in FIG. 8F, the electronic device 100 detects an endpoint input 813 originating at an anchor point 812*b* (e.g., origin point) corresponding to the set input 812*a*. The endpoint input 813 corresponds to a down-right diagonal selection from the anchor point 812*b*. In some embodiments, the anchor point 812*b* is predetermined and therefore not set based on the set input 812*a*.

Figure 8G:
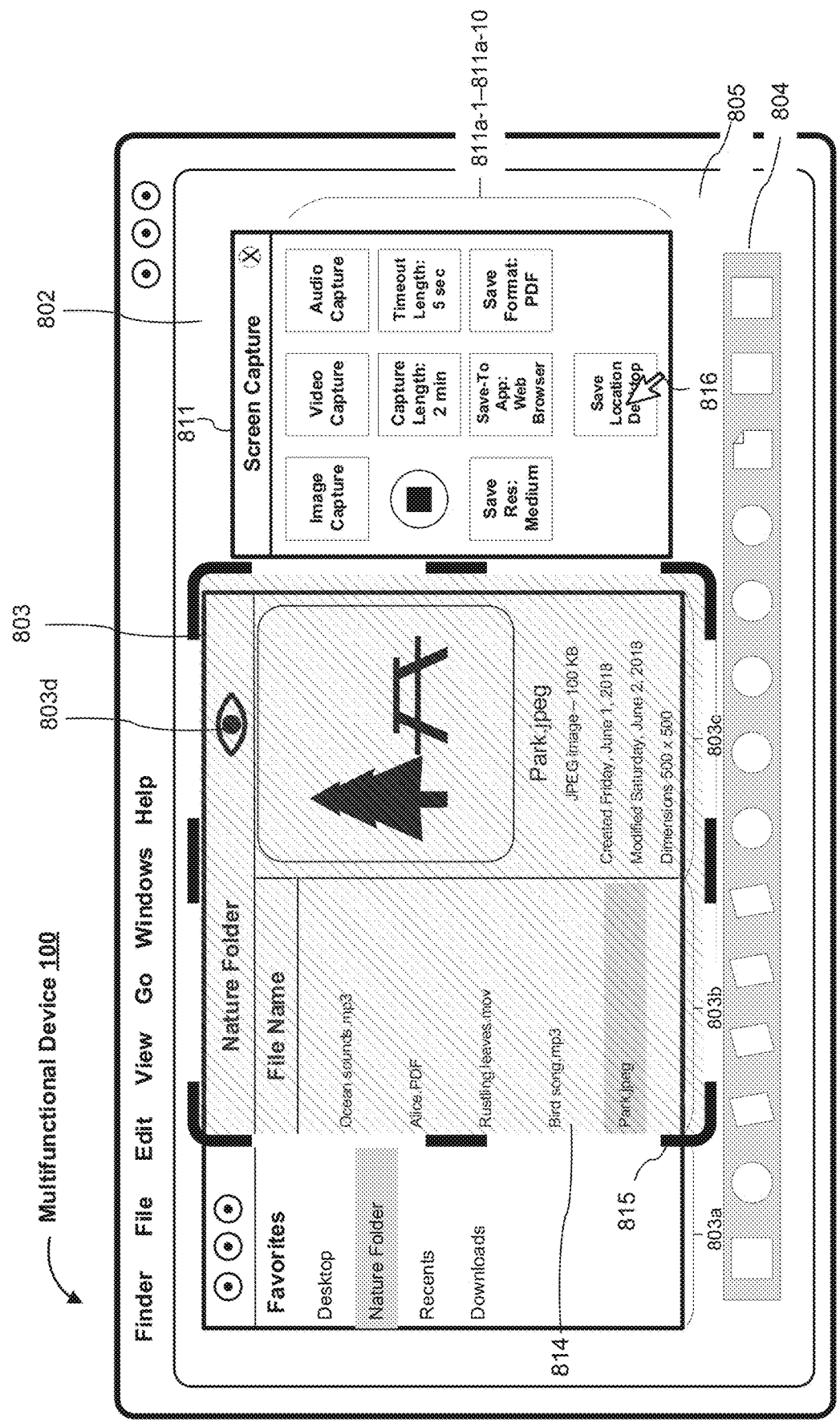

Consequently, as illustrated in FIG. 8G, the electronic device 100 designates a sub-region 814 to be captured based on the anchor point 812*b* and the endpoint input 813. Further illustrated in FIG. 8G, the electronic device 100 displays eight handles 815 (e.g., cropping handles) corresponding to the four corners, left-side, right-side, top, and bottom of the sub-region 814. As will be described below, the handles 815 enable moving and/or resizing of the sub-region 814 based on corresponding inputs to the electronic device 100.

Figure 8H:
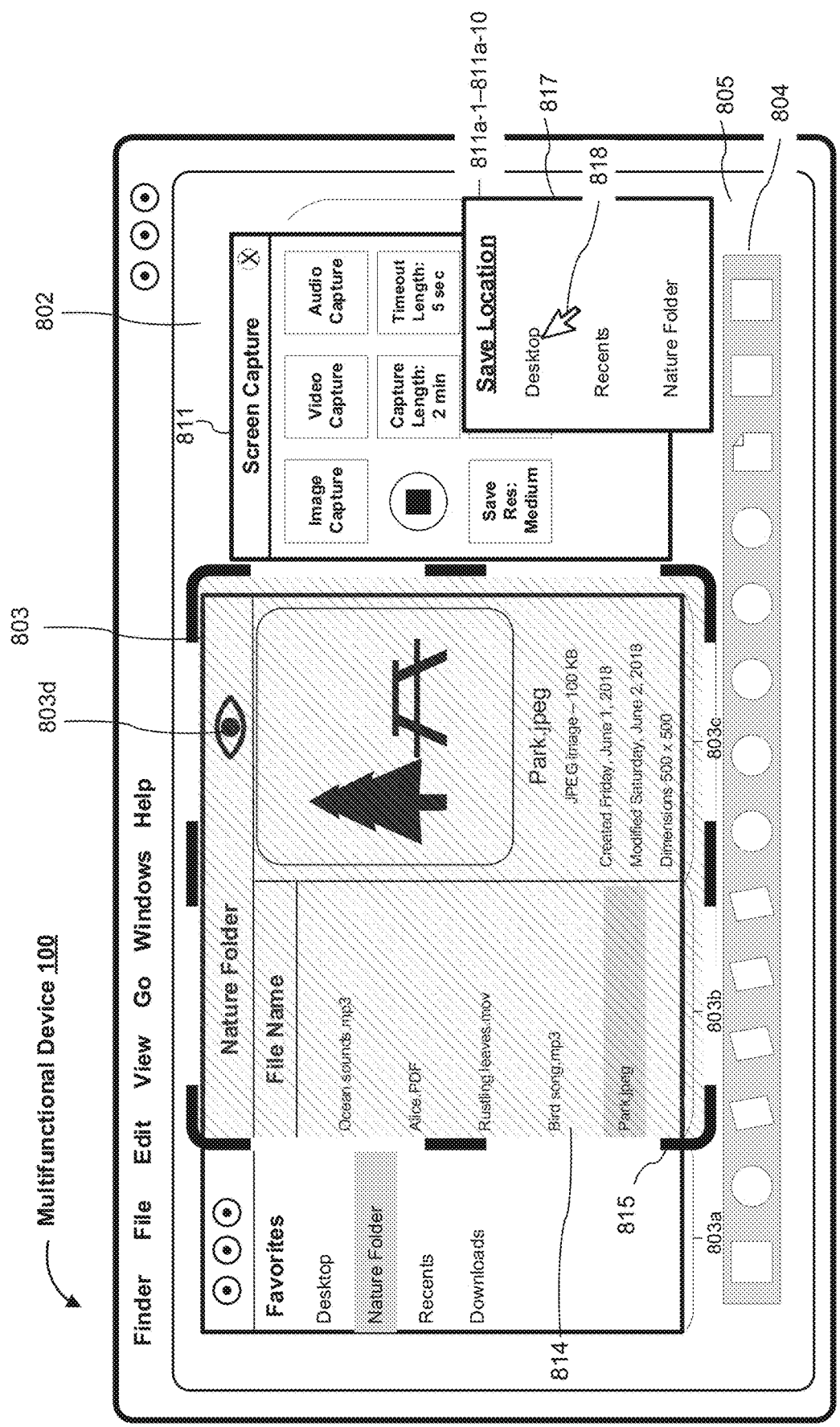

As further illustrated in FIG. 8G, the electronic device 100 detects an input 816 corresponding to the save location affordance 811*a*-10. As illustrated in FIG. 8H, in response to detecting the input 816, the electronic device 100 displays a save location prompt 817 listing a number of save locations. One of ordinary skill in the art will appreciate that any number and values of save locations may be included, including a custom value (e.g., set by user input). The electronic device 100 detects an input 818 selecting the Desktop as the save location. In response, the electronic device 100 sets the Desktop as the save location for a subsequent screen capture.

Figure 8I:
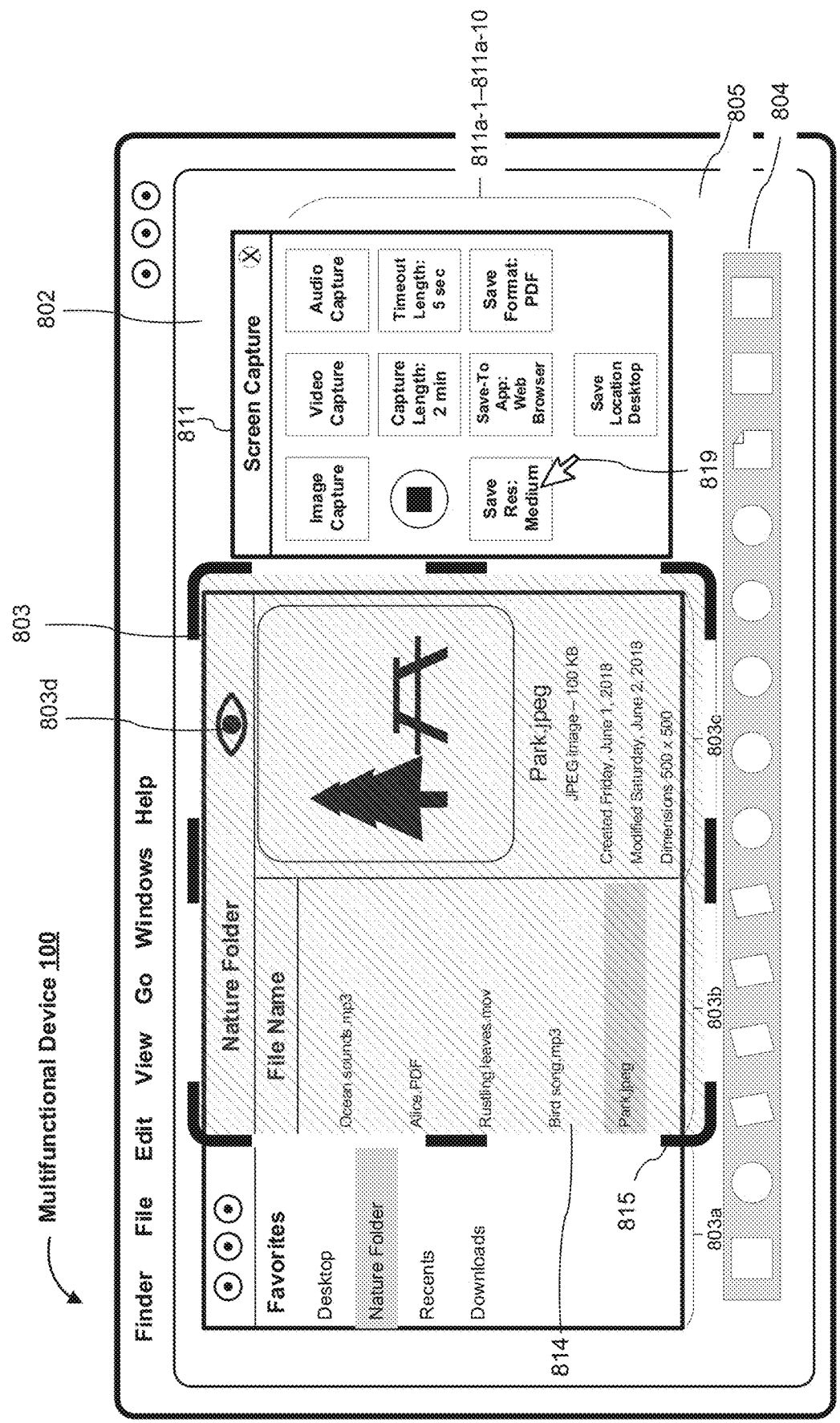
Figure 8J:
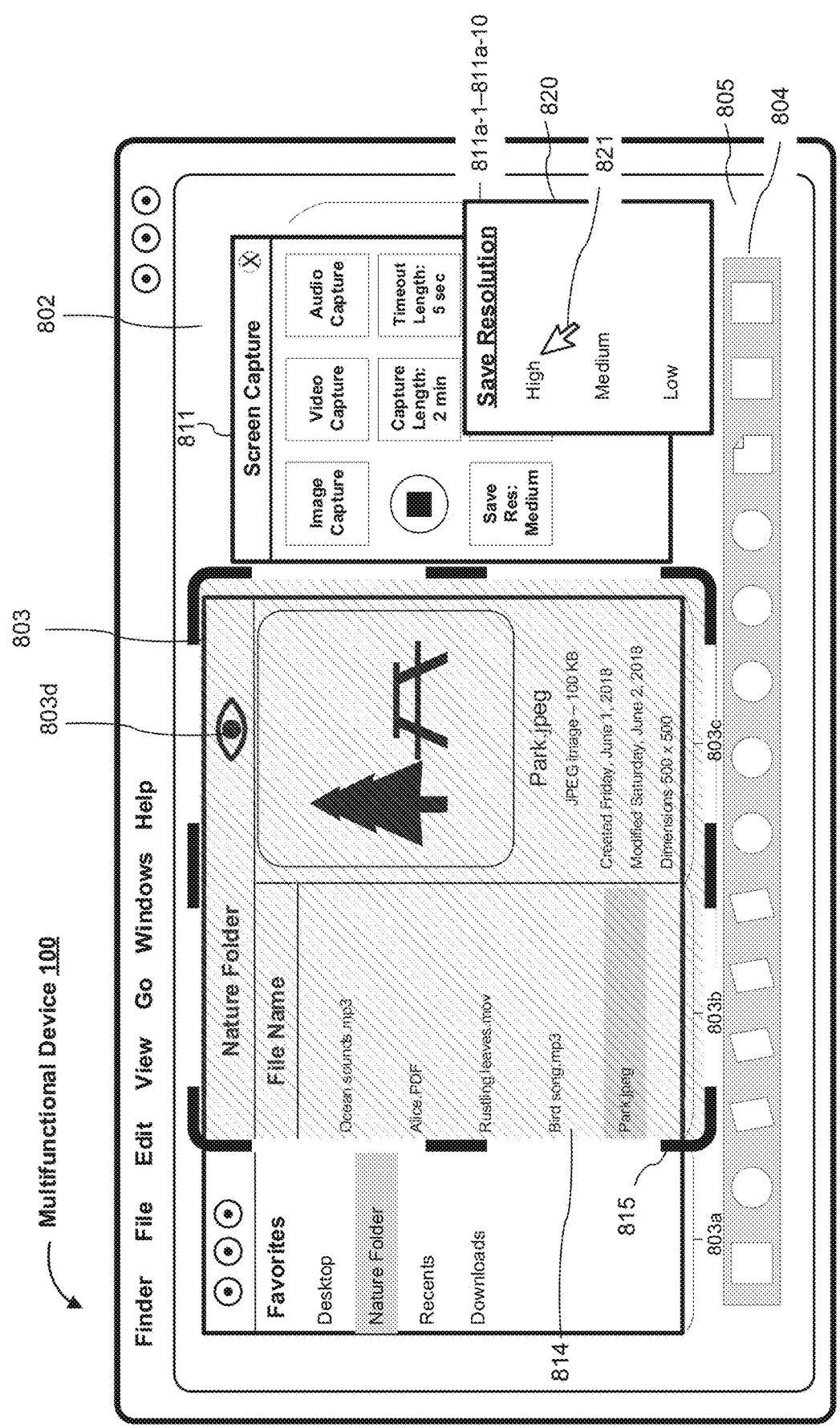

As illustrated in FIG. 8I, the electronic device 100 detects an input 819 corresponding to the save resolution affordance 811*a*-7. As illustrated in FIG. 8J, in response to detecting the input 819 in FIG. 8I, the electronic device 100 displays a save resolution prompt 820 listing a number of save resolutions. One of ordinary skill in the art will appreciate that any number and values of save resolutions may be included, including a custom value (e.g., set by user input). The electronic device 100 detects an input 821 selecting a high resolution capture. In response, the electronic device 100 sets the save resolution as high for a subsequent screen capture. Additionally, as illustrated in FIGS. 8J-8K, the electronic device 100 changes the value displayed within the save resolution affordance 811*a*-7 from the value of "Medium" in FIG. 8J to "High" in FIG. 8K.

Figure 8K:
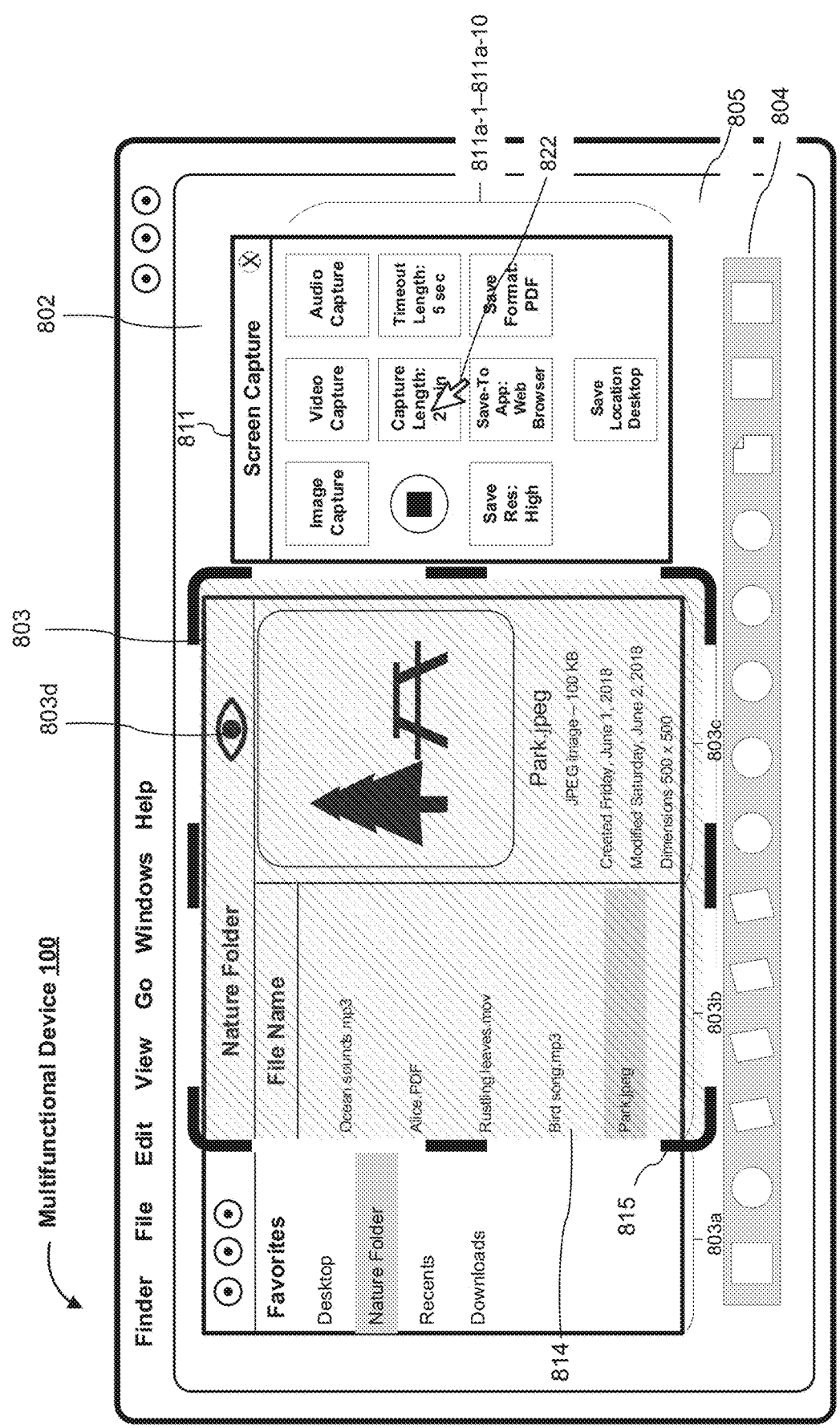
Figure 8L:
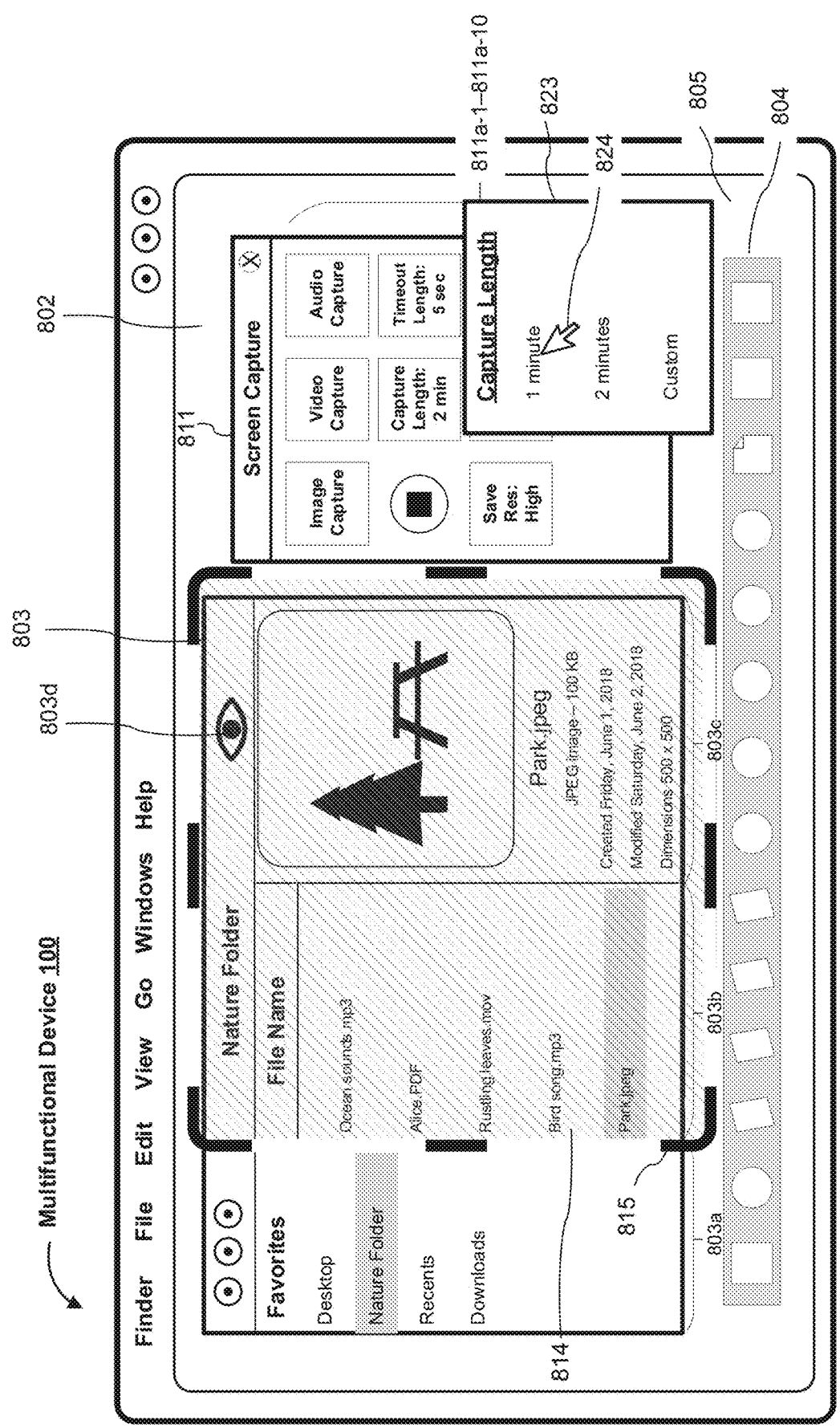

As further illustrated in FIG. 8K, the electronic device 100 detects an input 822 corresponding to the capture length affordance 811*a*-5. As illustrated in FIG. 8L, in response to detecting the input 822 in FIG. 8K, the electronic device 100 displays a capture length prompt 823 listing a number of capture lengths. One of ordinary skill in the art will appreciate that any number and values of capture lengths may be included, including a custom value (e.g., set by user input). The electronic device 100 detects an input 824 selecting a "1 minute" capture duration. In response, the electronic device 100 sets the capture duration length to be one minute. Additionally, as illustrated in FIGS. 8L-8M, the electronic device 100 changes the value displayed within the capture length affordance 811*a*-5 from the value of "2 min" in FIG. 8L to "1 min" in FIG. 8M.

Figure 8M:
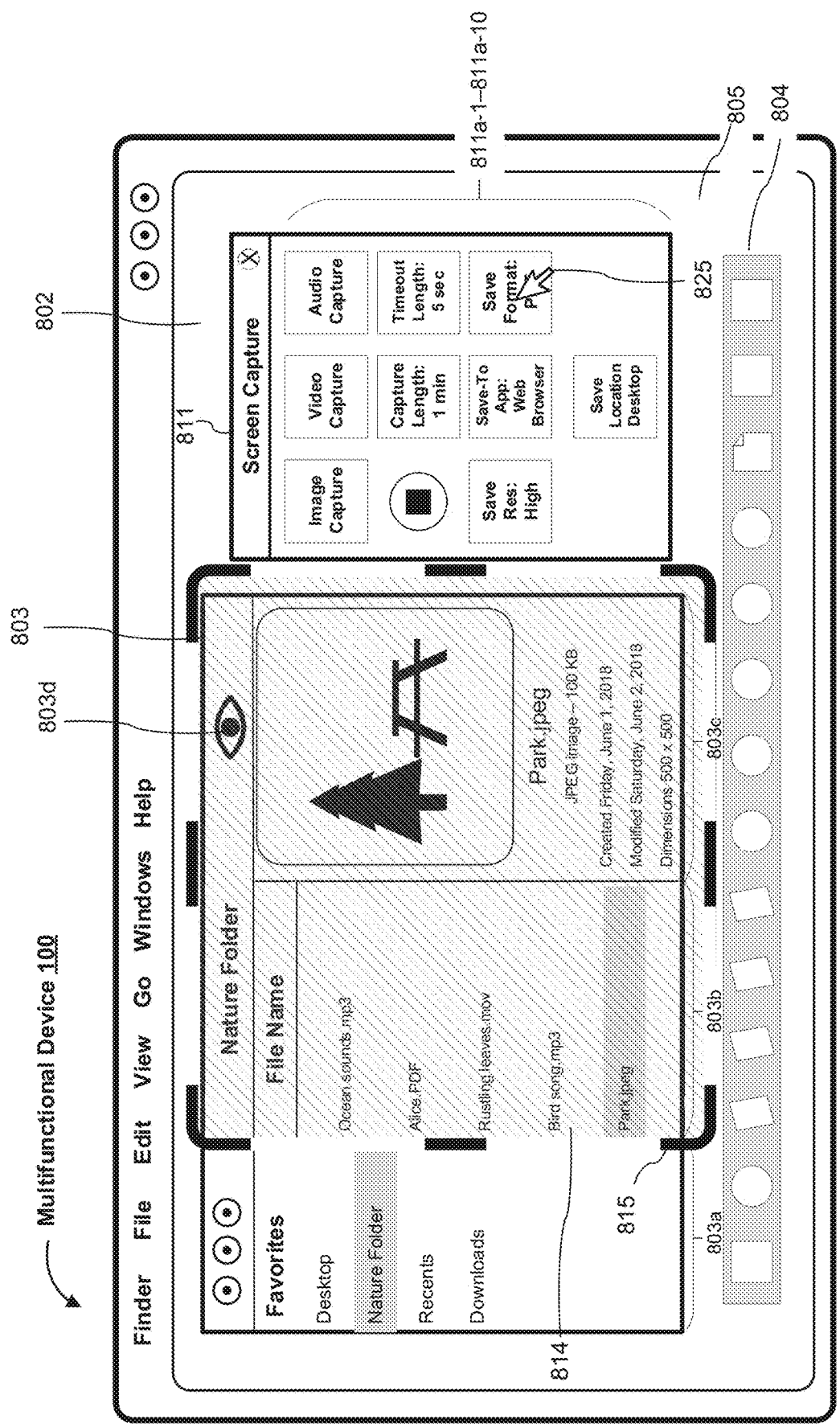
Figure 8N:
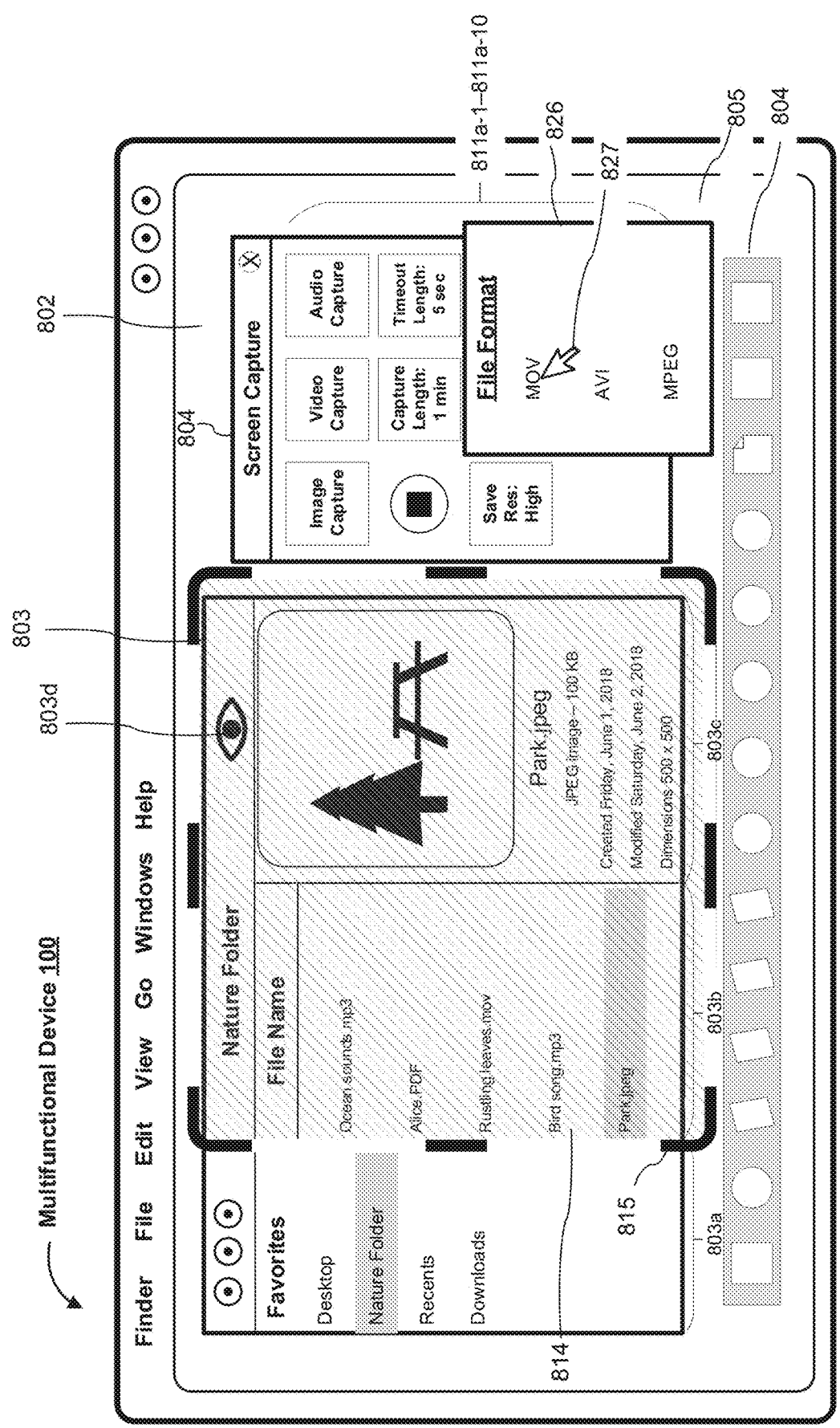

As further illustrated in FIG. 8M, the electronic device 100 detects an input 825 corresponding to the save format affordance 811a-9. As illustrated in FIG. 8N, in response to detecting the input 825 in FIG. 8M, the electronic device 100 displays a file format prompt 826 listing a number of file formats. One of ordinary skill in the art will appreciate that any number and values of file formats may be included, including a custom value (e.g., set by user input). The electronic device 100 detects an input 827 selecting a "MOV" file format. In response, the electronic device 100 sets the capture file format to "MOV." Additionally, as illustrated in FIGS. 8N-8O, the electronic device 100 changes the value displayed within the save format affordance 811a-9 from the value of "PDF" in FIG. 8N (obscured by file format prompt 826) to "MOV" in FIG. 8O.

Figure 8O:
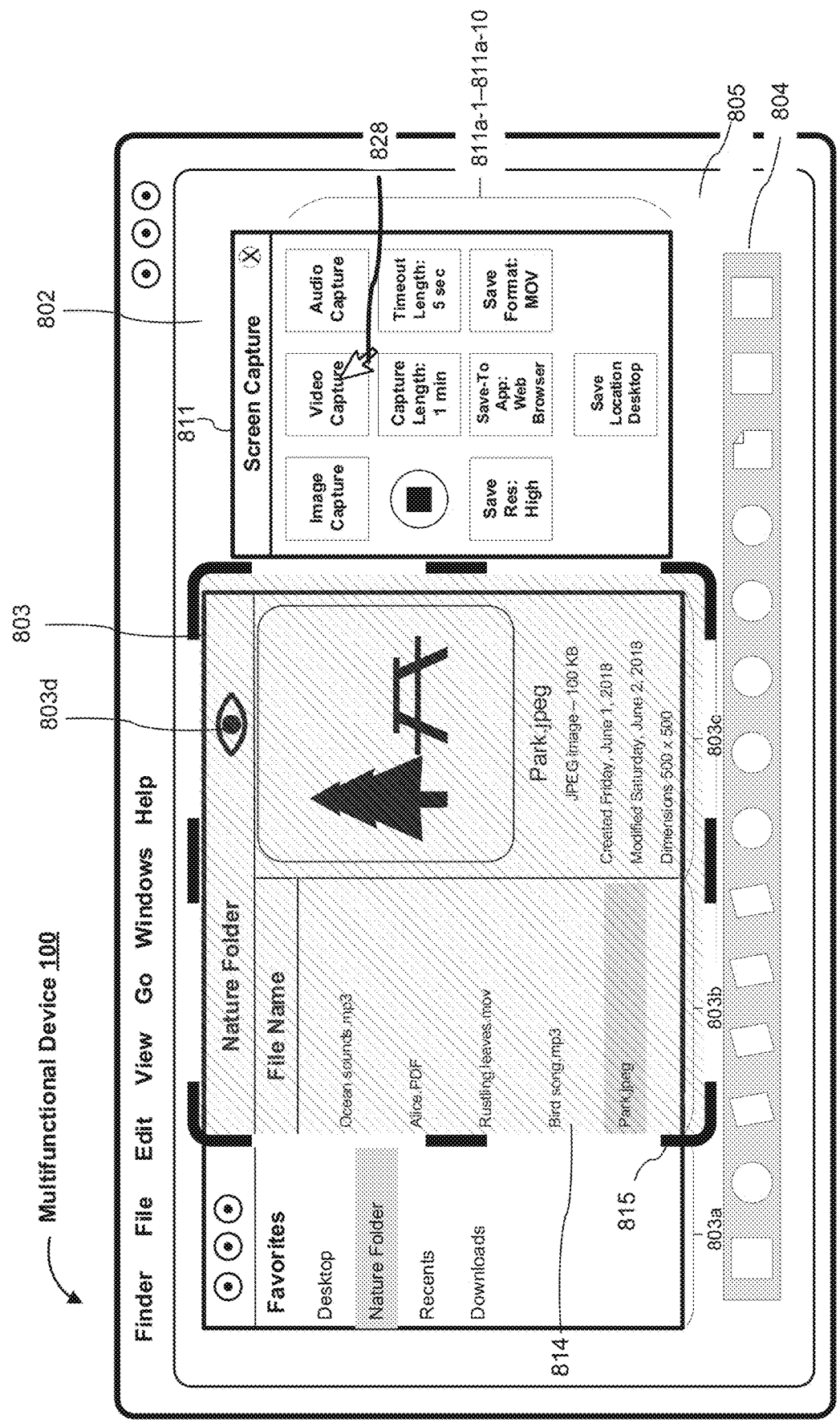
Figure 8P:
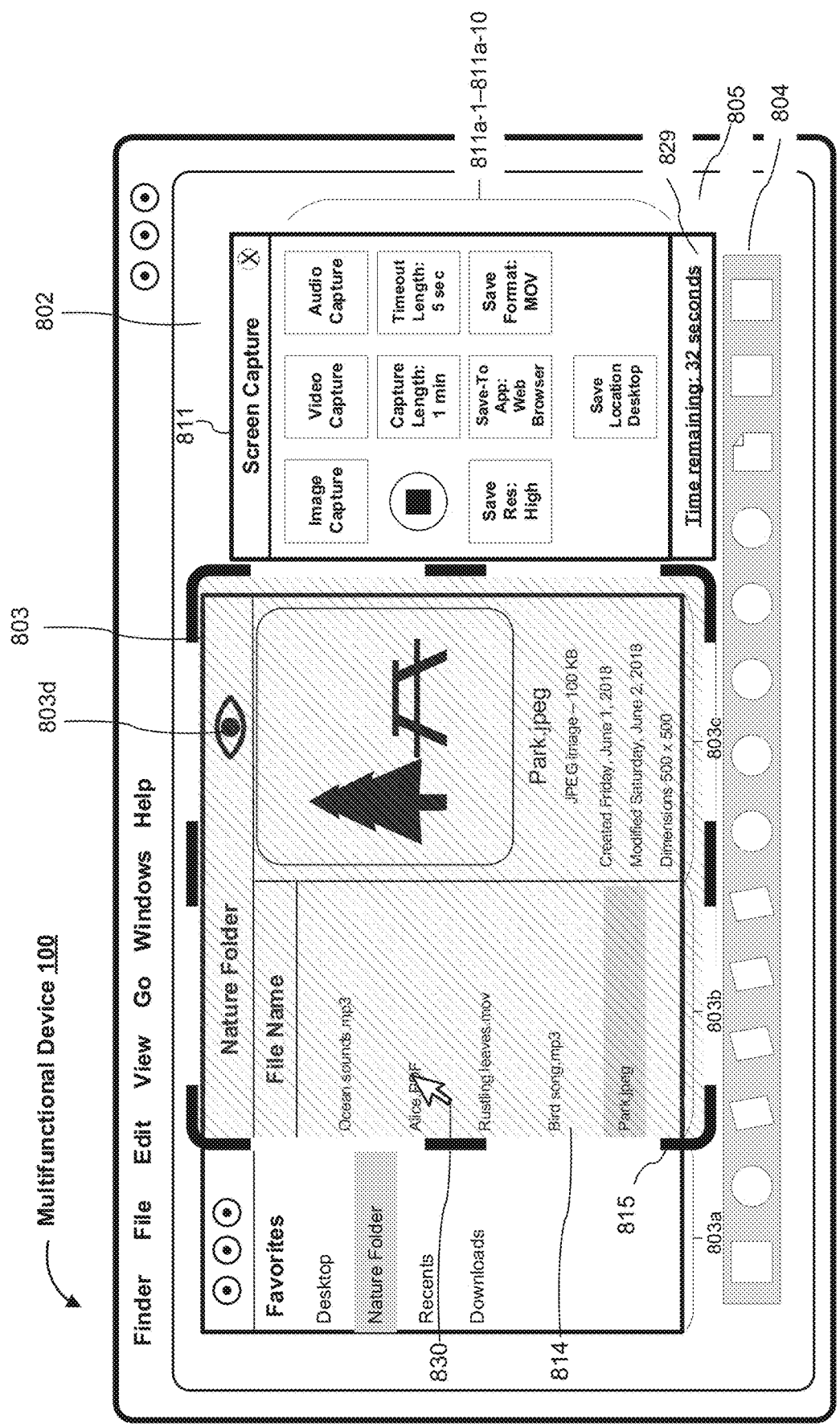

As further illustrated in FIG. 8O, the electronic device 100 detects an input 828 corresponding to the video capture affordance 811a-2 in order to trigger a video capture in accordance with the previously set capture parameters. In response to detecting the input 828 in FIG. 8O, the electronic device 100 begins a one-minute long (according to the value of capture length affordance 811a-5) video capture of the content within the sub-region 814. As illustrated in FIG. 8P, 28 seconds have elapsed, as indicated by the timer 829. At this point, the electronic device 100 detects an input 830, within the sub-region 814, that corresponds to a request to select the representation of "Alice.pdf."

Figure 8Q:
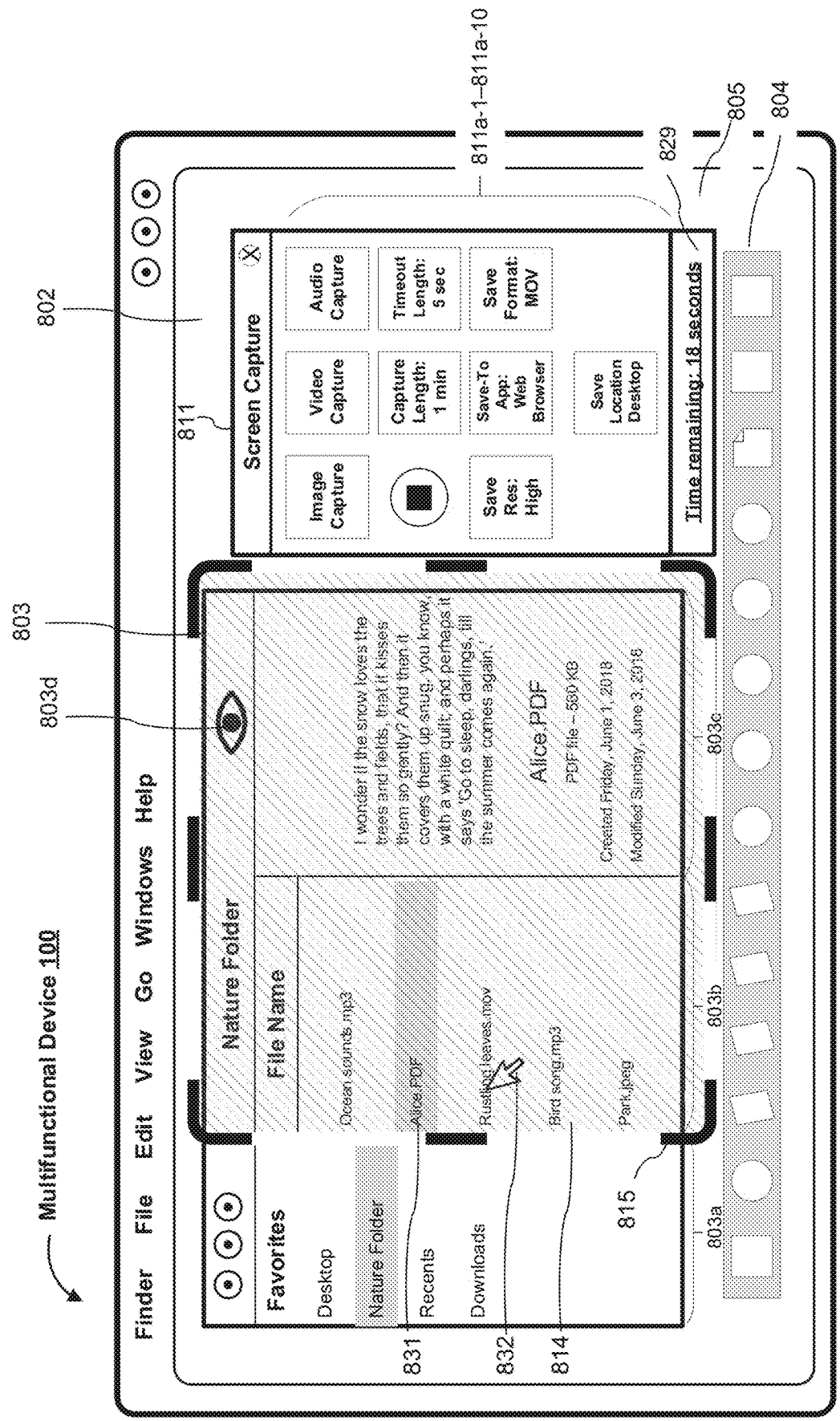

As illustrated in FIG. 8Q, in response to detecting the input 830, the electronic device 100 displays within the preview pane 803c content and metadata associated with "Alice.pdf" to be captured by the running video capture. As further illustrated in FIG. 8Q, the timer 829 now indicates that 18 seconds remain in the running video capture. At this point, the electronic device 100 detects an input 832, within the sub-region 814, that corresponds to a request to select the representation of "Rustling leaves.mov."

Figure 8R:
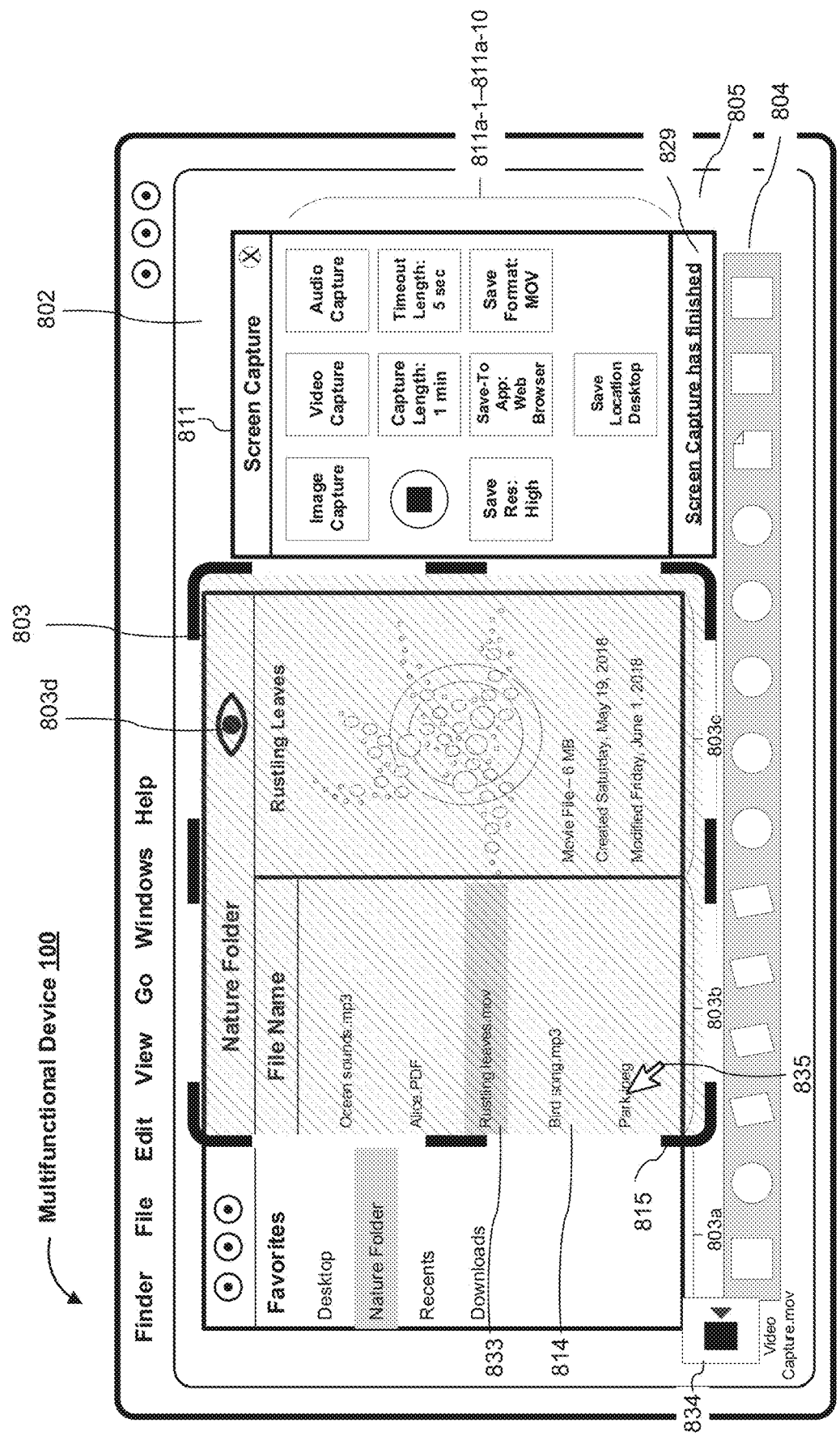

As illustrated in FIG. 8R, in response to detecting the input 832 in FIG. 8Q, the electronic device 100 displays within the preview pane 803c content and metadata associated with "Rustling leaves.mov" captured by the running video capture. As further illustrated in FIG. 8R, the timer 829 now indicates that the video capture has finished. Accordingly, the video capture is saved to the Desktop (according to the value of 811a-10), as indicated by icon 834.

Figure 8S:
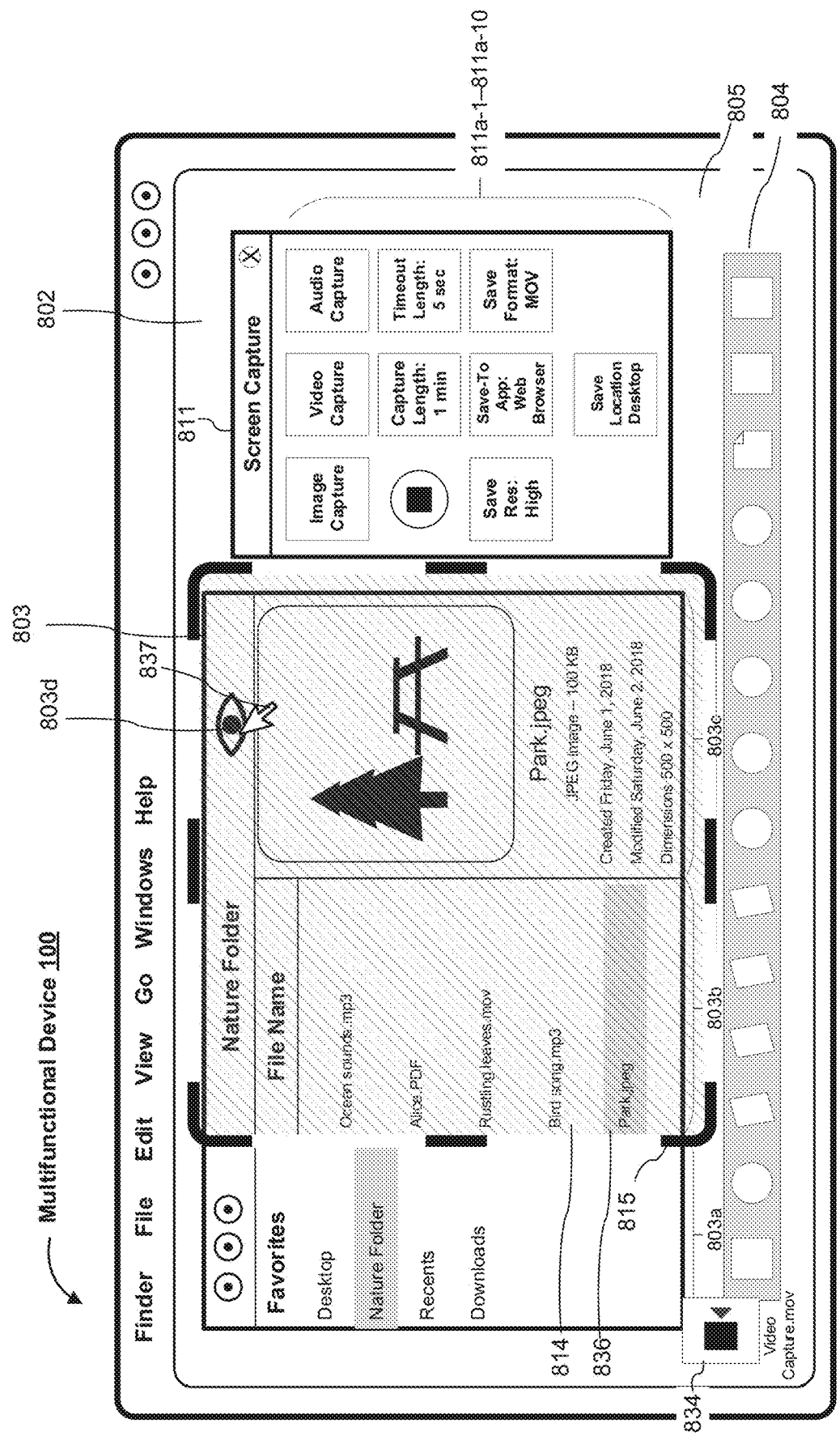
Figure 8T:
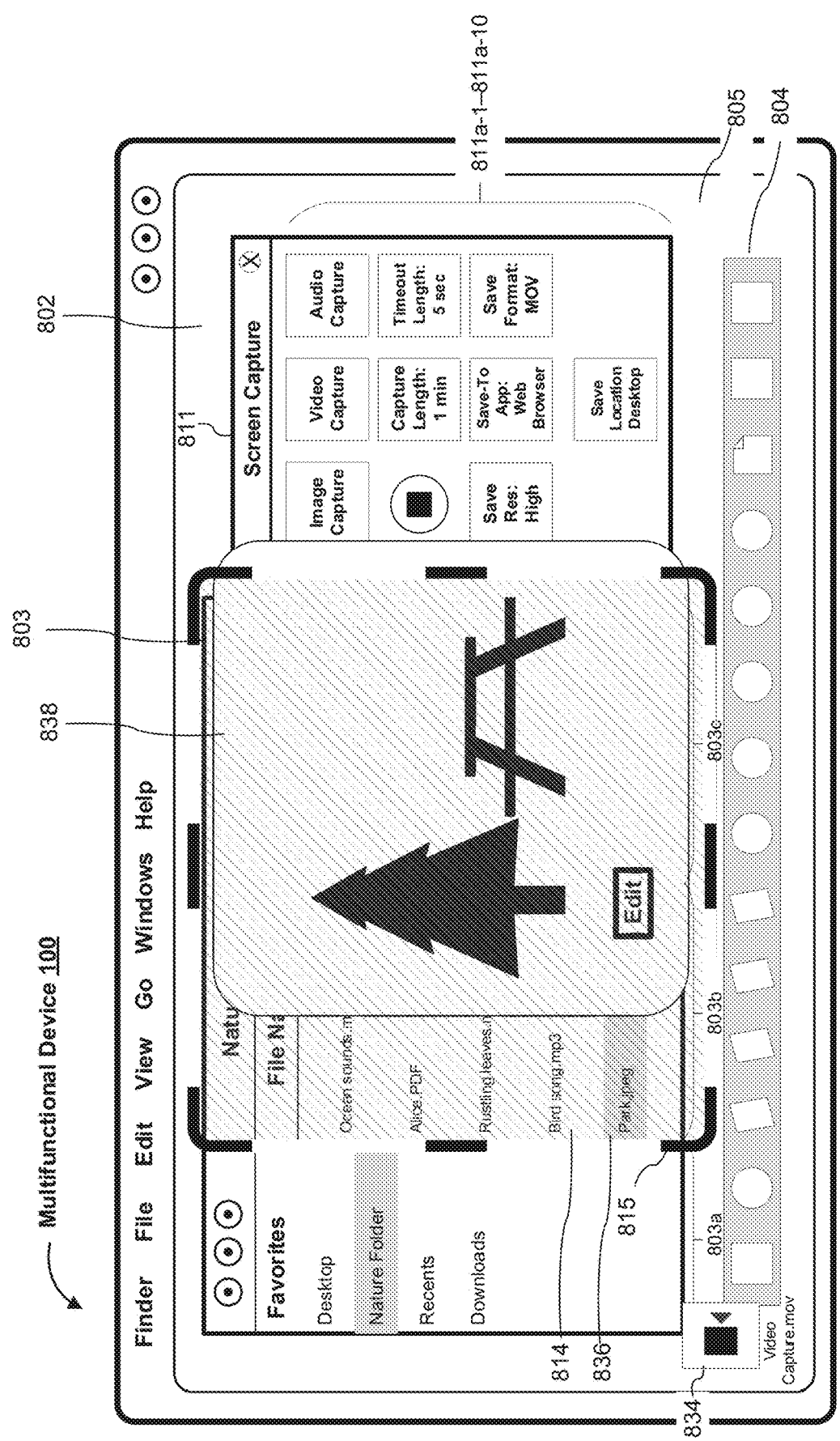

As further illustrated in FIG. 8R, the electronic device 100 detects an input 835 corresponding to the representation of "Park.jpeg." As illustrated in FIG. 8S, in response to detecting the input 835 in FIG. 8R, the electronic device 100 displays highlighting 836 corresponding to "Park.jpeg" and content and metadata associated with "Park.jpeg" in the preview pane 803c. As further illustrated in FIG. 8S, the electronic device 100 detects an input 837 corresponding to the preview affordance 803d. As illustrated in FIG. 8T, in response to detecting the input 837 in FIG. 8S, the electronic device 100 displays a preview 838 (e.g., enlarged preview) of "Park.jpeg."

Figure 8U:
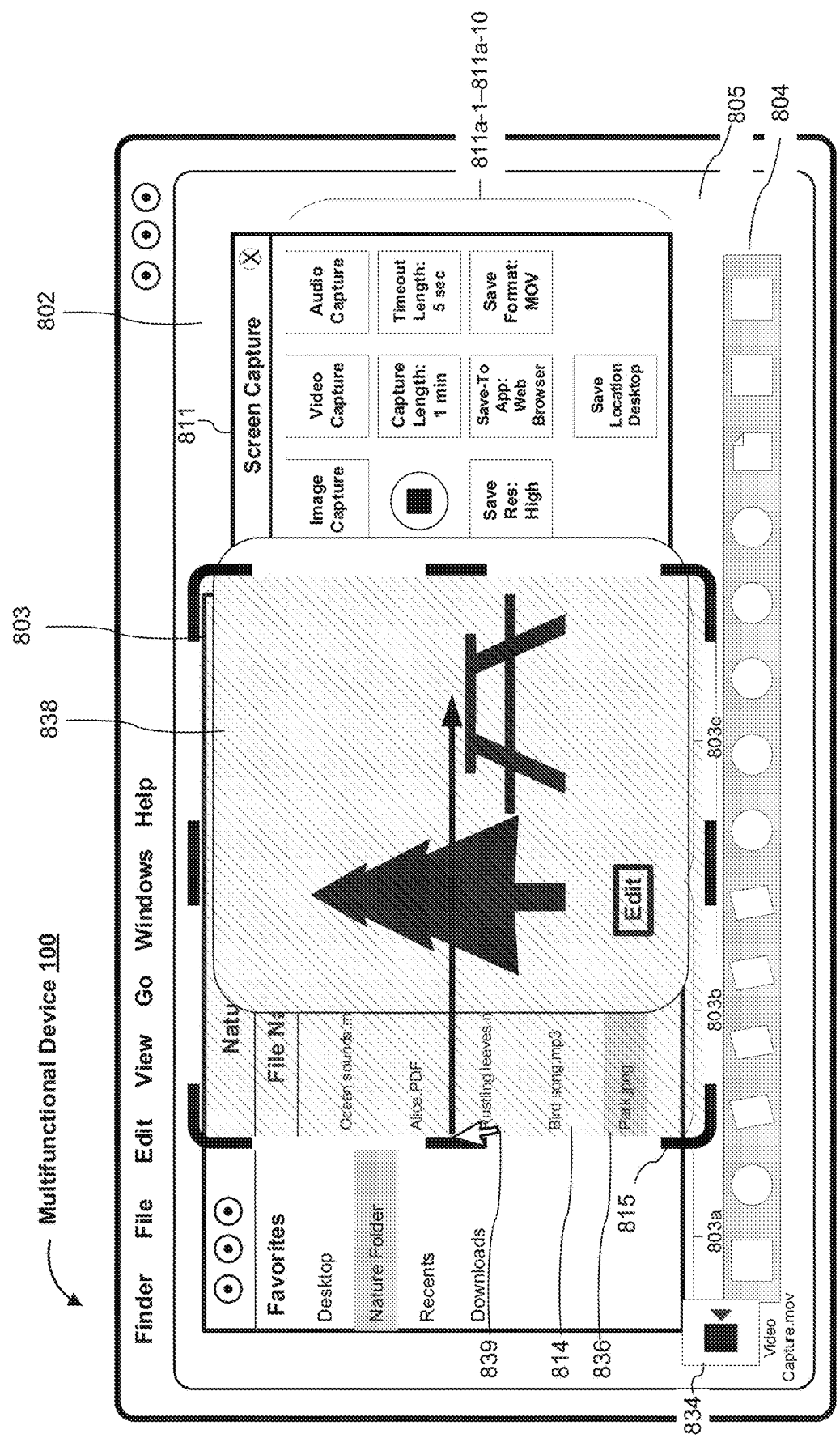

As illustrated in FIG. 8U, the electronic device 100 detects a resize input 839 corresponding to a request to resize (e.g., shrink) the sub-region 814. In response to detecting the resize input 839 in FIG. 8U, the electronic device 100 accordingly resizes the sub-region 814 in FIG. 8V.

Figure 8V:
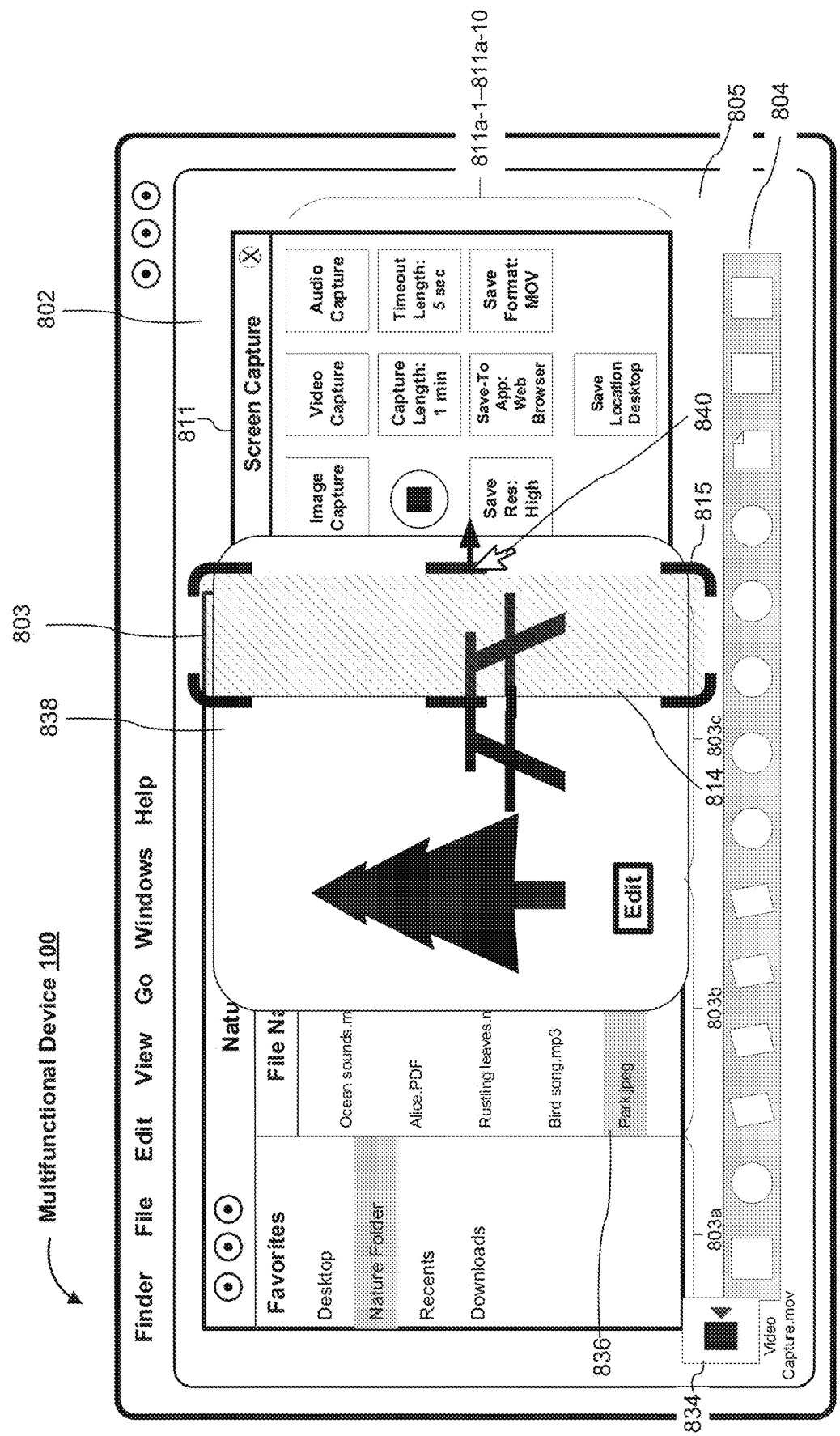
Figure 8W:
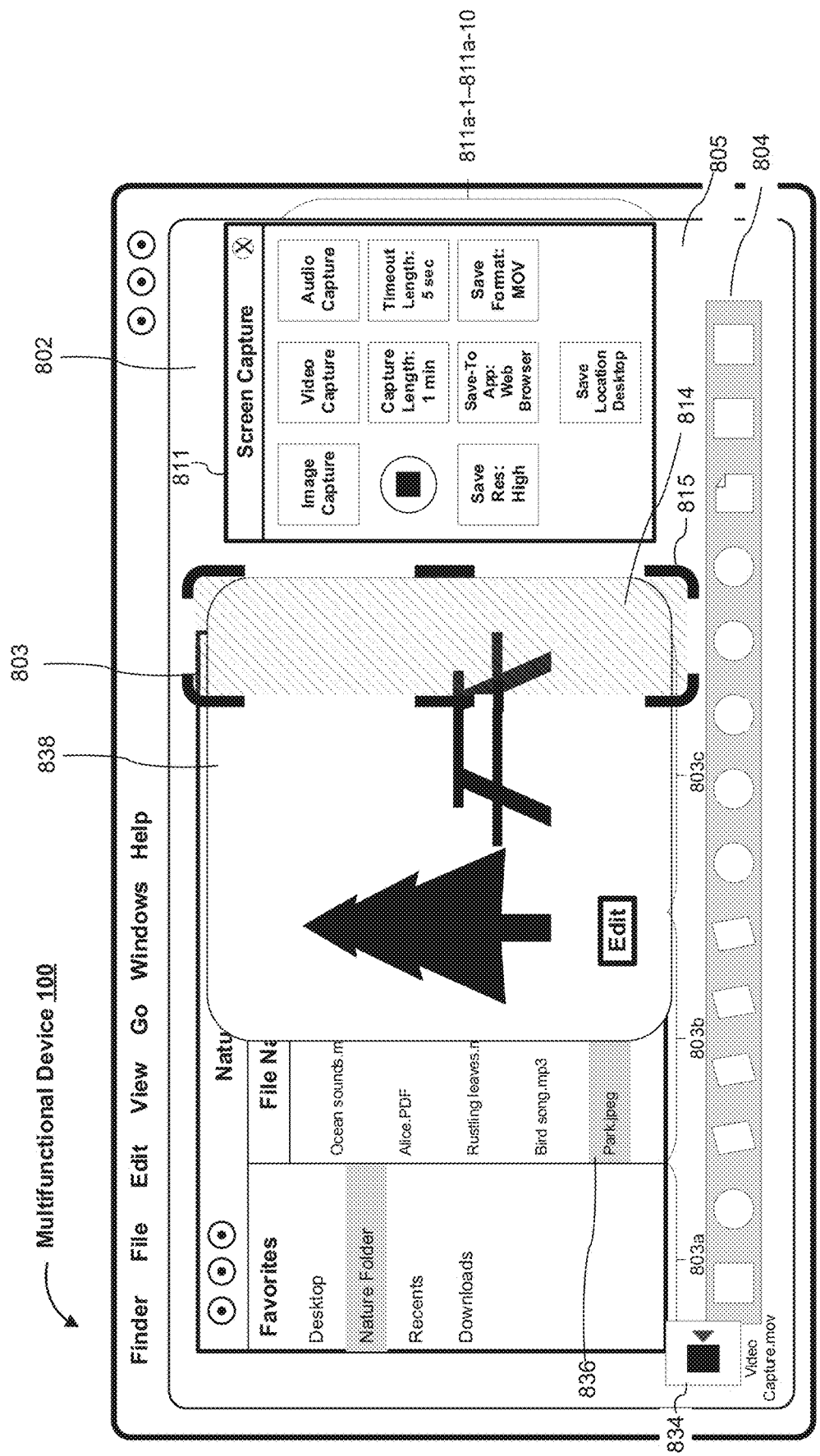

As further illustrated in FIG. 8V, the electronic device 100 detects a move input 840 corresponding to a request to move (e.g., move-right) the sub-region 814. However, the new location of the sub-region 814 overlaps with the screen capture interface 811. Accordingly, in some embodiments, the electronic device 100 moves the screen capture interface 811 in order to avoid overlap between the sub-region 814 and screen capture interface 811. Namely, as illustrated in FIG. 8W the electronic device 100 moves the sub-region 814 to the right based on the move input 840 and likewise moves the screen capture interface 811 to the right in order to avoid overlap with the sub-region 814. One of ordinary skill in the art will appreciate that the screen capture interface 811 may be moved to a variety of locations relative to the location of the sub-region 814.

Figure 8X:
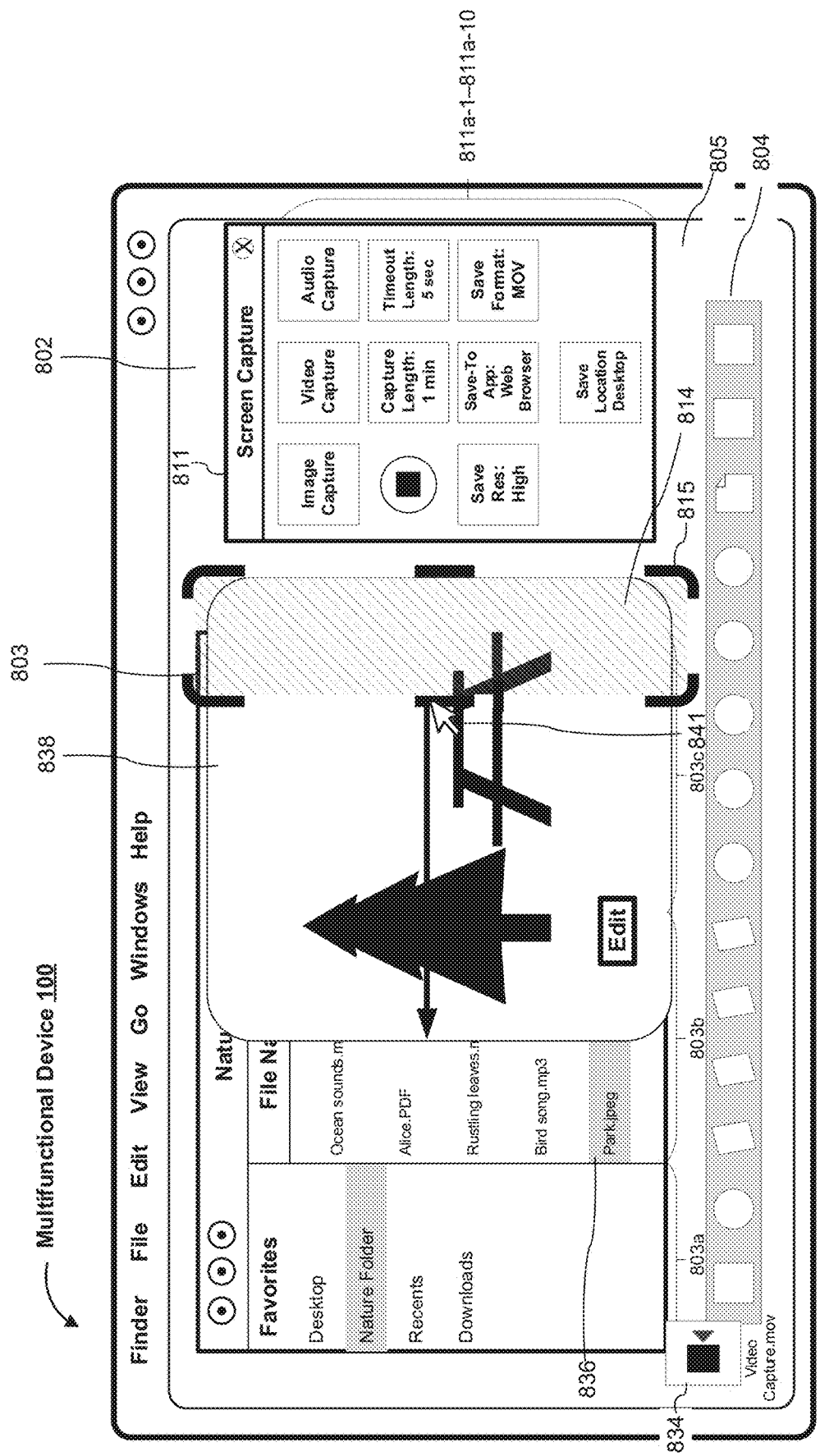
Figure 8Y:
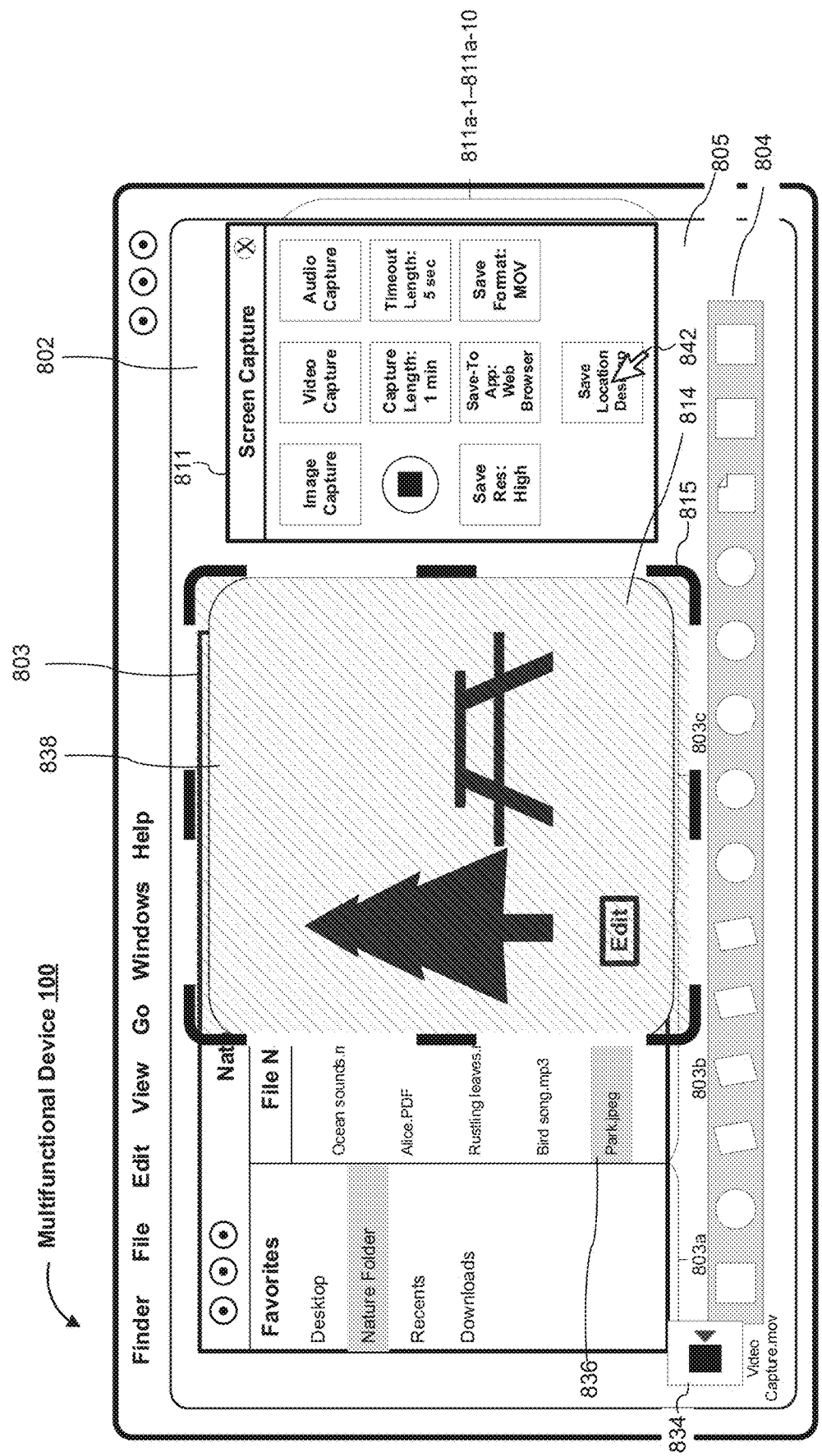

As illustrated in FIG. 8X, the electronic device 100 detects a resize input 841 (e.g., enlarge) corresponding to a request to fit the sub-region 814 to approximately the enlarged preview 838 of "Park.jpeg." In response to detecting the resize input 841 in FIG. 8X, the electronic device 100 accordingly enlarges the sub-region 814, as illustrated in FIG. 8Y.

Figure 8Z:
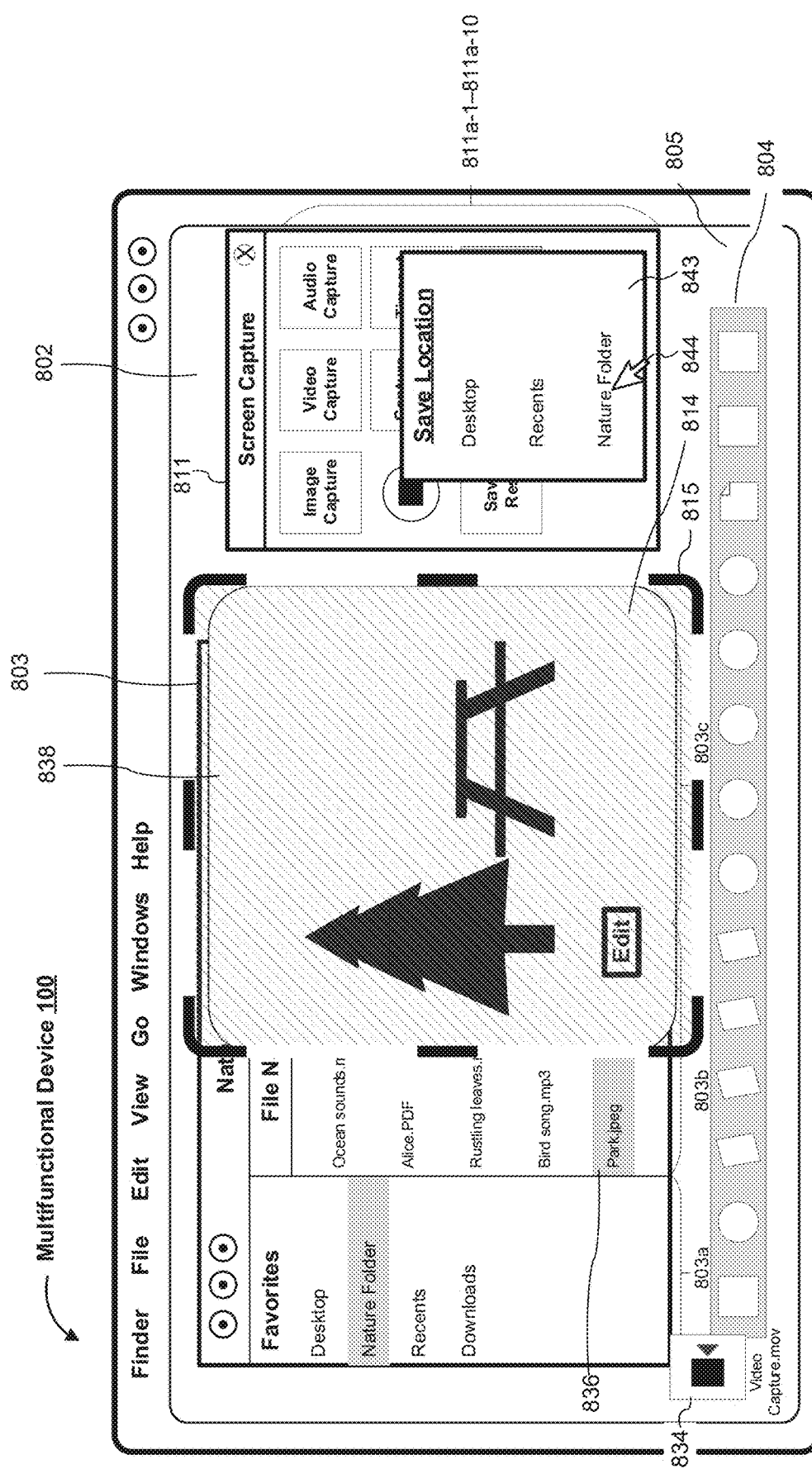
Figure 8A:
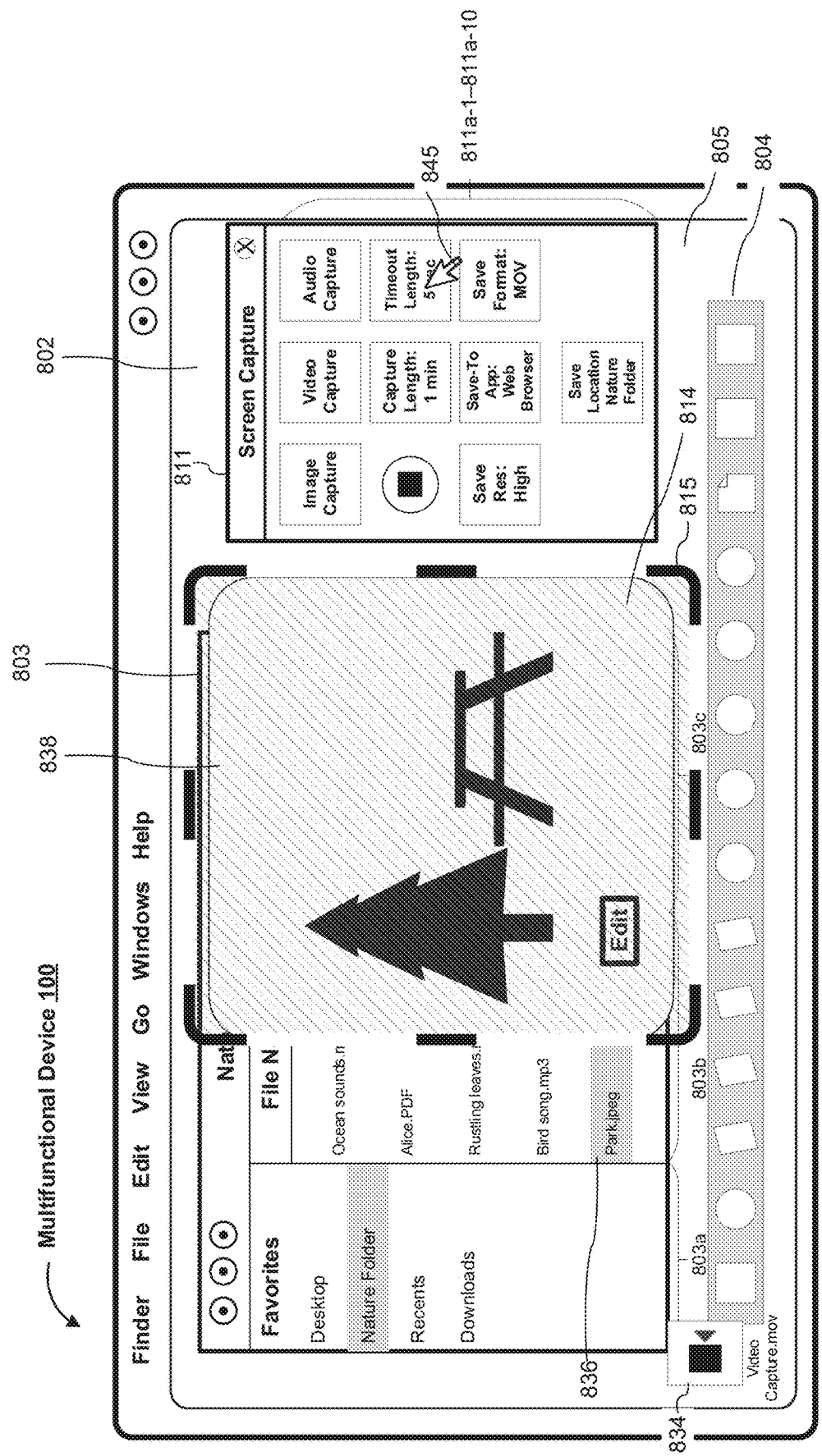
Figure 8A:
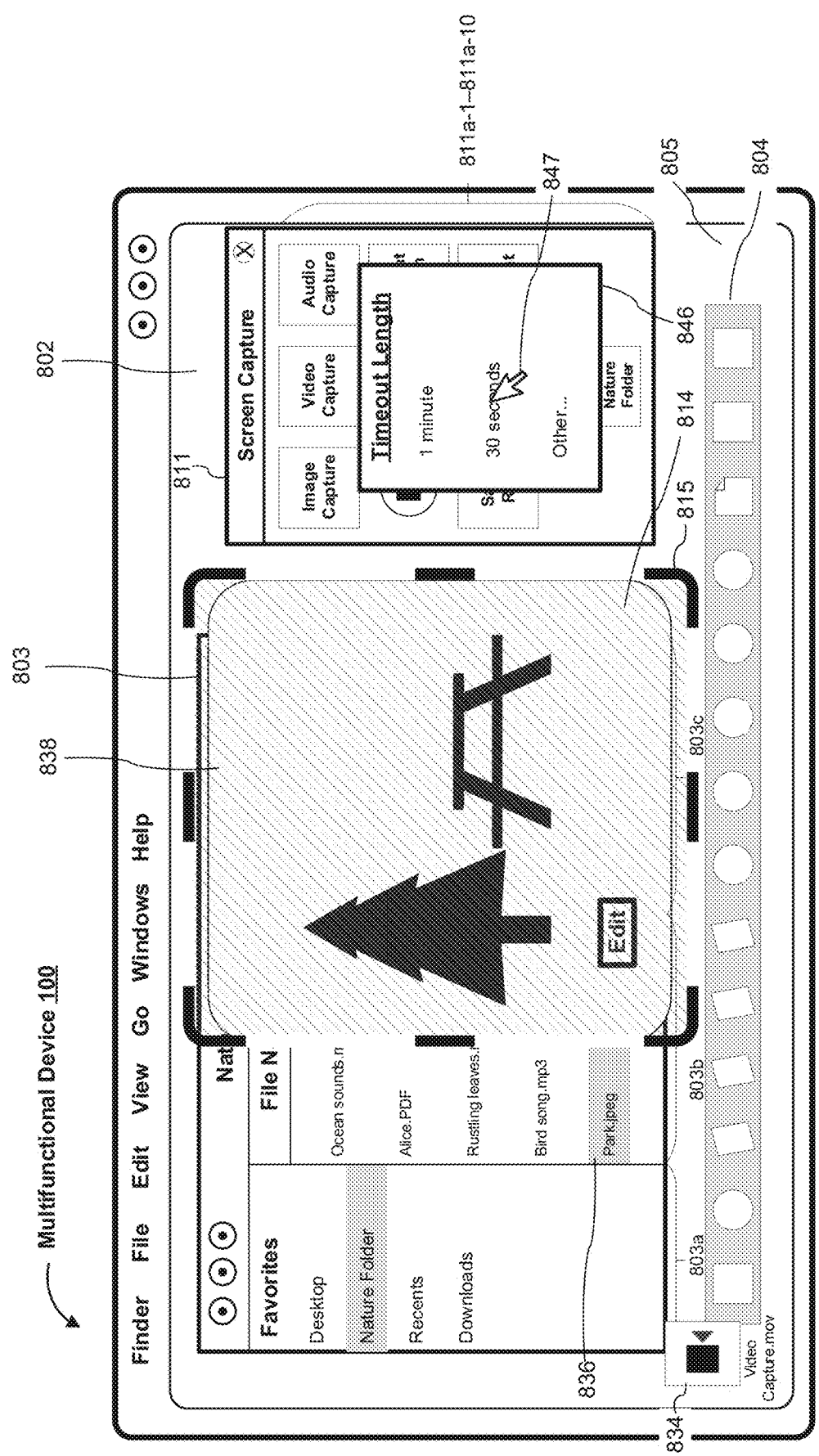
Figure 8A:
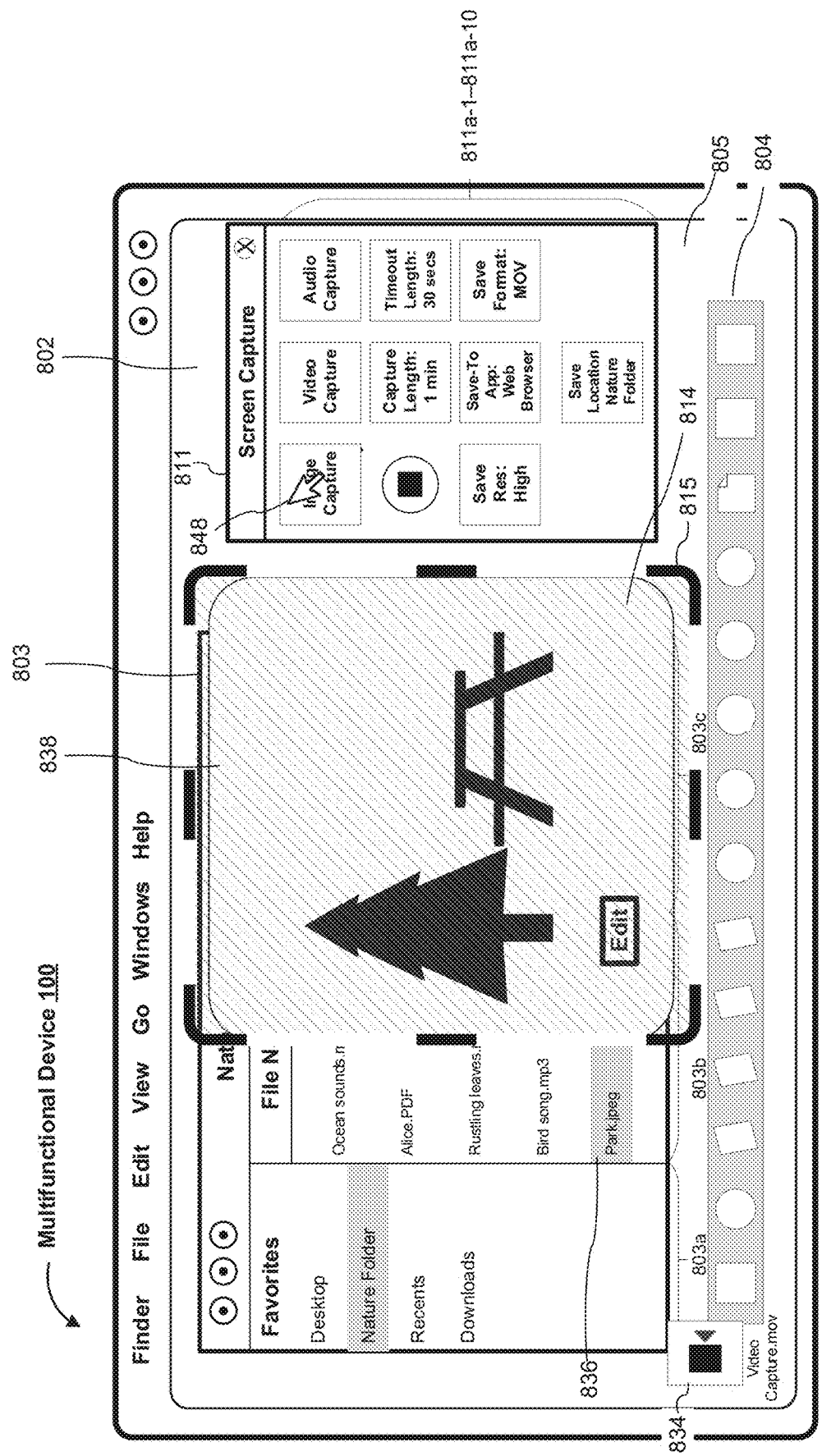
Figure 8A:
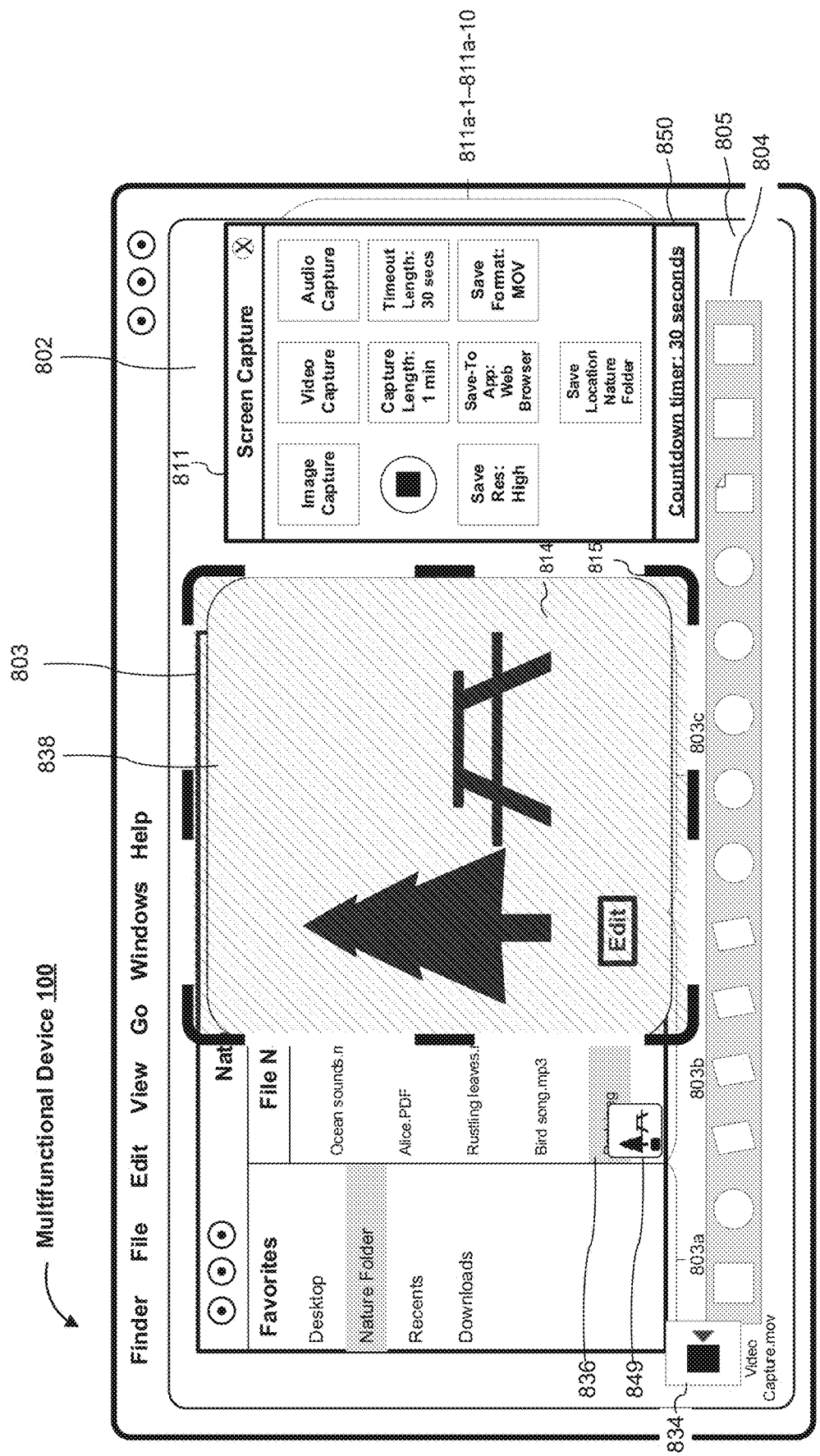
Figure 8A:
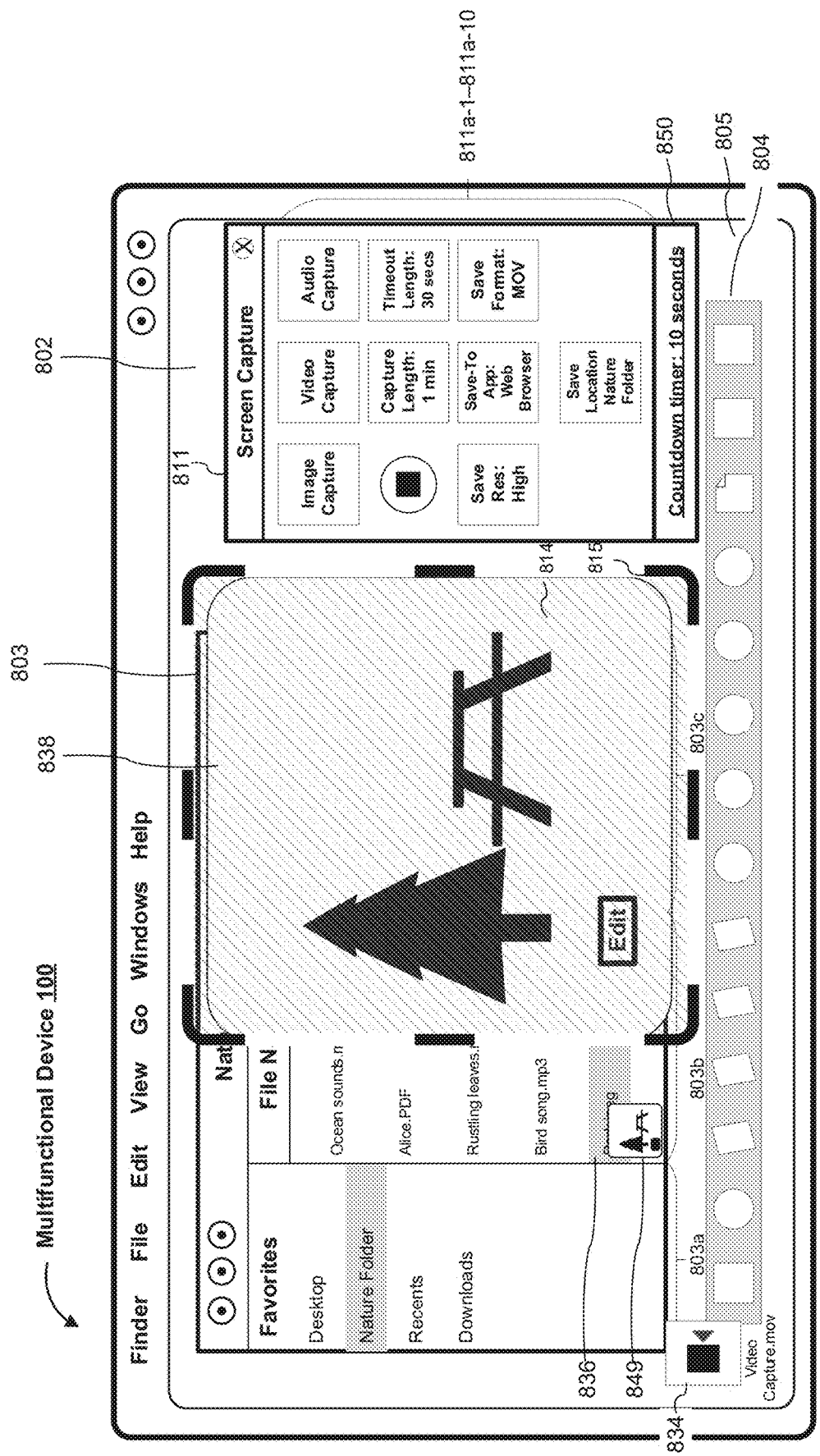
Figure 8A:
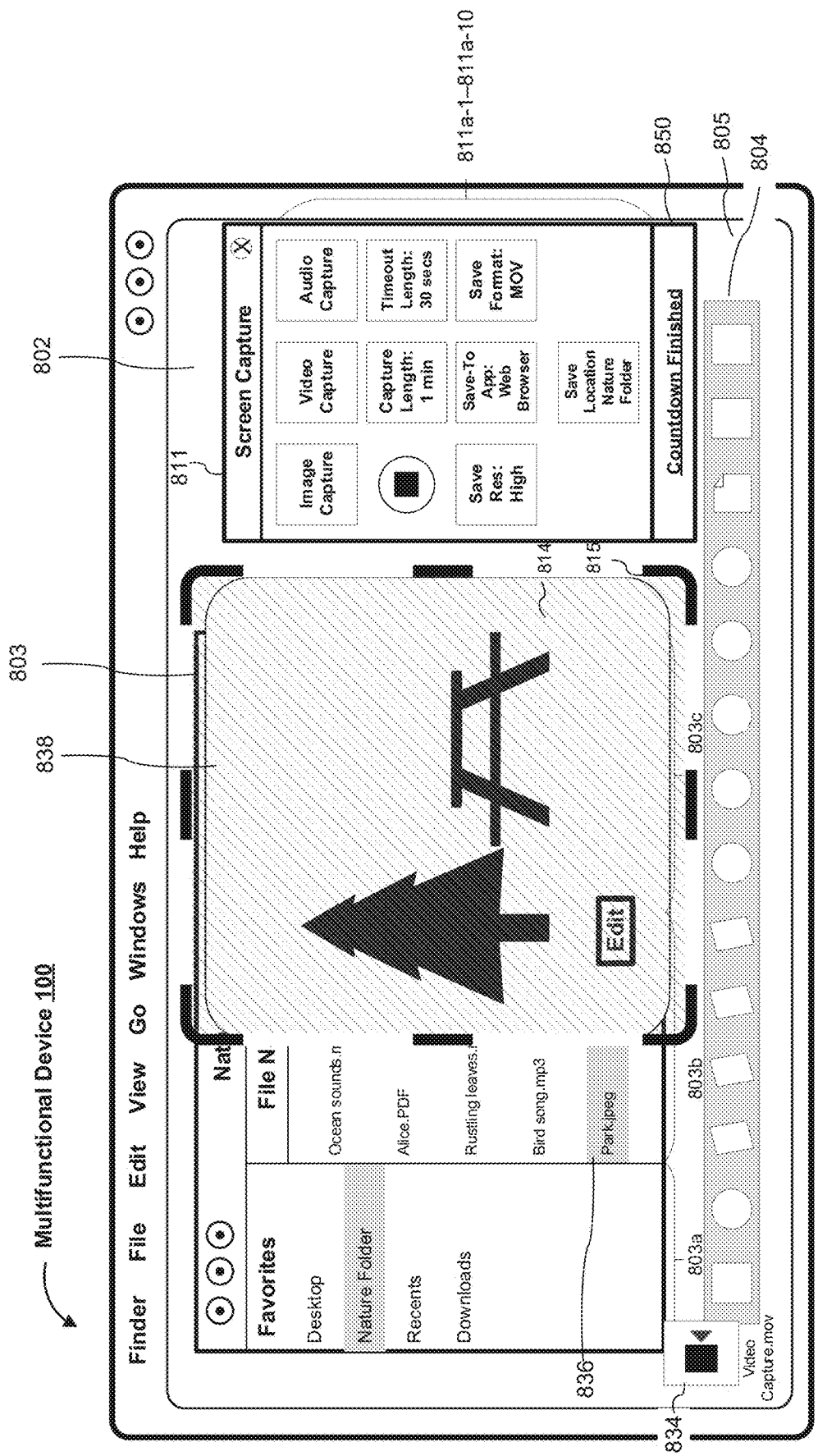
Figure 8A:
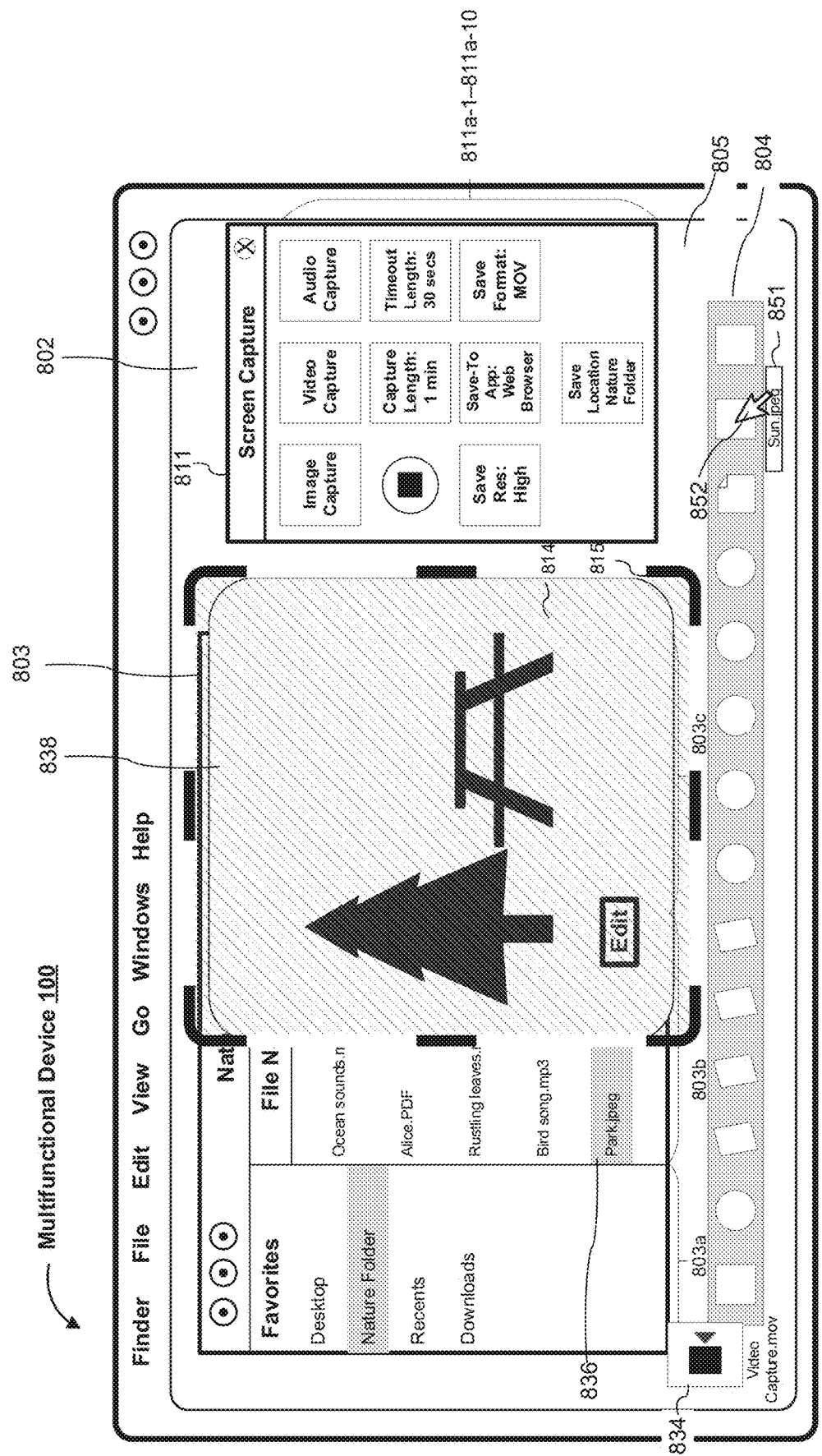
Figure 8A:
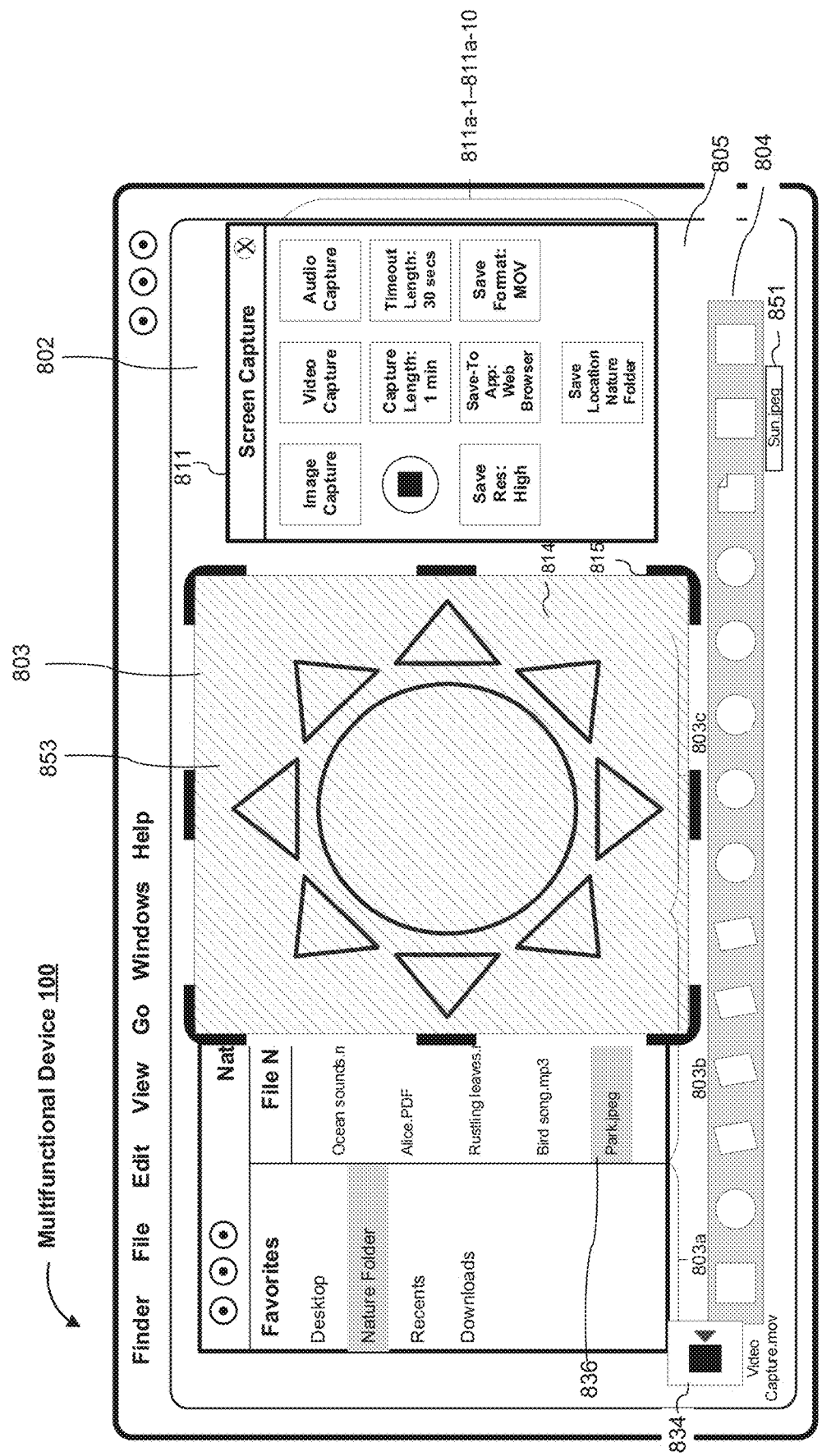
Figure 8A:
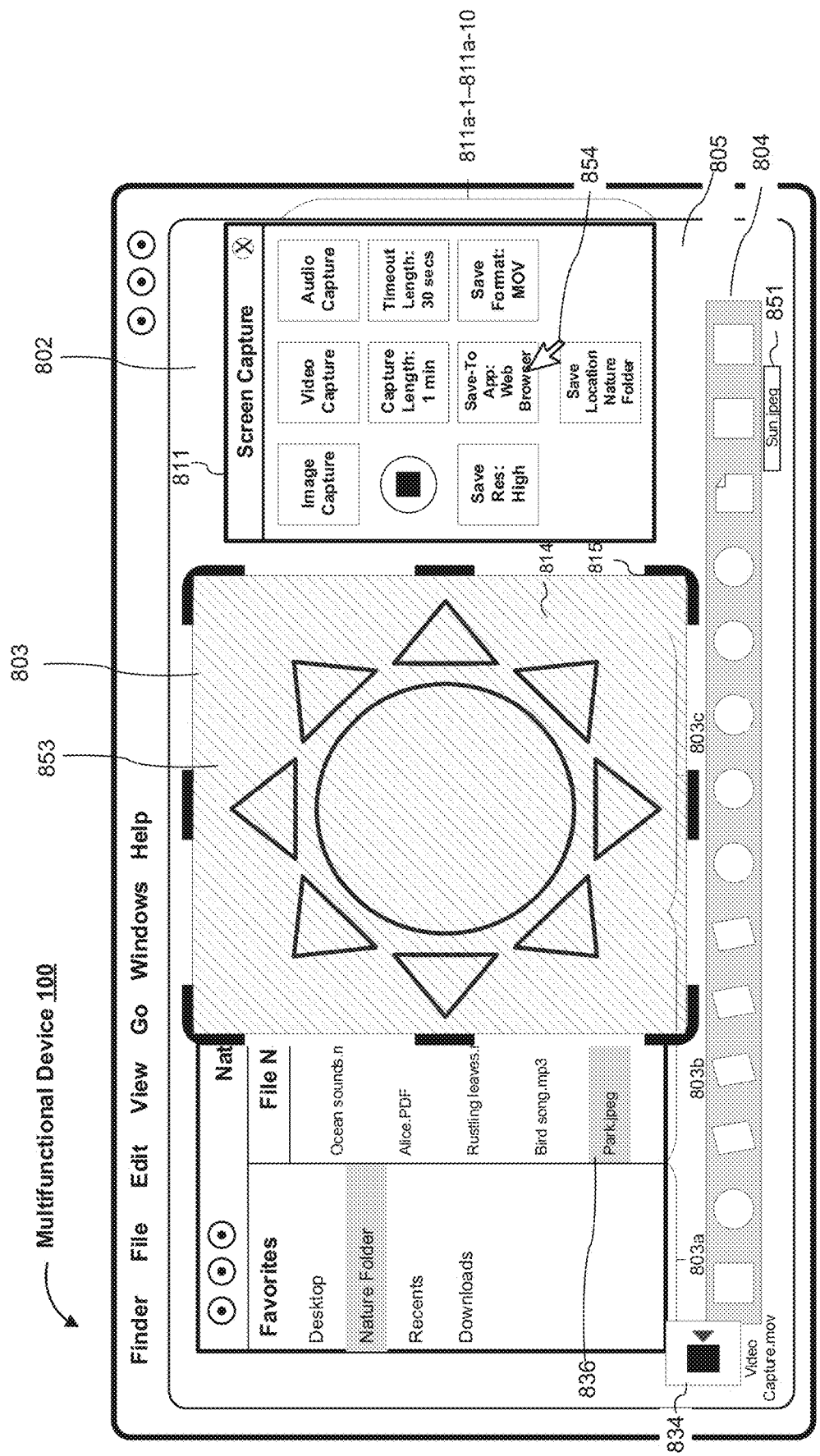
Figure 8A:
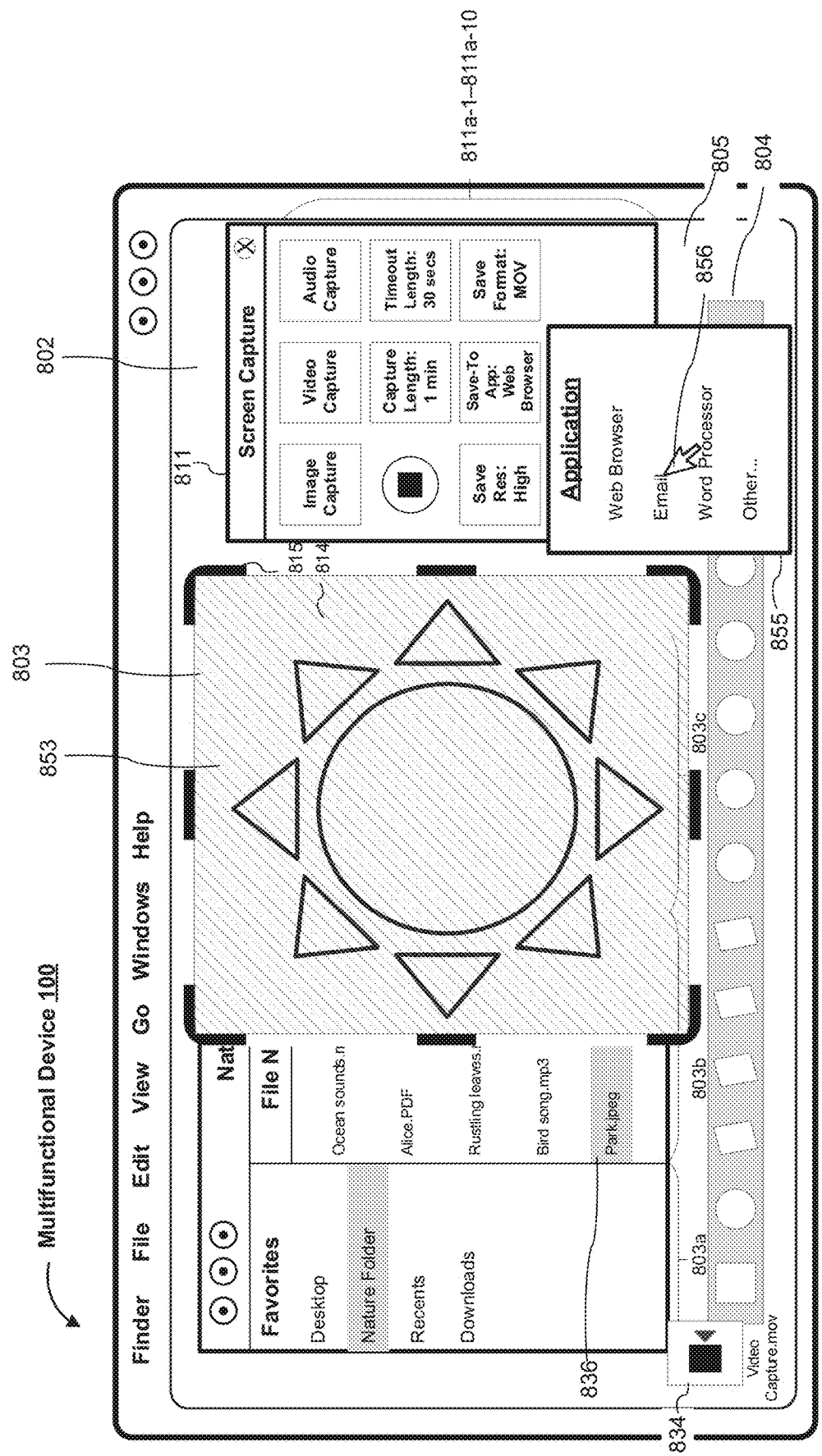
Figure 8A:
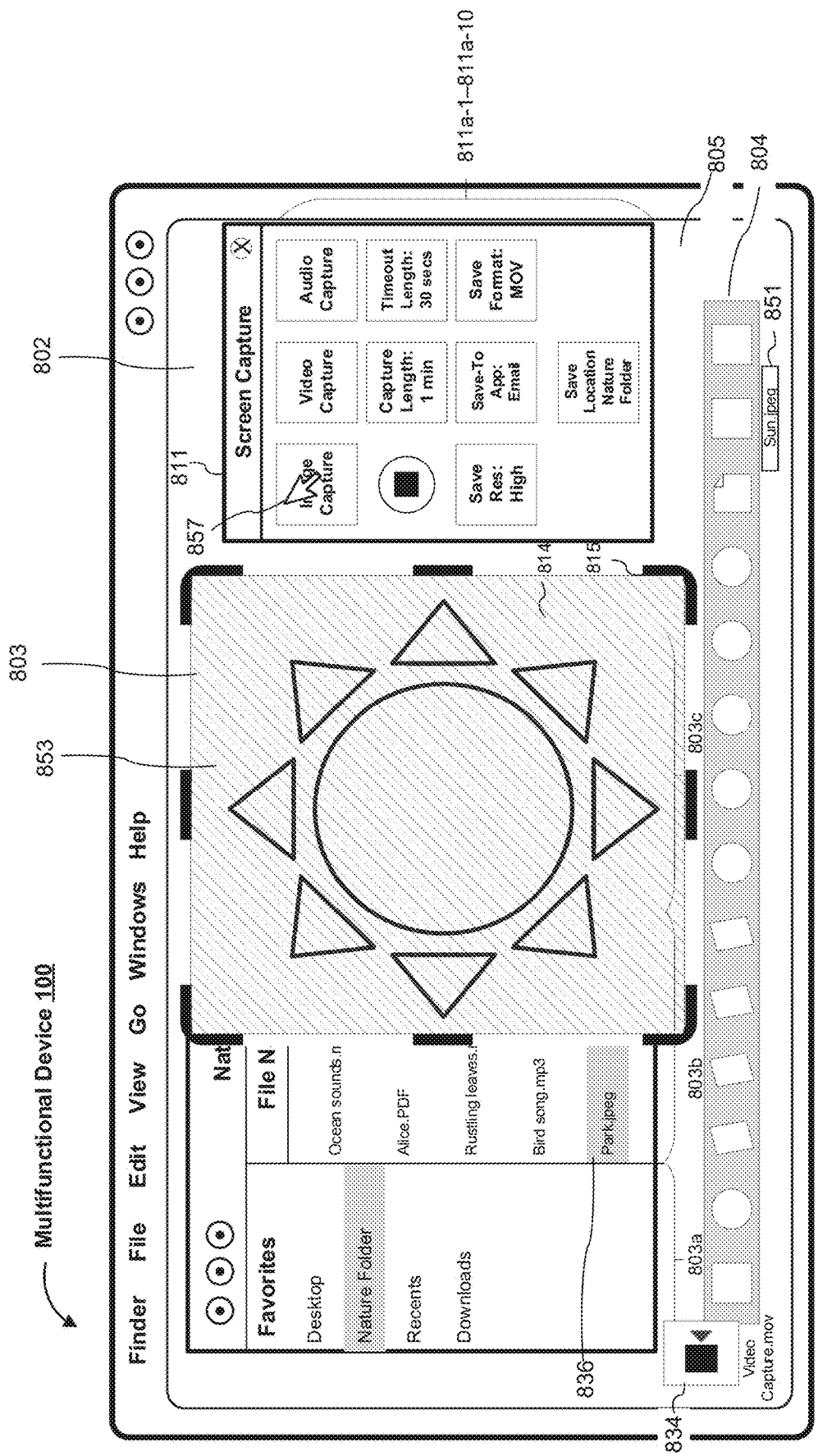
Figure 8A:
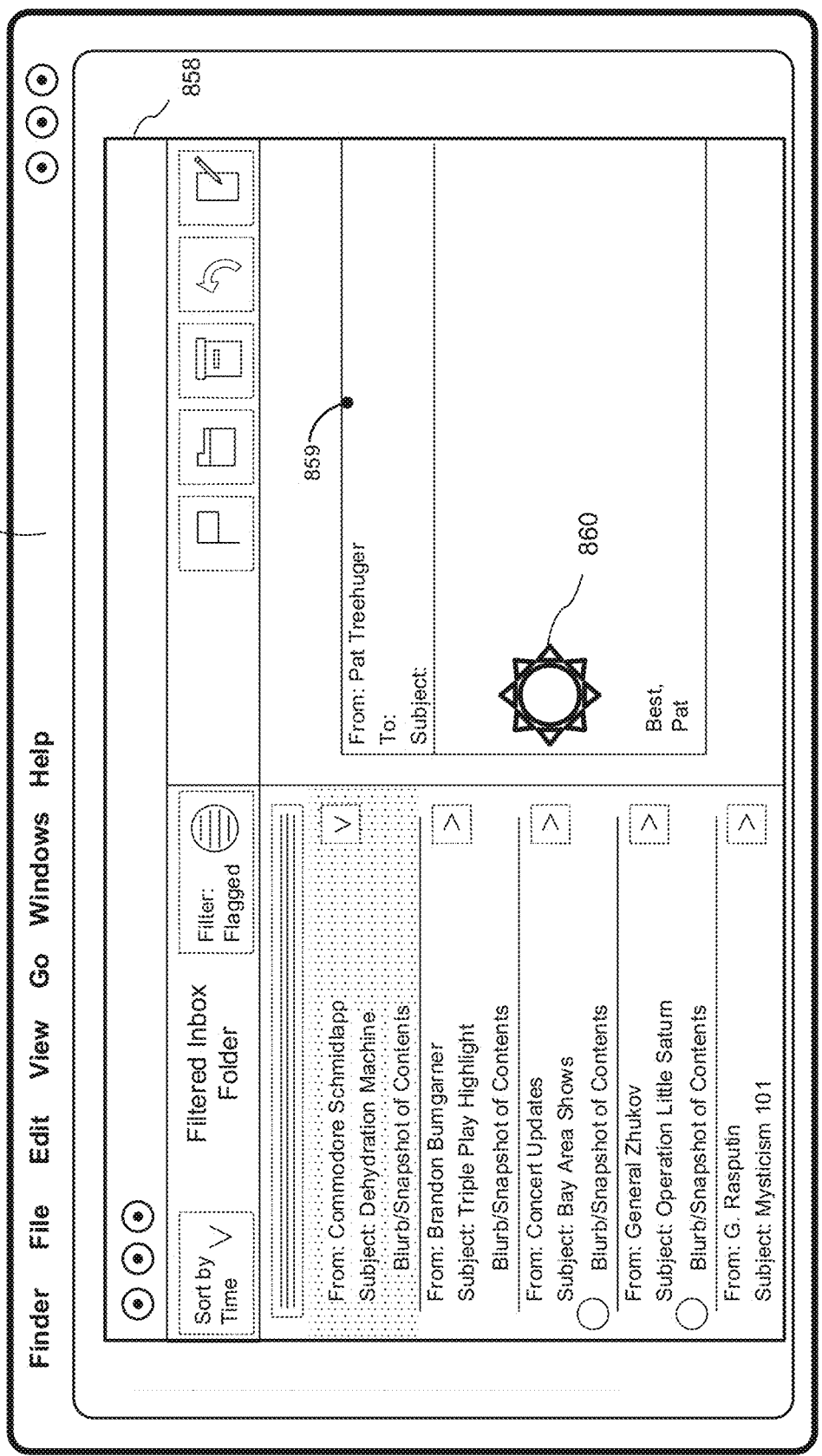

As further illustrated in FIG. 8Y, the electronic device 100 detects an input 842 corresponding to the save location affordance 811a-10. As illustrated in FIG. 8Z, in response to detecting the input 842 in FIG. 8Y, the electronic device 100 displays a save location prompt 843 listing a number of save locations. The electronic device 100 detects an input 844 selecting "Nature Folder" as the save location. In response to detecting the input 844, the electronic device 100 sets "Nature Folder" as the save location for a subsequent screen capture. Additionally, as illustrated in FIGS. 8Z-8AA, the electronic device 100 changes the value displayed within the save location affordance 811a-10 from the value of "Desktop" in FIG. 8AA (obscured by save location prompt 843) to "Nature Folder" in FIG. 8AA.

As further illustrated in FIG. 8AA, the electronic device 100 detects an input 845 corresponding to the timeout length affordance 811a-6. As illustrated in FIG. 8AB, in response to detecting the input 845 in FIG. 8AA, the electronic device 100 displays a timeout length prompt 846 listing a number of timeout lengths. The electronic device 100 detects an input 847 selecting "30 seconds" as the timeout length. In response, the electronic device 100 sets "30 seconds" as the timeout length for a subsequent screen capture. Additionally, as illustrated in FIGS. 8AB-8AC, the electronic device 100 changes the value displayed within the timeout length affordance 811a-6 from the value of "5 sec" in FIG. 8AB (obscured by timeout length prompt 846) to "30 secs" in FIG. 8AC.

As further illustrated in FIG. 8AC, the electronic device 100 detects an input 848 corresponding to the image capture affordance 811a-1 in order to trigger an image capture in accordance with the previously set capture parameters. In response to detecting the input 848 in FIG. 8AC, the electronic device 100 initiates an image capture of the content within the sub-region 814.

As illustrated in FIG. 8AD, the electronic device 100, after performing an image capture, displays a representation 849 of the captured image (e.g., thumbnail of "Park.jpeg."). The electronic device 100 displays the representation 849 in the "Nature" folder because the save location was set to "Nature folder" via input 844 in FIG. 8Z. In some embodiments, after performing the image capture, the electronic device 100 displays the representation 849 floating towards the "Nature folder" or moving towards the "Nature" folder according to another type of animation sequence.

As further illustrated in FIG. 8AD, the electronic device 100 displays a countdown timer 850 having a value of 30 seconds based on the value of the timeout length affordance 811a-6 set via input 847 in FIG. 8AB. As illustrated in FIGS.

8AD-8AE, twenty seconds elapse without an interaction with (e.g., selection of) the representation 849, as indicated by the value of the countdown timer 850 decreasing from 30 seconds to 10 seconds. In some embodiments, in response to detecting an input to the representation 849, the electronic device 100 will restart the countdown timer 850.

As illustrated in FIG. 8AF, the countdown has finished as indicated by countdown timer 850. Because the electronic device 100 detected no input corresponding to the representation 849 during the 30 second timeout duration, the electronic device 100 ceases to display the representation 849 in FIG. 8AF.

As illustrated in FIG. 8AG, the electronic device 100 detects an input 852 directed to the representation 851 of "Sun.jpeg" on the dock 804. As illustrated in FIG. 8AH, in response to detecting the input 852, the electronic device 100 replaces "Park.jpeg" with "Sun.jpeg" within the sub-region 814.

As illustrated in FIG. 8AI, the electronic device 100 detects an input 854 corresponding to the save-to-application affordance 811a-8. As illustrated in FIG. 8AJ, in response to detecting the input 854 in FIG. 8AI, the electronic device 100 displays an application prompt 855 listing a number of applications. The electronic device 100 detects an input 856 selecting "Email" as the application. In response, the electronic device 100 sets the application to an Email program for a subsequent screen capture. Additionally, as illustrated in FIGS. 8AJ-8AK, the electronic device 100 changes the value displayed within the save-to-application affordance 811a-8 from the value of "Web Browser" in FIG. 8AJ to "Email" in FIG. 8AK.

As further illustrated in FIG. 8AK, the electronic device 100 detects an input 857 corresponding to the image capture affordance 811a-1 in order to trigger an image capture in accordance with the previously set capture parameters. In response to detecting the input 857 in FIG. 8AK, the electronic device 100 performs a capture to application operation based on the content captured within the sub-region 814 (e.g., the Sun). Namely, as illustrated in FIG. 8AL, because the save-to-application affordance is set to "Email," the electronic device 100 launches an Email application 858 and inserts in the body of a blank Email a representation 860 of the content with the sub-region 814 (e.g., the Sun). One of ordinary skill in the art will appreciate that the manner in which the electronic device 100 launches the application and inserts a representation of captured content therein may vary.

Figure 9C:
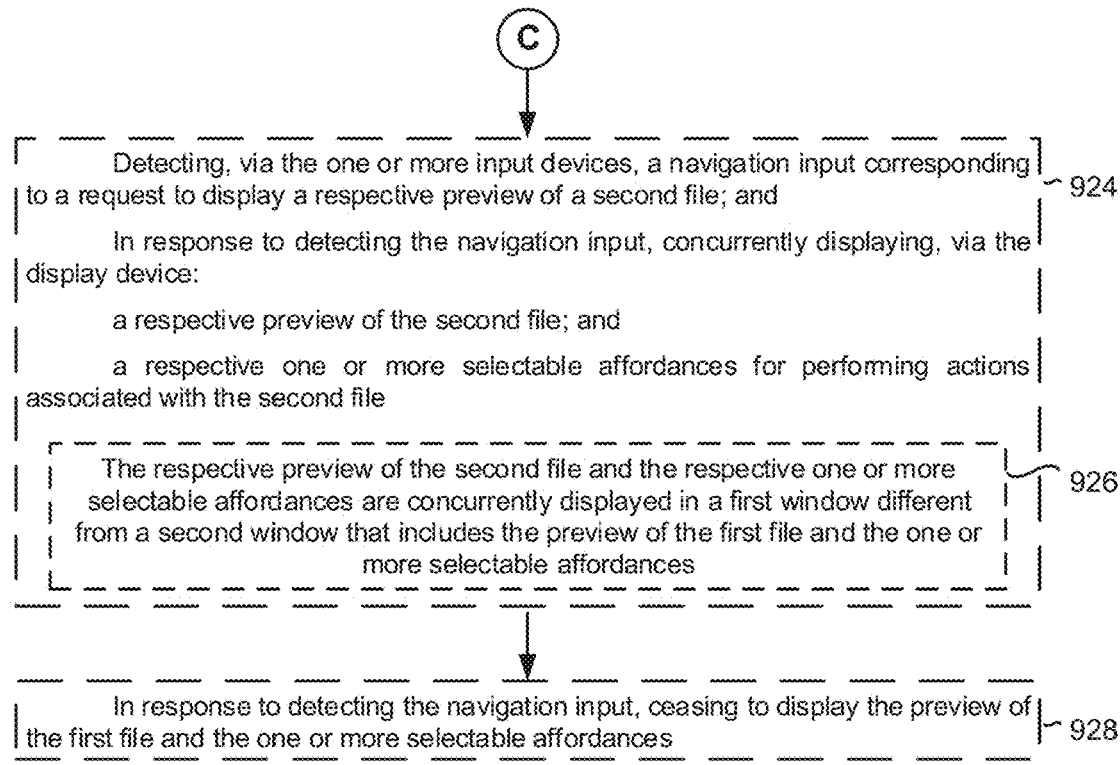

FIGS. 9A-9C is a flow diagram illustrating a method of previewing files in accordance with some embodiments. In some embodiments, the method 900 is performed at an electronic device (e.g., the electronic device 300 in FIG. 3, or the portable multifunction device 100 in FIG. 1A) with one or more processors, a non-transitory memory, one or more input devices, and a display device. Some operations in the method 900 are, optionally, combined and/or the order of some operations is, optionally, changed.

The electronic device utilizes less processing and memory resources displaying a preview of a file than launching an application associated with the file. Reducing the number of inputs associated with previewing a region enhances the operability of the electronic device and makes the electronic device interface more efficient, which, additionally, reduces power usage and wear-and-tear of the electronic device. Moreover, the device displays selectable affordances based on the file content, enable performing operations associated with the file without additional inputs specifying to display the affordances.

With respect to FIG. 9A, while displaying, via a display device, a file browsing user interface that includes a plurality of representations of files, the electronic device detects (902), via the one or more input devices, a first input directed to a representation of a first file of the plurality of representations of the files.

For example, the file browsing user interface corresponds to a file navigation interface (e.g., Finder of Explorer) or a desktop. As another example, the first input corresponds to selecting the representation of the first file, or providing an additional input while the representation of the first file is selected.

As one example, with reference to FIG. 7A, the electronic device 100 detects an input 708 directed to the representation of image file "Park.jpeg" within the file manager 703. As another example, with reference to FIGS. 7L-7M, the electronic device 100 detects input 748 and special input 750 corresponding to a representation 706 of a PDF file on the desktop 705.

In some embodiments, the plurality of representations of the files are included (904) within a first window pane of a first window. Displaying the plurality of representations provides a cleaner (e.g., less cluttered) interface, which reduces the number of inputs needed to rearrange displayed elements. Reducing the number of inputs associated with previewing a region enhances the operability of the electronic device because Reducing the number of inputs makes the electronic device more efficient, and extends the battery life and reduces wear-and-tear of the electronic device. For example, with reference to FIG. 7N, the plurality of representations of the files are included within a window pane 703b of a window 703 that also includes a content preview of "Park.jpeg" within a different window pane 703c of the window 703.

In response to determining that the first input is of a first input type corresponding to a request to display a preview of the first file, the electronic device concurrently displays (906), via the display device: a preview of the first file; and one or more selectable affordances for performing actions associated with the first file. The one or more selectable affordances include: in accordance with a determination that the first file includes content of a first type, displaying, via the display device, a first set of one or more selectable affordances for performing actions associated with the first file; and in accordance with a determination that the first file includes content of a second type, displaying, via the display device, a second set of one or more selectable affordances for performing actions associated with the first file.

For example, in some embodiments, the first input type corresponds to one or more of a gesture (e.g., swipe, lasso), finger touch input, stylus touch input, key tap, mouse click, double-click, double-tap, predefined key combination, voice command, and/or the like. As another example, in some embodiments, the preview includes content of the first file. As yet another example, the selectable affordances provide for one or more of: editing content (e.g., highlighter, pen, pencil, text, ruler, etc.), annotating content, undo/redo content changes, orientation of content (e.g., flip upside down), trimming, etc.), and/or the like. As yet another example, for image or PDF files the set of affordances includes one or more of marker, cropper, eraser, highlighter, pencil, rotator, shading tool, and/or the like. As yet another example, for video files the set of affordances includes one or more of a video trimmer tool, video editing tools, black/white effect, cropper/filtering/distorting, and/or the like. As yet another example, for audio files the set of affordances includes one or more of an audio trimmer tool, filtering, and/or the like.

As one example, with reference to FIG. 7D, the electronic device 100 concurrently displays a content preview 714a and selectable affordances 714b. The selectable affordances 714b correspond to editing tools for the image file. As another example, with reference to FIG. 7L, the electronic device 100 concurrently displays a movie preview 746a and selectable affordances 746b and trimmer tool 746c.

In some embodiments, the preview of the first file is included (908) within a second window pane that is included within the first window. Displaying the representation of files and the preview in the same window enhances the operability of the electronic device and make the user interface of the electronic device more efficient. Reducing the number of inputs associated with previewing a region extends the battery life and reduces wear-and-tear of the electronic device. As one example, with reference to FIG. 7H, the electronic device 100 displays the preview 730a of "Ocean sounds.mp3" within the same window 703 that includes the file representations in window pane 703b.

In some embodiments, the second window pane is included (910) within a docking area of the first window. Displaying the preview in a docking area of a window that includes file representations, including the file representation associated with the preview, enhances the operability of the electronic device and make the user interface of the electronic device more efficient. Reducing the number of inputs associated with previewing a region extends the battery life and reduces wear-and-tear of the electronic device. As one example, with reference to FIG. 7H, the electronic device 100 displays the preview 730a of "Ocean sounds.mp3" within a docking area 703c included within the window 703 that includes the file representations in window pane 703b.

In some embodiments, the preview of the first file is included (912) within a second window that is different from the first window. Displaying the preview in a second window different from the first window that includes the representation of files can reduce clutter, thereby requiring fewer inputs in order to rearrange the user interface of the electronic device. Reducing the number of inputs associated with previewing a region enhances the operability of the electronic device and make the user interface of the electronic device more efficient, which extends the battery life and reduces wear-and-tear of the electronic device. As one example, with reference to FIG. 7E, the electronic device 100 displays the preview of "Park.jpeg" in a window 714 that is different from the window 703. Accordingly, inputs for arranging the user interface are obviated, increasing the operability and efficiency of the electronic device 100.

In some embodiments, the electronic device detects (914), via the one or more input devices, a second input corresponding to a request to change at least a subset of the one or more selectable affordances. In response to detecting the second input, the electronic device changes (914) at least the subset of the one or more selectable affordances (e.g., to a new set of selectable affordances). Changing from one set of affordances to another set of affordances based on a second input to an open window reduces the number of inputs to the electronic device. Reducing the number of inputs associated with previewing a region enhances the operability of the electronic device and make the user interface of the electronic device more efficient, which extends the battery life and reduces wear-and-tear of the electronic device.

For example, the second input corresponds to a hot-key, double-click, gesture, and/or the like. As another example, the new set of selectable affordances is different from the previously displayed selectable affordances. In some examples, there is at least some overlap between the new set of selectable affordances and the previously displayed selectable affordances. As yet another example, the second input is directed to a selectable affordance of the one or more displayed electable affordances. In some embodiments, changing the one or more selectable affordances corresponds to removing at least a subset of the one or more selectable affordances from the display. In some embodiments, the new selectable affordances are associated with second actions different from the actions associated with the previously displayed selectable affordances.

As one example, with reference to FIGS. 7V-7W, the electronic device 100 changes the selectable affordances 774c based types of files being previewed. Namely, the selectable affordances 774c are changed from rotation affordances to a zip affordance.

With reference to FIG. 9B, in some embodiments, in response to determining that the first input is of a second input type that is different from the first input type, the electronic device launches (916) the first file in an application. Having the electronic device preview the first file based on a first input type and launch the first file in an application based on a second input type reduces resource utilization of the electronic device because displaying the preview is less resource intensive. Reducing the number of inputs associated with previewing a region enhances the operability of the electronic device and make the user interface of the electronic device more efficient, which extends the battery life of the electronic device. For example, the second type corresponds to a gesture (e.g., swipe, lasso), key tap, mouse click, double-click, double-tap, predefined key combination, voice command, and/or the like. As another example, the application corresponds to the native application of the first file, such as iMovie for movie files. As one example, with reference to FIG. 7X-7Z, in response to detecting the input 786 of a second type in FIG. 7X, the electronic device 100 launches "Bird song.mp3" in an application 794 native to mp3 files, as illustrated in FIG. 9Z.

In some embodiments, the electronic device detects (918), via the one or more input devices, an edit input corresponding to the preview of the first file. In response to detecting the edit input, the device changes (918) content displayed within the preview of the first file based on a particular affordance of the one or more selectable affordances that has focus. Changing the displayed preview based on one or more inputs to an open preview window reduces the number of inputs to the electronic device. Reducing the number of inputs associated with previewing a region enhances the operability of the electronic device and make the user interface of the electronic device more efficient, which extends the battery life of the electronic device.

For example, the edit input corresponds to modifying the preview of the first file. As another example, the particular affordance has focus by default (e.g., based on the affordance having the most applicability to the content; based on preset value). As yet another example, an input to the electronic device specifies the default particular affordance having focus. For example, an input specifies a marker tool to be the default tool for an image and a highlighter to be the default tool for a PDF file. In some embodiments, changes to the content are saved into a file without additional inputs (e.g., automatically). In some embodiments, changes to the content prompt a save menu for saving of the file (e.g., to a particular destination with a certain filename).

As one example, with reference to FIGS. 7O-7P, the electronic device 100 changes content within the "Walden.PDF" preview 752. Namely, in response to receiving a highlight edit input 756 in FIG. 7O, the electronic device 100 displays a corresponding highlighter mark 758 overlaid on the content in FIG. 7P.

In some embodiments, the electronic device detects (920), via the one or more input devices, a selection input corresponding to the particular affordance of the one or more selectable affordances. Changing the displayed preview based on one or more inputs to an open preview window, one of which selects a particular affordance, reduces the number of inputs to the electronic device. Reducing the number of inputs associated with previewing a region enhances the operability of the electronic device and make the user interface of the electronic device more efficient, which extends the battery life of the electronic device. As one example, between FIGS. 7T-7U, the electronic device 100 concurrently rotates the first preview 774a and the second preview 774b in FIG. 7U in response to receiving a corresponding clockwise affordance selection input 776 in FIG. 7T.

In some embodiments, in response to detecting, via the one or more input devices, a navigation input corresponding to a request to cease displaying the preview of the first file, the electronic device displays (922), via the display device, a prompt (e.g., window, overlay, etc.) providing an option to save changes made to the preview of the first file. Having the electronic device save content based on an input to an open window displayed by the electronic device reduces the number of inputs to the electronic device. Reducing the number of inputs associated with previewing a region enhances the operability of the electronic device and make the user interface of the electronic device more efficient, which extends the battery life of the electronic device. For example, the navigation input corresponds to a request to close the preview of the first file. As another example, the prompt includes options for saving the content to a particular file type (e.g., PDF, doc) and/or location. As yet another example, the prompt includes the option to forego saving the content.

As one example, with reference to FIGS. 7D-7E, in response to receiving an 720 input corresponding to a different file representation ("Ocean sounds.mp3") in FIG. 7D, the electronic device 100 displays a save prompt 722 in FIG. 7E. As another example, with reference to FIGS. 7P-7Q, in response to receiving an input 760 corresponding to a request to close the preview window 752, the electronic device 100 displays a save prompt 762 in FIG. 7Q.

With reference to FIG. 9C, in some embodiments, the electronic device detects (924), via the one or more input devices, a navigation input corresponding to a request to display a respective preview of a second file. In response to detecting the navigation input, the electronic device concurrently displays (924), via the display device: a respective preview of the second file; and a respective one or more selectable affordances for performing actions associated with the second file. Displaying a second preview and respective selectable affordances based on one or more inputs to displayed file representations reduces the number of inputs to the electronic device. Reducing the number of inputs associated with previewing a region enhances the operability of the electronic device and make the user interface of the electronic device more efficient, which extends the battery life of the electronic device. In some embodiments, the second file is different from the first file.

For example, the navigation input corresponds to press of an arrow key, tap of another representation of another file, hot-key, and/or the like. As another example, the respective preview includes content of the second file. As yet another example, the respective selectable affordances provide for one or more of: editing content (e.g., highlighter, pen, pencil, text, ruler, etc.), annotating content, undo/redo content changes, orientation of content (e.g., flip upside down), trimming, etc.), and/or the like. As yet another example, for image or PDF files the respective set of affordances includes one or more of marker, cropper, eraser, highlighter, pencil, rotator, shading tool, and/or the like. As yet another example, for video files the respective set of affordances includes one or more of a video trimmer tool, video editing tools, black/white effect, cropper/filtering/distorting, and/or the like. As yet another example, for audio files the respective set of affordances includes one or more of an audio trimmer tool, filtering, and/or the like.

As one example, with reference to FIGS. 7M-7N, the electronic device 100 detects a navigation input 750 in FIG. 7M corresponding to a request a respective preview of a second file, "Walden excerpt.pdf." In response to receiving the navigation input 750 in FIG. 7M, the electronic device 100 displays a respective preview 752 of the second file in FIG. 7N.

In some embodiments, the electronic device concurrently displays (926) the respective preview of the second file and the respective one or more selectable affordances in a first window different from a second window that includes the preview of the first file and the one or more selectable affordances. Displaying the previews and affordances in separate windows reduces clutter, thereby requiring fewer inputs in order to rearrange the user interface of the electronic device. Reducing the number of inputs associated with previewing a region enhances the operability of the electronic device and make the user interface of the electronic device more efficient, which extends the battery life and reduces wear-and-tear of the electronic device. As one example, with reference to FIG. 7O, the electronic device 100 displays affordances 752e associated with "Walden excerpt.pdf" in a preview window 752 separate from the window 703 that includes affordances 746c associated with "Rustling leaves.mov."

In some embodiments, in response to detecting the navigation input, the electronic device ceases (928) to display the preview of the first file and the one or more selectable affordances. Ceasing to display the preview of the first file and the corresponding affordances can reduce clutter, thereby requiring fewer inputs in order to rearrange the user interface of the electronic device. Reducing the number of inputs associated with previewing a region enhances the operability of the electronic device and make the user interface of the electronic device more efficient, which extends the battery life and reduces wear-and-tear of the electronic device.

In some embodiments, the respective preview of the second file and corresponding affordances replaces display of the preview of the first file and corresponding affordances. In some embodiments, the respective preview of the second file and corresponding affordances are displayed in a different location than where the preview of the first file and corresponding affordances were previously displayed.

As one example, with reference to FIGS. 7D-7F, the electronic device 100 displays a preview 714 of "Park.jpeg" and detects a navigation input 720 in FIG. 7D requesting to select "Ocean sounds.mp3." In response to detecting the navigation input 720 in FIG. 7D, the electronic device 100 ceases display of the preview 714 of "Park.jpeg" in FIG. 7F.

FIGS. 10A-10E is a flow diagram illustrating a method of screen capturing accordance with some embodiments. In some embodiments, the method 1000 is performed at an electronic device (e.g., the electronic device 300 in FIG. 3, or the portable multifunction device 100 in FIG. 1A) with one or more processors, a non-transitory memory, one or more input devices, and a display device. Some operations in the method 1000 are, optionally, combined and/or the order of some operations is, optionally, changed.

Compared to previous systems, the electronic device utilizes less processing and memory resources by using a screen capture interface (disclosed herein) in order to capture a particular sub-region and changes within that sub-region. For example, the electronic device captures screenshots of changes within the sub-region based on fewer inputs. Reducing the number of inputs associated with previewing a region enhances the operability of the electronic device and makes the electronic device interface more efficient, which, additionally, reduces power usage and wear-and-tear of the electronic device. Moreover, the screen capture interface, and in some embodiments the displayed screenshot representation, include affordances for customizing capture of the screenshot and/or editing the screenshot representation. These affordances further reduce the number of inputs.

Figure 10A:
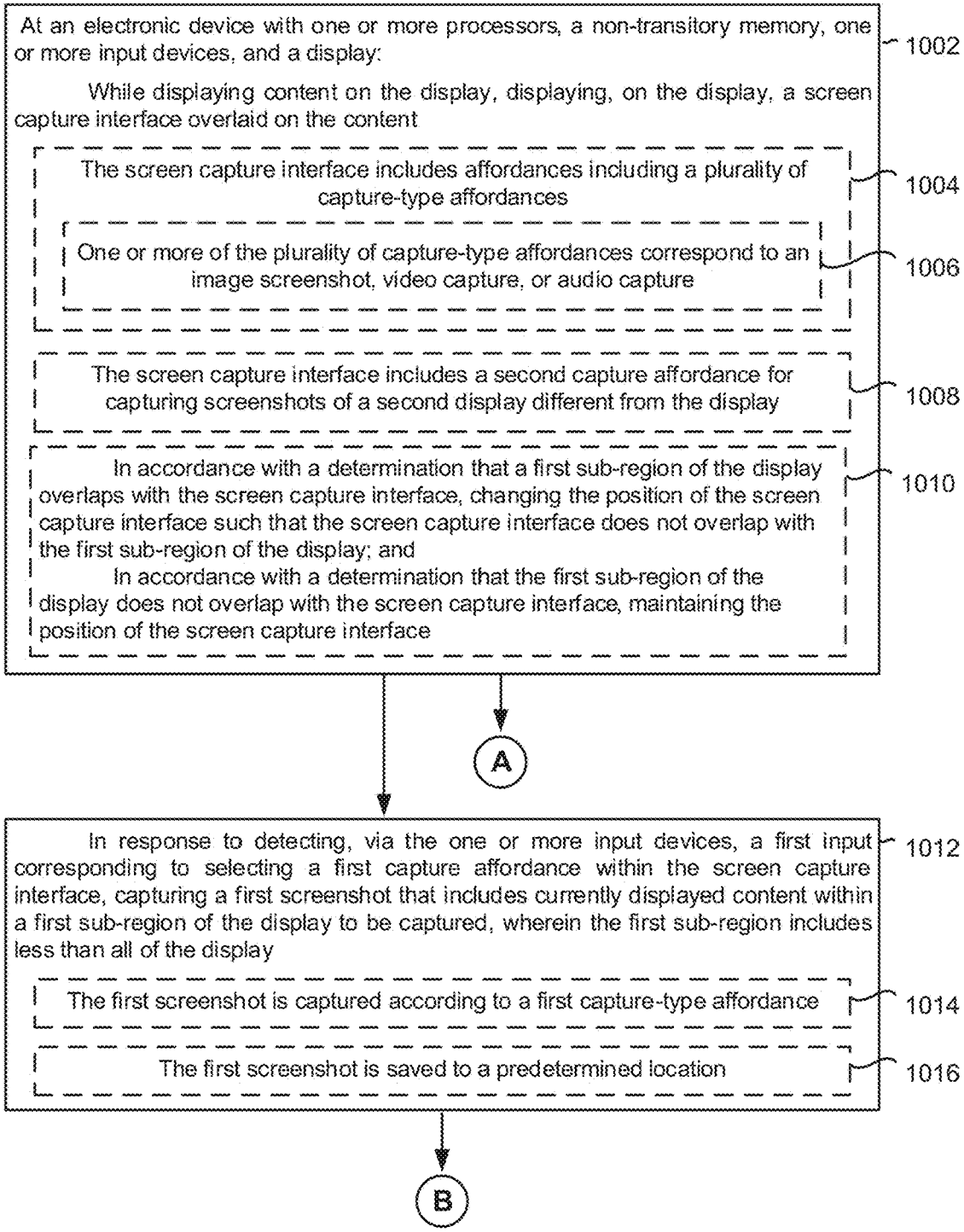

With respect to FIG. 10A, while displaying content on the display, the electronic device displays (1002), on a display, a screen capture interface overlaid on the content. Displaying the screen capture interface provides a mechanism for capturing sub-regions and changes therein with fewer inputs than in previous systems. Reducing the number of inputs associated with capturing a region enhances the operability of the electronic device and make the user interface of the electronic device more efficient, which extends the battery life and reduces wear-and-tear of the electronic device.

For example, the content includes everything being displayed on the display, or portions thereof (e.g., everything but the taskbar). As another example, the screen capture interface corresponds to a user interface element, such as a window or overlay. As yet another example, the screen capture interface is docked, such as being docked within an OS element (e.g., taskbar). As yet another example, the electronic device displays the screen capture interface at the highest z-order—e.g., on top of other windows. As one example, with reference to FIG. 8C, the electronic device 100 displays a screen capture interface 811 overlaid on a desktop 805. It is to be appreciated that electronic device may display the screen capture interface overlaid on any type of content.

In some embodiments, the screen capture interface includes (1004) affordances including a plurality of capture-type affordances. Displaying, within an interface, affordances that support and facilitate screenshot capture reduces the number of inputs. Reducing the number of inputs associated with capturing a region enhances the operability of the electronic device and make the user interface of the electronic device more efficient, which extends the battery life and reduces wear-and-tear of the electronic device. For example, the affordances correspond to one or more of the following: a designation affordance provided to designate a first sub-region; a stop capture affordance provided to stop screenshot capture; an application affordance provided to designate an application within which to display a representation of a screenshot; a resize region affordance provided to enable resizing the first sub-region; a move region affordance provided to enable moving the first sub-region; a resolution affordance provided to set the resolution associated with the capture; a save affordance provided to save the screenshot; a save format affordance provided to set a file format of a saved screenshot; a save location affordance to set a location of a saved screenshot; a duration affordance provided to set a screenshot capture duration; a capture condition affordance provided to set one or more conditions for triggering a capture; a display affordance provided to request display of a representation of a captured screenshot; a countdown timer affordance; a show/do not show cursor affordance in the captured screenshot provided to specify whether or not to capture the cursor as part of the screenshot; and/or the like.

As an example, as illustrated in FIG. 8C, the screen capture interface 811 includes the following affordances: image capture affordance 811a-1 for initiating an image capture; video capture affordance 811a-2 for initiating a video capture; audio capture affordance 811a-3 for initiating an audio capture; stop affordance 811a-4 for stopping a capture; capture length affordance 811a-5 for setting the duration of the capture; timeout affordance 811a-6 for setting an inactivity timer for a displayed screenshot representation (e.g., thumbnail), which, if satisfied, causes ceasing display of the screenshot representation; save resolution affordance 811a-7 for setting the capture resolution; save-to-application affordance 811a-8 for setting an application in which to display a captured screenshot; save format affordance 811a-9 for setting the format of the captured screenshot file; and a save location affordance 811a-10 for setting the location to save the captured screenshot. One of ordinary skill in the art will appreciate that the screen capture interface 811 may include any number of affordances arranged in any manner.

In some embodiments, one or more of the plurality of capture-type affordances correspond (1006) to an image screenshot, video capture, or audio capture. Providing affordances for selecting the screenshot capture type within an interface reduces the number of inputs associated with capturing a screenshot. Reducing the number of inputs associated with capturing a region enhances the operability of the electronic device and make the user interface of the electronic device more efficient, which extends the battery life and reduces wear-and-tear of the electronic device. As an example, as illustrated in FIG. 8C, the screen capture interface 811 includes the following affordances: image capture affordance 811a-1 for initiating an image capture; video capture affordance 811a-2 for initiating a video capture; and audio capture affordance 811a-3 for initiating an audio capture.

In some embodiments, the screen capture interface includes (1008) a second capture affordance for capturing screenshots of a second display different from the display. Providing a second capture affordance for capturing screenshots on a second display, in addition to a first capture affordance for capturing screenshots on a first display, reduces the number of inputs associated with capturing screenshots of multiple displays. Reducing the number of inputs associated with capturing a region enhances the operability of the electronic device and make the user interface of the electronic device more efficient, which extends the battery life and reduces wear-and-tear of the electronic device. For example, the second display is non-contiguous with the display (e.g., the first display). As another example, the second display is proximate to the display (e.g., the first display). As yet another example, the second display is contacting but not overlapping the display (e.g., the first display).

In some embodiments, in accordance with a determination that a first sub-region of the display overlaps with the screen capture interface, the electronic device changes (1010) the position of the screen capture interface such that the screen capture interface does not overlap with the first sub-region of the display. In accordance with a determination that the first sub-region of the display does not overlap with the screen capture interface, the electronic device maintains (1010) the position of the screen capture interface. Changing the position of the screen capture interface in order to reduce clutter, without user intervention, reduces the number of user inputs. Reducing the number of inputs associated with capturing a region enhances the operability of the electronic device and make the user interface of the electronic device more efficient, which extends the battery life and reduces wear-and-tear of the electronic device.

As one example, with reference to FIGS. 8V-8W, the electronic device 100 determines that the target location of the sub-region 814 based on the move input 840 in FIG. 8V overlaps with the screen capture interface 811. Consequently, the electronic device 100 repositions the screen capture interface 811 so as to not overlap with the sub-region 814, as illustrated in FIG. 8W.

In response to detecting, via the one or more input devices, a first input corresponding to selecting a first capture affordance within the screen capture interface, the electronic device captures (1012) a first screenshot that includes currently displayed content within a first sub-region of the display to be captured, wherein the first sub-region includes less than all of the display. In some embodiments, the first sub-region corresponds to the window currently at the highest z order. In some embodiments, the first sub-region corresponds to whichever application window is selected. In some embodiments, the first sub-region corresponds to the content minus the screen capture interface and/or cursor. In some embodiments, the electronic device displays an indication indicating a successful capture, such as displaying a screen flash or a green checkmark.

In one example, with reference to FIGS. 8O-8R, in response to detecting the video capture input 828, the electronic device 100 captures a one-minute video capture of content within the sub-region 814. As another example, with reference to FIGS. 8AK-8AL, in response to detecting the image capture input 857 in FIG. 8AK, the electronic device 100 captures an image corresponding to content within the sub-region 814 and inserts a thumbnail of the captured content in an Email message in FIG. 8AL.

In some embodiments, the first screenshot is captured (1014) according to a first capture-type affordance. Capturing the first screenshot according to a first capture-type affordance reduces the number of inputs associated with capturing the first screenshot. Reducing the number of inputs associated with capturing a region enhances the operability of the electronic device and make the user interface of the electronic device more efficient, which extends the battery life and reduces wear-and-tear of the electronic device. As an example, with reference to FIGS. 8O-8R, in response to detecting the input 828 corresponding to the video capture affordance 811a-2, the electronic device 100 captures a one-minute video capture of content within the sub-region 814. As an example, with reference to FIGS. 8AC-8AD, in response to detecting the input 848 corresponding to the image capture affordance 811a-1, the electronic device 100 again captures an image of content within the sub-region 814.

In some embodiments, the first screenshot is saved (1016) to a predetermined location. Saving the first screenshot to a predetermined location reduces the number of inputs associated with capturing the first screenshot. Reducing the number of inputs associated with capturing a region enhances the operability of the electronic device and make the user interface of the electronic device more efficient, which extends the battery life and reduces wear-and-tear of the electronic device. In some embodiments, the first screenshot is saved in response to an input corresponding to a save affordance within the screen capture interface. In some embodiments, the first screenshot is saved without user intervention—e.g., in response to detecting the screen capture input (e.g., screen capture affordance). In some embodiments, the electronic device displays a save prompt, and based on input specifying a location, sets the predetermined location. In some embodiments, the save window is displayed in response to detecting an input corresponding to the save affordance within the screen capture interface.

As an example, with reference to FIG. 8H, the electronic device 100 detects an input 818 specifying Desktop 805 as the save location. Continuing with this example, with reference to FIG. 8R, after the video capture has finished, the captured content is saved in a file "Video Capture.mov" to the Desktop 805, as indicated by the corresponding icon 834.

Figure 10B:
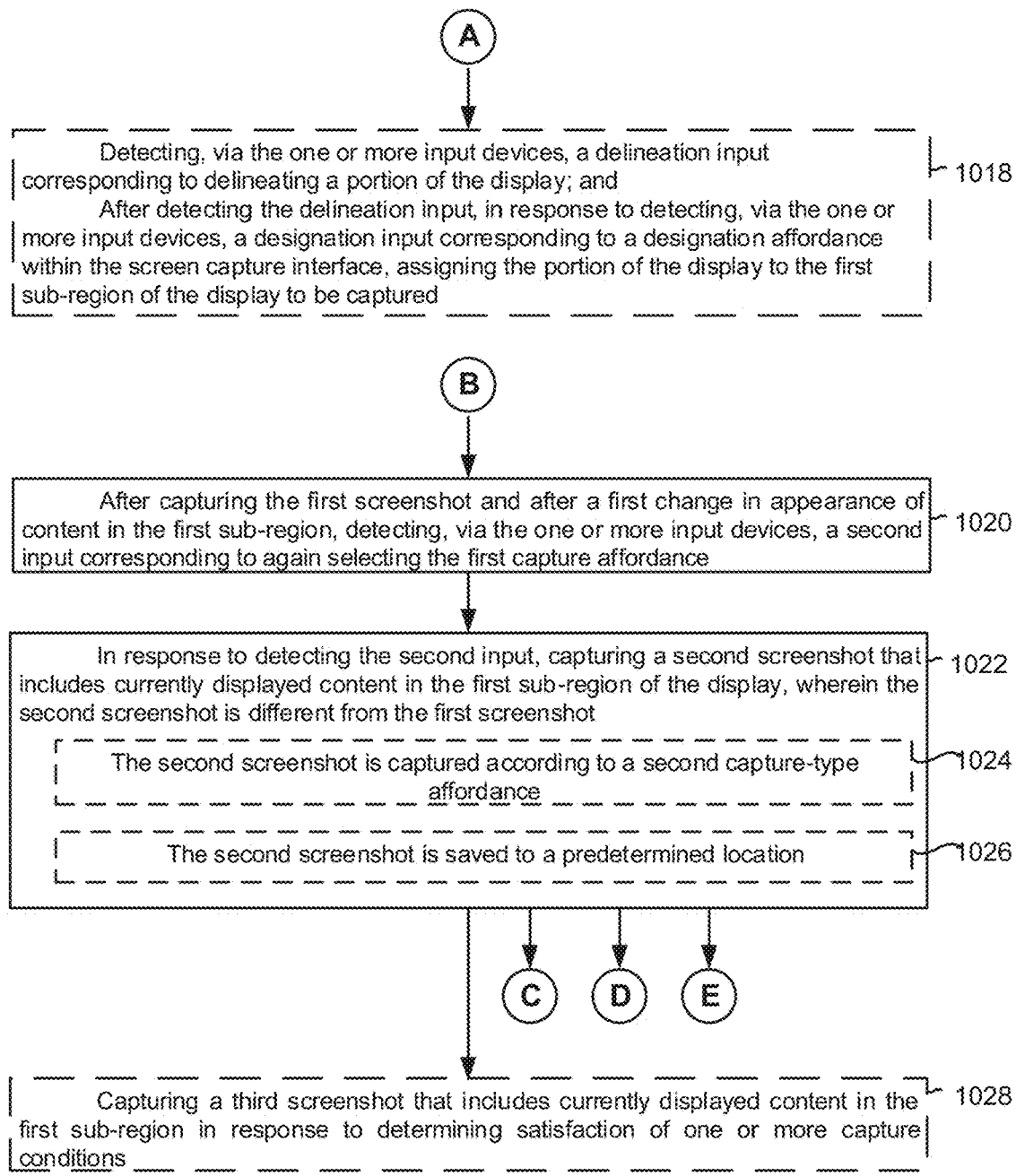

With reference to FIG. 10B, in some embodiments, the electronic device detects (1018), via the one or more input devices, a delineation input corresponding to delineating a portion of the display. After detecting the delineation input, in response to detecting, via the one or more input devices, a designation input corresponding to a designation affordance within the screen capture interface, the electronic device assigns (1018) the portion of the display to the first sub-region of the display to be captured. Designating a sub-region to be captured reduces the number of inputs associated with capturing the first screenshot. Reducing the number of inputs associated with capturing a region enhances the operability of the electronic device and make the user interface of the electronic device more efficient, which extends the battery life and reduces wear-and-tear of the electronic device. For example, the delineation input corresponds to cropping a portion of the display. As another example, the delineation input corresponds to selecting (e.g., clicking on) a window. As yet another example, the delineation input corresponds to a mouse click-and-drag, a swipe gesture (e.g., multi-touch gesture), selecting a hot-key in order to select the highest Z-order windows, etc.

As an example, the electronic device 100 detects a set input 812a in FIG. 8E. As illustrated in FIG. 8F, the electronic device 100 detects an endpoint input 813 originating at an anchor point 812b (e.g., origin point) corresponding to the set input 812a. The endpoint input 813 corresponds to a down-right diagonal selection from the anchor point 812b. The rectangle region formed between the anchor point 812b and the endpoint input 813 in effect delineates a sub-region 814 of the display, as illustrated in FIG. 8G.

After capturing the first screenshot and after a first change in appearance of content in the first sub-region, the electronic device detects (1020), via the one or more input devices, a second input corresponding to again selecting the first capture affordance. As one example, the electronic device 100 performs an image capture of content within the sub-region 814 in FIG. 8AC ("Park.jpeg") and different content within the sub-region 814 in FIG. 8AK ("Sun.jpeg").

In response to detecting the second input, the device captures (1022) a second screenshot that includes currently displayed content in the first sub-region of the display, wherein the second screenshot is different from the first screenshot. Continuing with the previous example, in response to detecting the input, the electronic device 100 captures a second screenshot that includes currently displayed content in first sub-region 814 in FIG. 8AK. The second screenshot corresponds to "Sun.jpeg," which is different from the previous screenshot corresponding to "Park.jpeg" in FIG. 8AC.

In some embodiments, the second screenshot is captured (1024) according to a second capture-type affordance. Capturing the second screenshot according to a second capture-type affordance reduces the number of inputs associated with capturing the second screenshot. Reducing the number of inputs associated with capturing a region enhances the operability of the electronic device and make the user interface of the electronic device more efficient, which extends the battery life and reduces wear-and-tear of the electronic device. In some embodiments, the first and second capture-type affordances are the same. In some embodiments, the first and second capture-type affordances are different. For example, a video capture occurs in response to the input 828 in FIG. 8O, whereas an image capture occurs in response to the input 848 in FIG. 8AC.

In some embodiments, the second screenshot is saved (1026) to a predetermined location. Saving the second screenshot to a predetermined location reduces the number of inputs associated with capturing the second screenshot. Reducing the number of inputs associated with capturing a region enhances the operability of the electronic device and make the user interface of the electronic device more efficient, which extends the battery life and reduces wear-and-tear of the electronic device. In some embodiments, the second screenshot is saved in response to an input corresponding to a save affordance within the screen capture interface. In some embodiments, the second screenshot is saved without user intervention—e.g., in response to detecting the screen capture input (e.g., screen capture affordance). In some embodiments, an input specifies the predetermined location via an input to a save affordance within the screen capture interface. As an example, with reference to FIG. 8H, the electronic device 100 detects an input 818 specifying Desktop 805 as the save location. Continuing with this example, with reference to FIG. 8R, after the video capture has finished, the captured video content is saved to the Desktop 805, as indicated by the corresponding icon 834.

In some embodiments, the electronic device captures (1028) a third screenshot that includes currently displayed content in the first sub-region in response to determining satisfaction of one or more capture conditions. Capturing a third screenshot based on satisfying capture conditions reduces the number of inputs associated with capturing the second screenshot. Reducing the number of inputs associated with capturing a region enhances the operability of the electronic device and make the user interface of the electronic device more efficient, which extends the battery life and reduces wear-and-tear of the electronic device. For example, the electronic device captures the third screenshot after a threshold amount of time (e.g., default threshold or set based on input) has passed since the electronic device detected the last input. As another example, the electronic device captures the third screenshot in response to detecting an input indicative of a predetermined action, such as moving an icon, moving the cursor a sufficient distance, opening a file, initiating restart/shutdown, etc. As yet another example, the electronic device captures the third screenshot in response to detecting an input designating a sub-region.

Figure 10C:
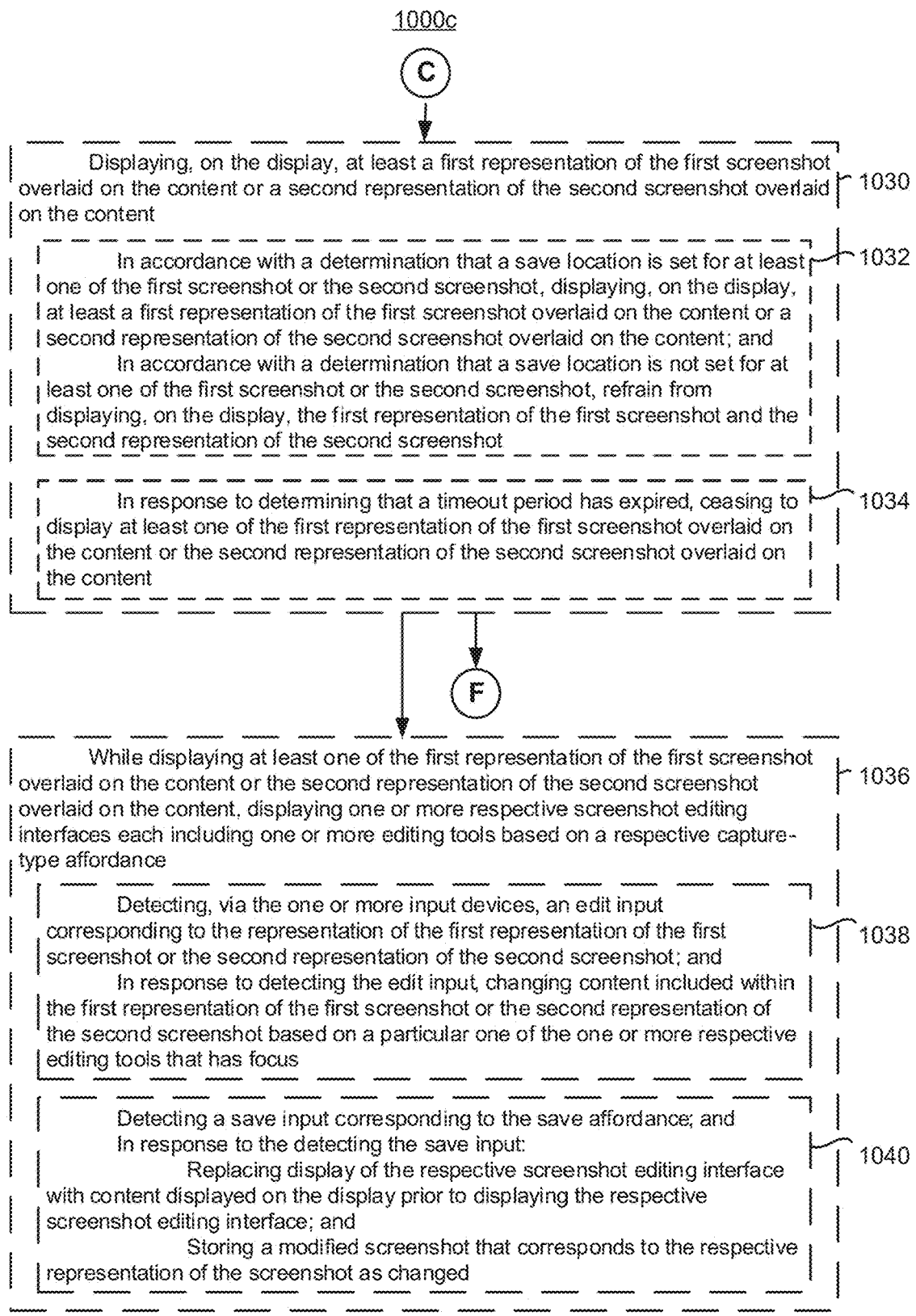

With reference to FIG. 10C, in some embodiments, the electronic device displays (1030), on the display, at least a first representation of the first screenshot overlaid on the content or a second representation of the second screenshot overlaid on the content. Displaying a screenshot representation reduces the number of inputs associated with capturing and displaying the screenshot. Reducing the number of inputs associated with capturing a region enhances the operability of the electronic device and make the user interface of the electronic device more efficient, which extends the battery life and reduces wear-and-tear of the electronic device. For example, the screen representation corresponds to a thumbnail. As another example, the electronic device displays the representation as an animated sequence—e.g., representation floats towards an edge of display. In some embodiments, the electronic device maintains display of the screen capture interface after displaying the representation. In some embodiments, the electronic device ceases display of the screen capture interface after displaying the representation. In some embodiments, the electronic device concurrently displays the first and second representations. In some embodiments, the electronic device ceases display of the first representation and displays the second representation, in response to capturing the second screenshot. As one example, with reference to FIG. 8AE, a representation 849 of the captured image screenshot floats towards the bottom-right of the "Nature folder." "Nature folder" was designated as the save location via input 844 in FIG. 8Z.

In some embodiments, in accordance with a determination that a save location is set for at least one of the first screenshot or the second screenshot, the electronic device displays (1032), on the display, at least a first representation of the first screenshot overlaid on the content or a second representation of the second screenshot overlaid on the content. In accordance with a determination that a save location is not set for at least one of the first screenshot or the second screenshot, the device refrains (1032) from displaying, on the display, the first representation of the first screenshot and the second representation of the second screenshot. Displaying a screenshot representation based on whether a save location is set reduces the number of inputs associated with capturing, displaying, and/or saving the screenshot. Reducing the number of inputs associated with capturing a region enhances the operability of the electronic device and make the user interface of the electronic device more efficient, which extends the battery life and reduces wear-and-tear of the electronic device. As an example, with reference to FIG. 8H, the electronic device 100 detects an input 818 specifying Desktop 805 as the save location. Continuing with this example, with reference to FIG. 8R, after the video capture has finished, the captured video content is saved to the Desktop 805, as indicated by the corresponding icon 834.

In some embodiment, in response to determining that a timeout period has expired, the device cease (1034) to display at least one of the first representation of the first screenshot overlaid on the content or the second representation of the second screenshot overlaid on the content. Ceasing to display a screenshot representation conserved battery usage, enhancing the operability of the electronic device and make the user interface of the electronic device more efficient. For example, the electronic device ceases to display the representation in accordance with an animation sequence (e.g., thumbnail flashes away). In some embodiments, the electronic device determines that the timeout period has expired based on a lack or absence of input directed to the representation. In some embodiments, the electronic device determines that the timeout period has expired based on a lack or absence of input directed to active first sub-region for a sufficient amount of time. For example, the electronic device detects no clicks within the first sub-region for one minute. In some embodiments, the timeout period is extended or reset in response to the electronic device detecting an input corresponding to the capture affordance.

As one example, with reference to FIGS. 8AD-8AF, the electronic device 100 does not detect an input corresponding to the representation 849 of the captured screenshot within the 30 seconds timeout period. Recall that the timeout period is set to 30 seconds via input 847 in FIG. 8AB. Because no input is detected during the timeout period, the electronic device 100 ceases to display the representation 849 of the captured screenshot after the time expires.

In some embodiments, while displaying at least one of the first representation of the first screenshot overlaid on the content or the second representation of the second screenshot overlaid on the content, the electronic device displays (1036) one or more respective screenshot editing interfaces each including one or more editing tools based on a respective capture-type affordance. Displaying screenshot editing interfaces based on the corresponding capture-type reduces the number of inputs associated with capturing, displaying, and/or editing the screenshot. Reducing the number of inputs associated with capturing a region enhances the operability of the electronic device and make the user interface of the electronic device more efficient, which extends the battery life and reduces wear-and-tear of the electronic device. For example, the editing tools include one or more of a pencil, pen, highlighter, video/audio trimmer, filter, ruler, and/or the like. As another example, the one or more editing tools are displayed within the screen capture interface. As yet another example, the one or more editing tools are contiguous with the representation of the screenshot. As yet another example, the editing interface is proximate to the respective representation of screenshot. As yet another example, the editing interface is included within the same window as the respective representation of screenshot. As yet another example, the editing tools include at least one of a deletion affordance provided to delete a screenshot, a sharing affordance provided to share a screenshot image, a markup affordance provided to enable annotations to be applied to a screenshot image, or one or more cropping interface elements provided to crop a screenshot image.

In some embodiments, the electronic device detects (1038), via the one or more input devices, an edit input corresponding to the representation of the first representation of the first screenshot or the second representation of the second screenshot. In response to detecting the edit input, the device changes (1038) content included within the first representation of the first screenshot or the second representation of the second screenshot based on a particular one of the one or more respective editing tools that has focus. Changing content based on editing tools associated with a corresponding capture type reduces the number of inputs associated with capturing, displaying, and/or editing the screenshot. Reducing the number of inputs associated with capturing a region enhances the operability of the electronic device and make the user interface of the electronic device more efficient, which extends the battery life and reduces wear-and-tear of the electronic device. In some embodiments, the electronic device detects an input specifying the particular editing tool having focus.

In some embodiments, the electronic device detects (1040) a save input corresponding to a save affordance. In response to the detecting the save input: the electronic device replaces (1040) display of the respective screenshot editing interface with content displayed on the display prior to displaying the respective screenshot editing interface; and stores a modified screenshot that corresponds to the respective representation of the screenshot as changed. Storing a modified screenshot based on content changes reduces the number of inputs associated with capturing, displaying, editing, and/or storing the screenshot. Reducing the number of inputs associated with capturing a region enhances the operability of the electronic device and make the user interface of the electronic device more efficient, which extends the battery life and reduces wear-and-tear of the electronic device.

Figure 10D:
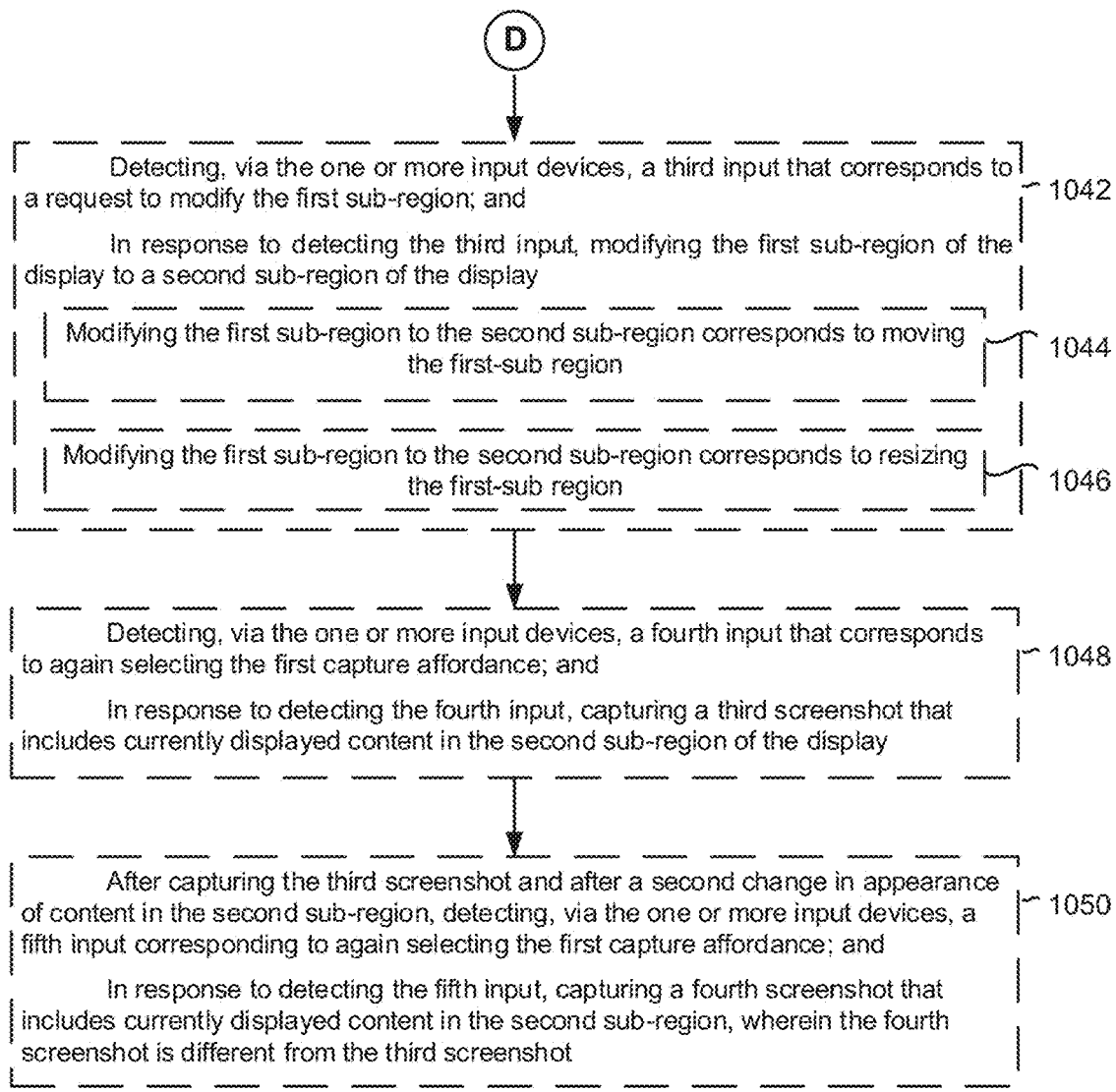

With reference to FIG. 10D, in some embodiments, the electronic device detects (1042), via the one or more input devices, a third input that corresponds to a request to modify the first sub-region. In response to detecting the third input, the device modifies (1042) the first sub-region of the display to a second sub-region of the display. Modifying the sub-region based on an input reduces the overall number of inputs associated with capturing a region, setting a new region, and/or recapturing the new region. Reducing the number of inputs associated with capturing a region enhances the operability of the electronic device and make the user interface of the electronic device more efficient, which extends the battery life and reduces wear-and-tear of the electronic device. Examples of modifying the sub-regions are described below.

In some embodiments, modifying the first sub-region to the second sub-region corresponds (1044) to moving the first-sub region. Moving the sub-region based on an input reduces the overall number of inputs associated with capturing a region, setting a new region, and/or recapturing the new region. Reducing the number of inputs associated with capturing a region enhances the operability of the electronic device and make the user interface of the electronic device more efficient, which extends the battery life and reduces wear-and-tear of the electronic device. For example, modifying the first sub-region corresponds to clicking-and-dragging the region, swiping to move the region, keyboard tabbing the region, and/or the like. As one example, with reference to FIGS. 8V-8W, in response to detecting an input 840 corresponding to a request to move the sub-region 814 rightwards in FIG. 8V, the electronic device 100 correspondingly moves the sub-region 814 in FIG. 8W.

In some embodiments, modifying the first sub-region to the second sub-region corresponds (1046) to resizing the first-sub region. Resizing the sub-region based on an input reduces the overall number of inputs associated with capturing a region, setting a new region, and/or recapturing the new region. Reducing the number of inputs associated with capturing a region enhances the operability of the electronic device and make the user interface of the electronic device more efficient, which extends the battery life and reduces wear-and-tear of the electronic device. In some embodiments, the electronic device resizes the first sub-region based on an input detected within an affordance within the screen capture interface. For example, a button that shrinks/grows the selected area by 2×/3×/etc. As another example, an input corresponding to a click-and-drag results in a corresponding size change.

As one example, with reference to FIGS. 8U-8V, in response to detecting an input 839 corresponding to a request to shrink the sub-region 814 in FIG. 8U, the electronic device 100 correspondingly shrinks the sub-region 814 in FIG. 8V. As another example, with reference to FIGS. 8X-8Y, in response to detecting an input 841 corresponding to a request to enlarge the sub-region 814 in FIG. 8X, the electronic device 100 correspondingly enlarges the sub-region 814 in FIG. 8Y.

In some embodiments, the electronic device detects (1048), via the one or more input devices, a fourth input that corresponds to again selecting the first capture affordance. In response to detecting the fourth input, the electronic device captures (1048) a third screenshot that includes currently displayed content in the second sub-region of the display. Capturing the new region based on the input reduces overall number of inputs associated with capturing a region, setting a new region, and/or capturing the new region. Reducing the number of inputs associated with capturing a region enhances the operability of the electronic device and make the user interface of the electronic device more efficient, which extends the battery life and reduces wear-and-tear of the electronic device. For example, the third screenshot corresponds to the content within the second sub-region minus the screen capture interface and/or cursor. As one example, with reference to FIG. 8AK, a fourth input 857 corresponds to again selecting the image capture affordance 811*a*-1, after the image capture affordance 811*a*-1 was selected via input 848 in FIG. 8AC.

In some embodiments, after capturing the third screenshot and after a second change in appearance of content in the second sub-region, the electronic device detects (1050), via the one or more input devices, a fifth input corresponding to again selecting the first capture affordance. In response to detecting the fifth input, the electronic device captures (1050) a fourth screenshot that includes currently displayed content in the second sub-region, wherein the fourth screenshot is different from the third screenshot. Capturing the modified screenshot based on the input reduces overall number of inputs associated with capturing a region, setting a new region, modifying the new region, and/or capturing the newly modified region. Reducing the number of inputs associated with capturing a region enhances the operability of the electronic device and make the user interface of the electronic device more efficient, which extends the battery life and reduces wear-and-tear of the electronic device.

With reference to FIG. 10E, in some embodiments, the electronic device detects (1052), via the one or more input devices, an application-designation input corresponding to an application affordance within the screen capture interface. After detecting the application-designation input, the electronic device detects (1052), via the one or more input devices, a fourth input corresponding to again selecting the first capture affordance. In response to detecting the fourth input, the electronic device launches (1052) an application associated with the application affordance, wherein a window of the application includes a representation of the second screenshot. Launching an application with a screenshot representation therein based on the corresponding affordance reduces the number of inputs. Reducing the number of inputs associated with capturing a region enhances the operability of the electronic device and make the user interface of the electronic device more efficient, which extends the battery life and reduces wear-and-tear of the electronic device. For example, the representation corresponds to a thumbnail. In some embodiments, the electronic device displays an animation sequence, ending in the representation being embedded in the application.

As an example, the electronic device 100 detects an input 856 specifying an Email application in FIG. 8AJ. Continuing with this example, with reference to FIGS. 8AK-8AL, in response to detecting the image capture input 857 in FIG. 8AK, the electronic device 100 captures an image corresponding to content within the sub-region 814 and inserts a thumbnail 860 of the captured content in an Email message 859 in FIG. 8AL.

In some embodiments, while displaying, on the display, at least the first representation of the first screenshot or the second representation of the second screenshot, the electronic device: detects (1054), via the one or more input devices, a drag input corresponding to at least one of the first representation of the first screenshot or a second representation of the second screenshot; and in response to detecting the drag input, performs (1054) a drag operation on at least one of the first representation of the first screenshot or the second representation of the second screenshot. Dragging the representation based on a corresponding reduces the number of inputs to the electronic device. Reducing the number of inputs associated with capturing a region enhances the operability of the electronic device and make the user interface of the electronic device more efficient, which extends the battery life and reduces wear-and-tear of the electronic device. For example, the dragging operations corresponds to dragging the representation towards one or more of: trash, email message, open folder, predetermined location.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method comprising:
   at an electronic device with one or more processors, a non-transitory memory, one or more input devices, and a display device:
   while displaying, via the display device, a file browsing user interface that includes a plurality of representations of files, detecting, via the one or more input devices, a first input directed to a representation of a first file of the plurality of representations of the files; and
   in response to determining that the first input is of a first input type corresponding to a request to display a preview of the first file, concurrently displaying, via the display device:
   a preview of the first file; and
   one or more selectable affordances for performing actions associated with the first file, including:
   in accordance with a determination that the first file includes an image or text, displaying, via the display device, a first set of one or more selectable affordances for performing actions associated with the first file, wherein the first set of one or more selectable affordances includes at least a pen tool or a highlighter tool for marking up the image or the text; and
   in accordance with a determination that the first file includes an audio or a video, displaying, via the display device, a second set of one or more selectable affordances for performing actions associated with the first file, wherein the second set of one or more selectable affordances includes at least a trimming tool for trimming a duration of the audio or the video.

2. The method of claim 1, further comprising: in response to determining that the first input is of a second input type that is different from the first input type, launching the first file in an application.

3. The method of claim 1, further comprising:
detecting, via the one or more input devices, an edit input corresponding to the preview of the first file; and
in response to detecting the edit input, changing content displayed within the preview of the first file based on a particular affordance of the one or more selectable affordances that has focus.

4. The method of claim 3, further comprising detecting, via the one or more input devices, a selection input corresponding to the particular affordance of the one or more selectable affordances.

5. The method of claim 3, further comprising, in response to detecting, via the one or more input devices, a navigation input corresponding to a request to cease displaying the preview of the first file, displaying, via the display device, a prompt providing an option to save changes made to the preview of the first file.

6. The method of claim 1, wherein the plurality of representations of the files are included within a first window pane of a first window.

7. The method of claim 6, wherein the preview of the first file is included within a second window pane that is included within the first window.

8. The method of claim 7, wherein the second window pane is included within a docking area of the first window.

9. The method of claim 6, wherein the preview of the first file is included within a second window that is different from the first window.

10. The method of claim 1, further comprising:
detecting, via the one or more input devices, a navigation input corresponding to a request to display a respective preview of a second file; and
in response to detecting the navigation input, concurrently displaying, via the display device:
a respective preview of the second file; and
a respective one or more selectable affordances for performing actions associated with the second file.

11. The method of claim 10, wherein the respective preview of the second file and the respective one or more selectable affordances are concurrently displayed in a first window different from a second window that includes the preview of the first file and the one or more selectable affordances.

12. The method of claim 10, further comprising, in response to detecting the navigation input, ceasing to display the preview of the first file and the one or more selectable affordances.

13. The method of claim 1, further comprising:
detecting, via the one or more input devices, a second input corresponding to a request to change at least a subset of the one or more selectable affordances; and
in response to detecting the second input, changing at least the subset of the one or more selectable affordances.

14. The method of claim 1, wherein the first editing affordance is different from the second editing affordance.

15. An electronic device comprising:
a display device;
one or more processors;
a non-transitory memory;
one or more input devices; and
one or more programs, wherein the one or more programs are stored in the non-transitory memory and configured to be executed by the one or more processors, the one or more programs including instructions for:
while displaying, via the display device, a file browsing user interface that includes a plurality of representations of files, detecting, via the one or more input devices, a first input directed to a representation of a first file of the plurality of representations of the files; and
in response to determining that the first input is of a first input type corresponding to a request to display a preview of the first file, concurrently displaying, via the display device:
a preview of the first file; and
one or more selectable affordances for performing actions associated with the first file, including:
in accordance with a determination that the first file includes an image or text, displaying, via the display device, a first set of one or more selectable affordances for performing actions associated with the first file, wherein the first set of one or more selectable affordances includes at least a pen tool or a highlighter tool for marking up the image or the text; and
in accordance with a determination that the first file includes an audio or a video, displaying, via the display device, a second set of one or more selectable affordances for performing actions associated with the first file, wherein the second set of one or more selectable affordances includes at least trimming tool for trimming a duration of the audio or the video.

16. The electronic device of claim 15, the one or more programs including additional instructions for:
detecting, via the one or more input devices, an edit input corresponding to the preview of the first file; and
in response to detecting the edit input, changing content displayed within the preview of the first file based on a particular affordance of the one or more selectable affordances that has focus.

17. The electronic device of claim 16, the one or more programs including additional instructions for detecting, via the one or more input devices, a selection input corresponding to the particular affordance of the one or more selectable affordances.

18. The electronic device of claim 15, the one or more programs including additional instructions for:
detecting, via the one or more input devices, a navigation input corresponding to a request to display a respective preview of a second file; and
in response to detecting the navigation input, concurrently displaying, via the display device:
a respective preview of the second file; and
a respective one or more selectable affordances for performing actions associated with the second file.

19. The electronic device of claim 18, wherein the respective preview of the second file and the respective one or more selectable affordances are concurrently displayed in a first window different from a second window that includes the preview of the first file and the one or more selectable affordances.

20. The electronic device of claim 15, the one or more programs including additional instructions for:

detecting, via the one or more input devices, a second input corresponding to a request to change at least a subset of the one or more selectable affordances; and in response to detecting the second input, changing at least the subset of the one or more selectable affordances.

21. A non-transitory computer readable storage medium storing one or more programs, the one or more programs comprising instructions, which, when executed by an electronic device with one or more processors, a display device, and one or more input devices, cause the electronic device to:

while displaying, via the display device, a file browsing user interface that includes a plurality of representations of files, detect, via the one or more input devices, a first input directed to a representation of a first file of the plurality of representations of the files; and in response to determining that the first input is of a first input type corresponding to a request to display a preview of the first file, concurrently display, via the display device:

a preview of the first file; and one or more selectable affordances for performing actions associated with the first file, including:

in accordance with a determination that the first file includes an image or text, displaying, via the display device, a first set of one or more selectable affordances for performing actions associated with the first file, wherein the first set of one or more selectable affordances includes at least a pen tool or a highlighter tool for marking up the image or the text; and in accordance with a determination that the first file includes an audio or a video, via the display device, a second set of one or more selectable affordances for performing actions associated with the first file, wherein the second set of one or more selectable affordances includes at least a trimming tool for trimming a duration of the audio or the video.

* * * * *